US012100086B2

(12) United States Patent
Watanabe

(10) Patent No.: US 12,100,086 B2
(45) Date of Patent: Sep. 24, 2024

(54) COMPUTER PROGRAM, METHOD, AND SERVER DEVICE FOR CHANGING INPUT OBJECT

(71) Applicant: GREE, INC., Tokyo (JP)

(72) Inventor: Ken Watanabe, Kanagawa (JP)

(73) Assignee: GREE, INC., Tokyo (JP)

(*) Notice: Subject to any disclaimer, the term of this patent is extended or adjusted under 35 U.S.C. 154(b) by 0 days.

(21) Appl. No.: 18/091,722

(22) Filed: Dec. 30, 2022

(65) Prior Publication Data
US 2023/0316618 A1 Oct. 5, 2023

(30) Foreign Application Priority Data

Mar. 29, 2022 (JP) .................. 2022-054269

(51) Int. Cl.
G06T 13/40 (2011.01)
G06F 3/01 (2006.01)
G06T 19/00 (2011.01)

(52) U.S. Cl.
CPC .............. *G06T 13/40* (2013.01); *G06F 3/011* (2013.01); *G06T 19/00* (2013.01); *G06T 2200/24* (2013.01); *G06T 2219/024* (2013.01)

(58) Field of Classification Search
CPC .................................................. G06T 13/40
See application file for complete search history.

(56) References Cited

U.S. PATENT DOCUMENTS

| 10,915,242 | B1* | 2/2021 | Schaefer | G06F 3/0488 |
| 2020/0382868 | A1* | 12/2020 | Felton | H04R 29/008 |
| 2021/0250650 | A1* | 8/2021 | Kawakami | H04N 21/2668 |
| 2022/0300081 | A1* | 9/2022 | Eirinberg | G06V 40/107 |
| 2022/0355188 | A1* | 11/2022 | Tsuchiya | A63F 13/213 |
| 2023/0186577 | A1* | 6/2023 | Rockel | G06T 19/006 |
| | | | | 345/633 |

FOREIGN PATENT DOCUMENTS

JP 2019-186797 A 10/2019
JP 2021-197730 A 12/2021

OTHER PUBLICATIONS

Reality Inc., "Reality" <https://reality.app/> (Feb. 25, 2022).
VirtualCast <https://blog.virtualcast.jp/blog/2020/03/nazenani15/> 6 pages (May 13, 2020).
May 30, 2020 Office Action issued in Japanese Patent Application No. 2022-054269.

* cited by examiner

Primary Examiner — Chun-Nan Lin
(74) Attorney, Agent, or Firm — Oliff PLC

(57) ABSTRACT

A first video is displayed that is generated based on motion of a user and is represented as viewed from a viewpoint of the user, the user being a user of the terminal device. In combination with the first video, an input object is displayed that functions as a user interface enabling input by the user. The input object that is displayed is caused to change according to the type of the first video that is displayed.

18 Claims, 33 Drawing Sheets

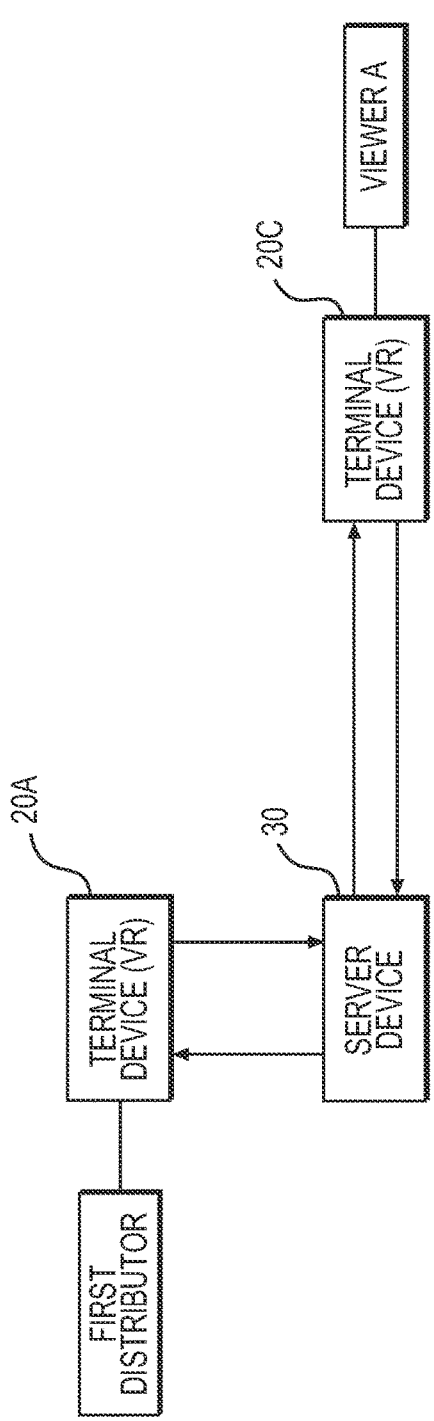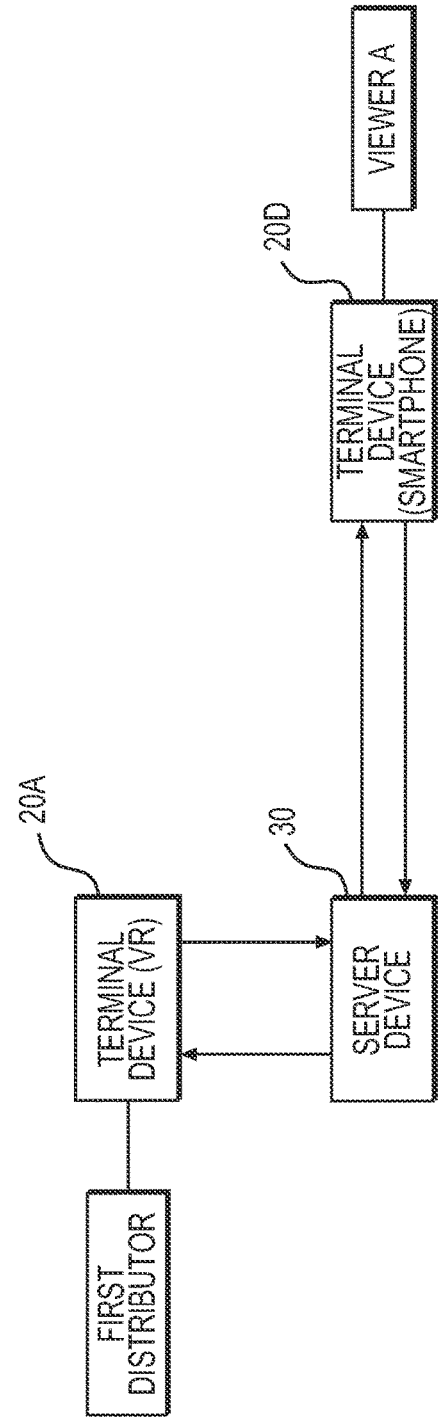
FIG. 5A
FIG. 5B

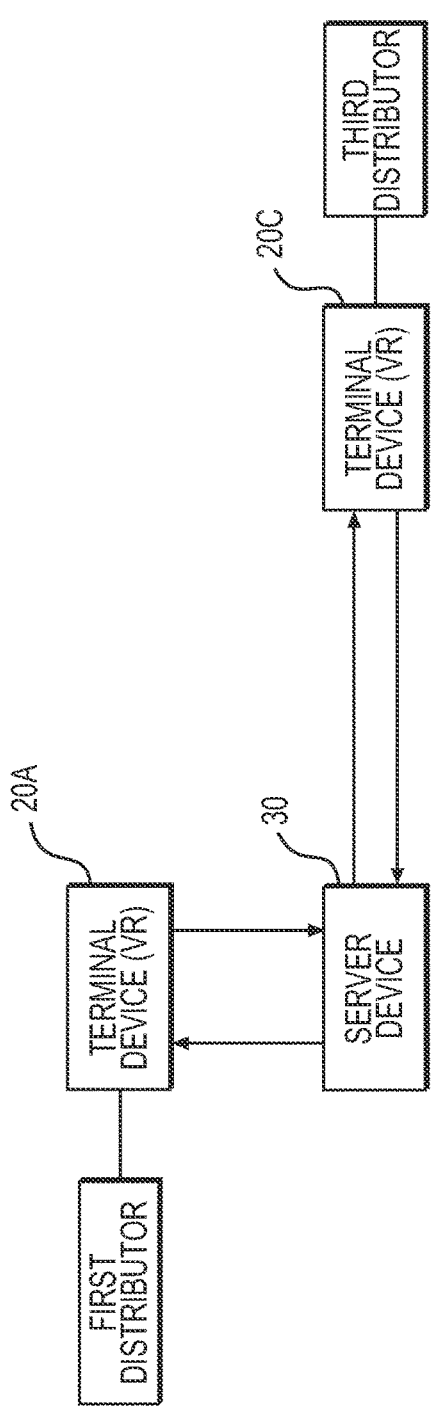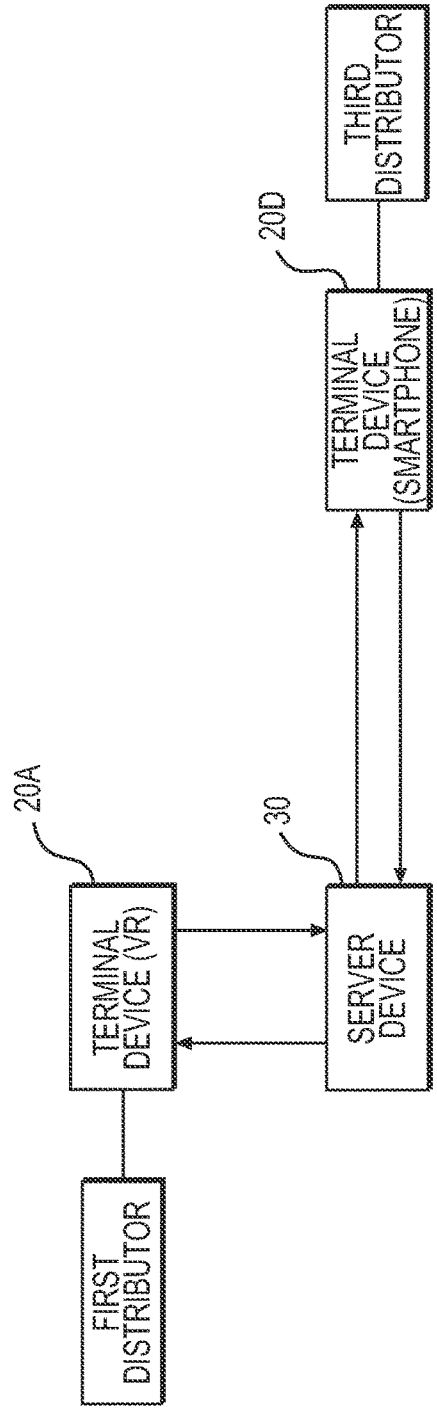
FIG. 5C
FIG. 5D

COMPUTER PROGRAM, METHOD, AND SERVER DEVICE FOR CHANGING INPUT OBJECT

This application claims the benefit of priority from Japanese Patent Application No. 2022-054269 filed Mar. 29, 2022, the entire contents of the prior application being incorporated herein by reference.

TECHNICAL FIELD

A technology disclosed in this application relates to a computer program, a method, and a server device used to distribute and/or display videos.

BACKGROUND TECHNOLOGY

At present, there is a known service that distributes, from a terminal device of a distributor to a terminal device of a viewer, a video including an animation of an avatar that moves in accordance with motion of the distributor.

Problem to be Resolved

In recent years, it is thought that not only smartphones, but also various tracking devices attached to the body of distributors, including head-mounted displays (HMDs) and AR glasses, will be used as terminal devices used by distributors.

Therefore, the technology disclosed in this application provides a method that uses a tracking device(s) attached to the body of a distributor to distribute and/or display videos.

Means of Solving Problem

A computer program according to an embodiment can, "by being executed by at least one processor installed in a terminal device, cause the at least one processor to perform the following functions:
  when first motion data generated using a first tracking method is received by a first terminal device based on motion of a first distributor, generating a video is that includes an animation of a first avatar of the first distributor that is based on the first motion data;
  when second motion data generated using a second tracking method that differs from the first tracking method is received by a second terminal device based on motion of a second distributor, generating a video that includes an animation of a second avatar of the second distributor that is based on the second motion data;
  when both the first motion data and the second motion data are received, generating a video that includes an animation of the first avatar that is based on the first motion and an animation of the second avatar that is based on the second motion; and
  displaying the video on a display portion."

A method according to an aspect can be "a method that is executed by at least one processor installed in a terminal device that executes computer-readable commands, the method including that the at least one processor executes the commands such that: when first motion data is received that is generated using a first tracking method based on motion of a first distributor by a first terminal device, the at least one processor, by executing the commands, generates a video including an animation of a first avatar of the first distributor based on the first motion data;
  when second motion data is received that is generated using a second tracking method that differs from the first tracking method based on motion of a second distributor by a second terminal device, a video is generated including an animation of a second avatar of the second distributor based on the second motion data;
  when the first motion data and the second motion data are both received, a video is generated including (i) an animation of the first avatar based on the first motion data and (ii) an animation of the second avatar based on the second motion data; and
  the video is displayed on a display portion."

A computer program according to another aspect can be "executed by at least one processor installed in a terminal device, wherein the computer program causes the at least one processor to function such that:
  first motion data generated by the terminal device using a first tracking method based on motion of a user of the terminal is sent to a server device;
  second motion data generated by a second terminal device using a second tracking method that differs from the first tracking method based on motion of a second distributor is received via the server device;
  a video is generated including (i) an animation of a first avatar of the user based on the first motion data and (ii) an animation of a second avatar of the second distributor based on the second motion data; and the video is displayed on a display portion."

A method according to another aspect can be "a method that is executed by at least one processor installed in a terminal device that executes computer-readable commands, the method including that the at least one processor executes the commands such that:
  first motion data generated by the terminal device using a first tracking method based on motion of a user is sent to a server device;
  second motion data generated by a second terminal device using a second tracking method that differs from the first tracking method based on motion of a second distributor is received via the server device;
  a video is generated including (i) an animation of a first avatar of the user based on the first motion data and (ii) an animation of a second avatar of the second distributor based on the second motion data; and
  the video is displayed on a display portion."

A server device according to an aspect can adopt a configuration in which "at least one processor is provided, the at least one processor being configured such that:
  when first motion data generated by a first terminal device using a first tracking method based on motion of a first distributor is received from the first terminal device, the first motion data is sent to a terminal device and causes a video including an animation of a first avatar of the first distributor to be generated in the terminal device based on the first motion data;
  when second motion data generated by a second terminal device using a second tracking method that differs from the first tracking method based on motion of a second distributor is received from the second terminal device, the second motion data is sent to the terminal device and causes a video including an animation of a second avatar of the second distributor to be generated in the terminal device based on the second motion data; and
  when the first motion data and the second motion data are both received, both the first motion data and the second motion data are sent to the terminal device and a video including an animation of the first avatar based on the first motion data and an animation of the second avatar based on the second motion data is caused to be generated in the terminal device."

A method according to yet another aspect can be "a method that is executed by at least one processor installed in a server device that executes computer-readable commands, the method including that the at least one processor executes the commands such that:

when first motion data generated by a first terminal device using a first tracking method based on motion of a first distributor is received from the first terminal device, the first motion data is sent to a terminal device and causes a video including an animation of a first avatar of the first distributor to be generated in the terminal device based on the first motion data;

when second motion data generated by a second terminal device using a second tracking method that differs from the first tracking method based on motion of a second distributor is received from the second terminal device, the second motion data is sent to the terminal device and causes a video including an animation of a second avatar of the second distributor to be generated in the terminal device based on the second motion data; and when the first motion data and the second motion data are both received, both the first motion data and the second motion data are sent to the terminal device and a video including (i) an animation of the first avatar based on the first motion data and (ii) an animation of the second avatar based on the second motion data is caused to be generated in the terminal device."

A server device according to another aspect can be "a server device provided with at least one processor, wherein:

the at least one processor is configured to send, to a terminal device, a web page including a computer program;

the computer program, by being executed by the terminal device that has received the web page, causes the terminal device to perform the following functions:

when first motion data generated by a first terminal device using a first tracking method based on motion of a first distributor is received, a video is generated including an animation of a first avatar of the first distributor based on the first motion data;

when second motion data generated by a second terminal device using a second tracking method that differs from the first tracking method based on motion of a second distributor is received, a video is generated including an animation of a second avatar of the second distributor based on the second motion data; and when the first motion data and the second motion data are both received, a video is generated including (i) an animation of the first avatar based on the first motion data and (ii) an animation of the second avatar based on the second motion data."

A computer program according to yet another aspect can be "executed by at least one processor installed in a terminal device, wherein the computer program causes the at least one processor to function such that:

a first video is displayed that is generated based on motion of a user who is a user of the terminal device, the first video being represented as viewed from the viewpoint of the user;

an input object that functions as a user interface enabling input by the user is displayed in combination with the first video; and the input object that is displayed is caused to change in accordance with the type of the first video that is displayed."

A method according to yet another aspect can be "a method that is executed by at least one processor installed in a terminal device that executes computer-readable commands, the method including that the at least one processor executes the commands such that:

a first video is displayed that is generated based on motion of a user who is the user of the terminal device and is represented as viewed from a viewpoint of the user;

an input object that functions as a user interface enabling input by the user is displayed in combination with the first video; and the input object that is displayed is caused to change in accordance with a type of the first video that is displayed."

A system according to an aspect can be "a system including a terminal device and a server device connected to the terminal device via a communication circuit, wherein the system is configured such that the terminal device (i) sends motion data generated based on motion of a user of the terminal device to the server device, (ii) displays a first video that is generated based on the motion data and is represented as viewed from a viewpoint of the user, (iii) displays in combination with the first video an input object that functions as a user interface enabling input by the user, and (iv) causes the input object that is displayed to change in accordance with a type of the first video that is displayed; and is configured such that the server device sends the motion data received from the terminal device to at least one other terminal device."

A method according to yet another aspect can be "a method that is executed by a system including a terminal device and a server device connected to the terminal device via a communication circuit, the method including that:

the terminal device sends motion data generated based on motion of a user of the terminal device to the server device;

the terminal device displays a first video that is generated based on the motion data and is represented as viewed from a viewpoint of the user;

the terminal device displays in combination with the first video an input object that functions as a user interface enabling input by the user;

the terminal device causes the input object that is displayed to change in accordance with a type of the first video that is displayed; and the server device sends the motion data received from the terminal device to at least one other terminal device."

A server device according to yet another aspect can be "a server device provided with at least one processor and configured so that the at least one processor sends a web page including a computer program to a terminal device, and the computer program, by being executed by the terminal device that received the web page, causes the terminal device to function such that a first video that is generated based on motion of a user of the terminal device and is represented as viewed from the viewpoint of the user is displayed, an input object that functions as a user interface enabling input by the user is displayed in combination with the first video, and the input object that is displayed is caused to change in accordance with a type of the first video that is displayed."

A computer program according to yet another aspect can be "executed by at least one processor installed in a terminal device, wherein the computer program causes the at least one processor to function such that:
  first motion data generated based on motion of a user of the terminal device is generated using a plurality of tracking devices attached to the user;
  a first video is displayed that is generated based on the first motion data and represents a virtual space as viewed from a viewpoint of the user;
  a second video is displayed that is generated based on the first motion data and represents the virtual space including an avatar of the user as viewed from a separated viewpoint at a distance from the avatar of the user; and
  an object is attached to the avatar of the user or an object is removed from the avatar of the user in accordance with operation data generated based on an operation by the user."

A method according to yet another aspect can be "a method that is executed by at least one processor installed in a terminal device that executes computer-readable commands, the method including that the at least one processor executes the commands such that:
  first motion data is acquired that was generated based on motion of a user that is a user of the terminal device, using a plurality of tracking devices attached to the user;
  a first video is displayed that is generated based on the first motion data and represents a virtual space as viewed from a viewpoint of the user;
  a second video is displayed that is generated based on the first motion data and represents the virtual space including an avatar of the user as viewed from a separated viewpoint at a distance from the avatar of the user; and
  an object is attached to the avatar of the user or an object is removed from the avatar of the user in accordance with operation data generated based on an operation by the user."

A server device according to yet another aspect can be "a server device provided with at least one processor, the at least one processor being configured such that:
  motion data is acquired that was generated based on motion of a user of a terminal device using a plurality of tracking devices attached to the user;
  a first video that is generated based on the motion data and represents a virtual space as viewed from a viewpoint of the user is generated and sent to the terminal device;
  a second video that is generated based on the motion data and represents the virtual space including an avatar of the user as viewed from a separated viewpoint at a distance from the avatar of the user is generated and sent to the terminal device;
  operation data generated based on an operation by the user is received from the terminal device; and
  an object is attached to the avatar of the user or an object is removed from the avatar of the user based on the operation data."

A method according to yet another aspect can be "a method that is executed by at least one processor installed in a server device that executes computer-readable commands, the method including that the at least one processor executes the commands such that:
  motion data is acquired that was generated based on motion of a user of a terminal device using a plurality of tracking devices attached to the user;
  a first video that is generated based on the motion data and represents a virtual space as viewed from a viewpoint of the user is generated and sent to the terminal device;
  a second video that is generated based on the motion data and represents the virtual space including an avatar of the user as viewed from a separated viewpoint at a distance from the avatar of the user is generated and sent to the terminal device;
  operation data generated based on an operation by the user is received from the terminal device; and
  an object is attached to the avatar of the user or an object is removed from the avatar of the user based on the operation data."

A system according to another aspect can be "a system that includes a terminal device, and a server device connected to the terminal device via a communication circuit, wherein the terminal device is configured so as to:
  acquire motion data that was generated based on motion of a user of the terminal device using a plurality of tracking devices attached to the user;
  display a first video that is generated based on the motion data and represents a virtual space as viewed from a viewpoint of the user;
  display a second video that is generated based on the motion data and represents the virtual space including an avatar of the user as viewed from a separated viewpoint at a distance from the avatar of the user; and
  attach an object to the avatar of the user or remove an object from the avatar of the user in accordance with operation data generated based on an operation by the user, and
  the server device is configured so as to send the motion data received from the terminal device to at least one other terminal device."

A method according to yet another aspect can be "a method that is executed by a system that includes a terminal device and a server device connected to the terminal device by a communication circuit, the method including that:
  the terminal device acquires motion data that was generated based on motion of a user of the terminal device using a plurality of tracking devices attached to the user;
  the terminal device displays a first video that is generated based on the motion data and represents a virtual space as viewed from the viewpoint of the user;
  the terminal device displays a second video that is generated based on the motion data and represents the virtual space including an avatar of the user as viewed from a separated viewpoint at a distance from the avatar of the user;
  the terminal device attaches an object to the avatar of the user or removes an object from the avatar of the user in accordance with operation data generated based on an operation by the user; and
  the server device sends the motion data received from the terminal device to at least one other terminal device."

A server device according to yet another aspect can be "a server device provided with at least one processor, and configured so that the at least one processor sends a web page including a computer program to a terminal device, and the computer program, by being executed by the terminal device that received the web page, causes the terminal device to function so as to:
  acquire motion data that was generated based on motion of a user of the terminal device using a plurality of tracking devices attached to the user;

display a first video that is generated based on the motion data and represents a virtual space as viewed from a viewpoint of the user;

display a second video that is generated based on the motion data and represents the virtual space including an avatar of the user as viewed from a separated viewpoint at a distance from the avatar of the user; and attach an object to the avatar of the user or remove an object from the avatar of the user in accordance with operation data generated based on an operation by the user."

BRIEF EXPLANATION OF DRAWINGS

FIG. 5A is a schematic diagram explaining a second case regarding provision of video using the platform realized by the communication system 1 shown in FIG. 1.

FIG. 5B is a schematic diagram explaining the second case regarding provision of video using the platform realized by the communication system 1 shown in FIG. 1.

FIG. 5C is a schematic diagram explaining the second case regarding provision of video using the platform realized by the communication system 1 shown in FIG. 1.

FIG. 5D is a schematic diagram explaining the second case regarding provision of video using the platform realized by the communication system 1 shown in FIG. 1.

MODE TO IMPLEMENT EMBODIMENTS

Figure 1:
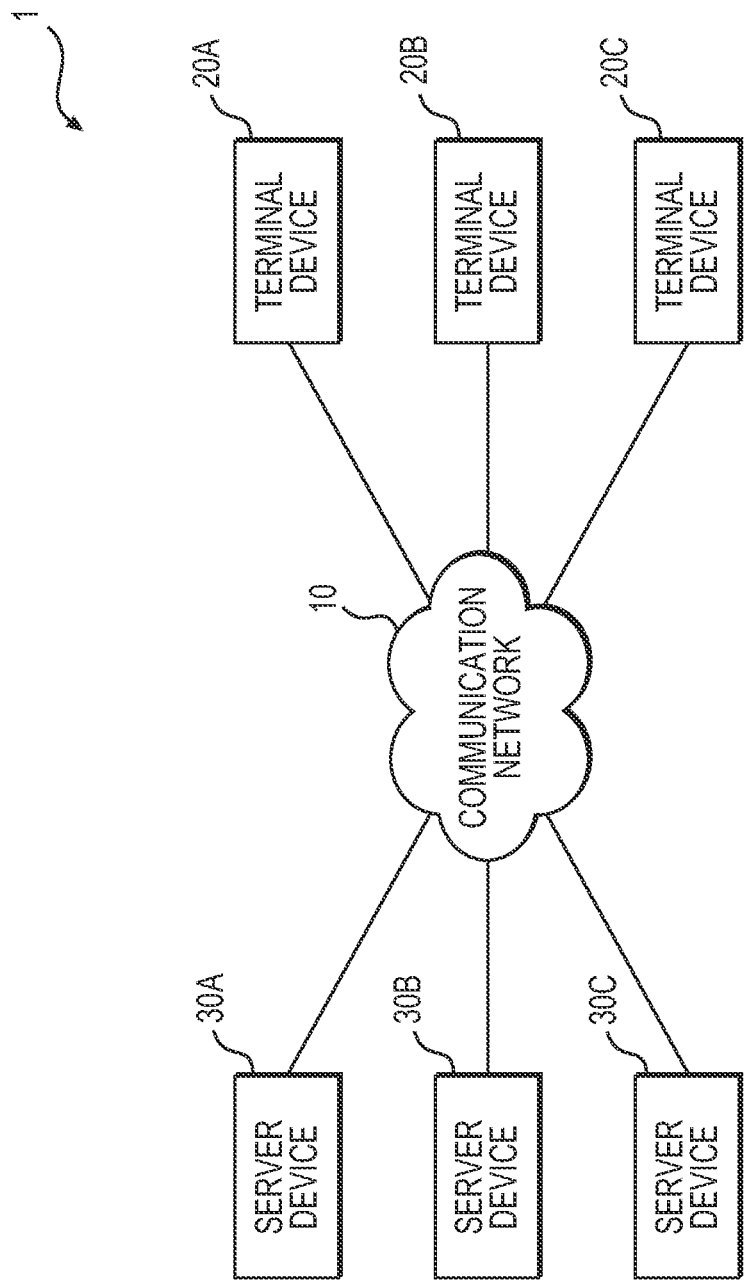
FIG. 1 is a block diagram showing an example of a configuration of a communication system according to an embodiment.

This specification is described in the sense of various representative embodiments, which are not intended to be limiting in any way.

As used in this application, singular forms such as "a," "the," "above-mentioned," "said," "aforementioned," "this," and "that" can include a plurality unless the lack of a plural is explicitly indicated. Also, the term "includes" can mean "having" or "comprising." Further, the terms "coupled," "joined" and "connected" encompass mechanical, electrical, magnetic and optical methods, as well as other methods, that bind, connect, or join objects to each other, and do not exclude the presence of intermediate elements between objects that are thus coupled, joined or connected.

The various systems, methods and devices described herein should not be construed as limiting in any way. In practice, this disclosure is directed to all novel features and aspects of each of the various disclosed embodiments, combinations of these various embodiments with each other, and combinations of portions of these various embodiments with each other. The various systems, methods, and devices described herein are not limited to any particular aspect, particular feature, or combination of such particular aspects and particular features, and the articles and methods described herein do not require that one or more particular effects exist or that any problem is solved. Moreover, various features or aspects of the various embodiments described herein, or portions of such features or aspects, may be used in combination with each other.

Although the operations of some of the various methods disclosed herein have been described in a particular order for convenience, the descriptions in such methods should be understood to include rearranging the order of the above operations unless a particular order is otherwise required by specific text below. For example, a plurality of operations described sequentially is in some cases rearranged or executed concurrently. Furthermore, for the purpose of simplicity, the attached drawings do not illustrate the various ways in which the various items and methods described herein can be used with other items and methods. Additionally, this specification may use terms such as "create," "generate," "display," "receive," "evaluate," and "distribute." These terms are high-level descriptions of the actual various operations executed. The actual various operations corresponding to these terms may vary depending on the particular implementation, and may be readily recognized by those of ordinary skill in the art having the benefit of the disclosure of this specification.

Any theories of operation, scientific principles or other theoretical statements presented herein in connection with the disclosed devices or methods are provided for better understanding and are not intended to limit the technical scope. The devices and methods in the appended scope of the claims are not limited to devices and methods that operate according to methods described by such theories of operation.

Any of the various methods disclosed herein can be implemented using a plurality of computer-executable commands stored on one or more computer-readable media (for example, non-transitory computer-readable storage media such as one or more optical media discs, a plurality of volatile memory components, or a plurality of non-volatile memory components), and can be executed on a computer. Here, the aforementioned plurality of volatile memory components includes, for example, DRAM or SRAM. Further, the aforementioned plurality of non-volatile memory components includes, for example, hard drives and solid-state drives (SSDs). Further, the aforementioned computer includes any computer available on the market, including, for example, smartphones and other mobile devices that have computing hardware.

Any of the aforementioned plurality of computer-executable commands for implementing the technology disclosed herein may be stored on one or more computer-readable media (for example, non-transitory computer-readable storage media) along with any data generated and used during implementation of the various embodiments disclosed herein. Such a plurality of computer-executable commands may, for example, be part of a separate software application, or may be part of a software application that can be accessed or downloaded via a web browser or other software application (such as a remote computing application). Such software may be implemented, for example, on a single local computer (for example, as a process executed on any suitable computer available on the market) or in a network environment (for example, the Internet, a wide area network, a local area network, a client-server network (such as a cloud computing network), or other such network) using one or more network computers.

For clarity, only certain selected aspects of various software-based implementations are described. Other details that are well known in the art are omitted. For example, the technology disclosed herein is not limited to any particular computer language or program. For example, the technology disclosed herein may be implemented by software written in C, C++, Java, or any other suitable programming language. Similarly, the technology disclosed herein is not limited to any particular type of computer or hardware. Specific details of suitable computers and hardware are well known and need not be described in detail herein.

Further, any of the various such software-based embodiments (for example, including a plurality of computer-executable commands for causing a computer to execute any of the various methods disclosed herein) can be uploaded, downloaded, or accessed remotely by any suitable communication means. Such suitable communication means include, for example, the Internet, World Wide Web, an intranet, a software application, a cable (including a fiber optic cable), magnetic communications, electromagnetic communications (including RF communications, microwave communications, and infrared communications), electronic communications or other such communication means.

The term "gift" used in this application means the same concept as the term "token." Therefore, the technology described in this application can also be understood by replacing the term "gift" with the term "token."

Hereinafter, various embodiments will be described below with reference to the accompanying drawings. In addition, the same reference numerals are attached to common structural components in the drawings. Also, it should be noted that structural components depicted in one drawing may be omitted in another drawing for convenience of explanation. Furthermore, it should be noted that the attached drawings are not necessarily drawn to scale.

In this specification, terms such as "distribution of videos" by a distributor or "distributing videos" by a distributor may include, for example, at least one aspect of the aspects exemplified below.

A terminal device of a distributor, either alone or jointly with a terminal device of another distributor, sends data (for example, motion data) necessary for generating a video to terminal devices of a plurality of viewers via a server device or the like A terminal device of a distributor, either alone or jointly with a terminal device of another distributor, sends a generated video to a terminal device of each viewer via a server device or the like.

1. Overview

Briefly speaking, the following operations can be executed in the communication system disclosed in this application.

In a typical example in which a first distributor and a second distributor jointly distribute a video to each viewer, the terminal device of the first distributor can send, to a server device, first motion data generated using a first tracking method based on the motion of the first distributor. Further, the terminal device of the second distributor can send, to the server device, second motion data generated using a second tracking method (different from the first tracking method) based on the motion of the second distributor.

Here, the first tracking method can include a method that generates motion data indicating coordinates and angles of at least a device attached to the head of the distributor and at least one controller held or attached to the body other than on the head of the distributor. The device attached to the head of the distributor can include, but is not limited to, an HMD, VR glasses, or the like. The at least one controller can include, but is not limited to, a hand controller held by the right hand of the distributor, a hand controller held by the left hand of the distributor, a controller attached to the waist of the distributor, or the like.

The second tracking method can include a method (face tracking method or the like) that generates motion data indicating at least the depth of each of a plurality of parts of the face of the distributor, and the coordinates and angles of the head of the distributor.

The server device can send the first motion data and the second motion data to the terminal devices of a plurality of viewers, the terminal device of the first distributor, and the terminal device of the second distributor.

Each of a plurality of terminal devices including the terminal device of each viewer, the terminal device of the first distributor, and the terminal device of the second distributor can identify each of first motion data and second motion data received from the server device. Then, each of the plurality of terminal devices can generate and display a video including an animation of an avatar of the first distributor based on the first motion data and an animation of an avatar of the second distributor based on the second motion data.

Meanwhile, in an example in which the first distributor alone provides the video to each viewer, the terminal device of this first distributor can send, to the server device, the first motion data generated using the first tracking method based on the motion of this first distributor.

The server device can send the first motion data to the terminal devices of a plurality of viewers and the terminal device of the first distributor.

Each of the plurality of terminal devices, including the terminal device of each viewer and the terminal device of the first distributor, can identify the first motion data received from the server device. Further, each of the plurality of terminal devices can generate and display a video including an animation of the avatar of the first distributor based on the first motion data.

Meanwhile, in an example in which the second distributor alone provides the video to each viewer, the terminal device of this second distributor can send, to the server device, the second motion data generated using the second tracking method based on the motion of this second distributor.

The server device can send the second motion data to the terminal devices of a plurality of viewers and the terminal device of the second distributor.

Each of the plurality of terminal devices, including the terminal device of each viewer and the terminal device of the second distributor, can identify the second motion data received from the server device. Further, each of the plurality of terminal devices can generate and display a video including an animation of the avatar of the second distributor based on the second motion data.

In each of the examples described above, a method (client rendering method) is adopted in which generation of videos is executed by each of the plurality of terminal devices. However, a method (server rendering method) can be adopted in which such video generation is executed by the server device (or another server device that can be connected to the server device), and the videos thus generated are sent to and displayed by the plurality of terminal devices. Alternatively, a method (browser rendering method) can also be adopted in which generation of videos is executed by each of the plurality of terminal devices receiving a web page from the server device (or another server device that may be connected to the server device) and executing a computer program contained in the web page.

2. Overall Configuration of Communication System

Next, the configuration of a communication system that executes the above operations will be described with reference to FIG. 1.

FIG. 1 is a block diagram showing an example of the configuration of a communication system according to an embodiment.

As shown in FIG. 1, a communication system 1 can include at least one server device 30, a plurality of terminal devices 20 connectable to the communication network 10, and at least one server device 30 connectable to the communication network 10. FIG. 1 shows an example in which the plurality of terminal devices 20 includes three terminal devices 20A, 20B, and 20, but the plurality of terminal devices 20 can include any number (two or more) of terminal devices 20. Similarly, FIG. 1 shows an example in which the least one server device 30 includes three server devices 30A, 30B, and 30C, but the at least one server device 30 can also include any number (one or more) of server devices 30.

The plurality of terminal devices 20 can include the terminal device 20 of at least one distributor and the terminal device 20 of at least one viewer. Each terminal device 20 of the at least one distributor is capable of generating and sending motion data that is based on either of the first tracking method and the second tracking method, and each terminal device 20 of the at least one viewer is also capable of generating and sending motion data that is based on either of the first tracking method and the second tracking method.

In addition, the plurality of terminal devices 20 may be any information processor and can include, but is not limited to, HMDs, VR glasses, smartphones, personal computers, tablets, personal digital assistants, mobile phones, and combinations thereof.

The at least one server device 30 may be an information processor capable of providing various services to each of the plurality of terminal devices 20 that have accessed this server device 30. The at least one server device 30 may be any information processor and can include, but is not limited to, personal computers, supercomputers, workstations, mainframes, and combinations thereof.

Also, the at least one server device 30 may include a web server device 30 that sends a web page containing a computer program to each of the plurality of terminal devices 20 that have accessed this server device 30.

Furthermore, the at least one server device 30 may be mutually connectable via the communication network 10.

The communication network 10 may include, but is not limited to, a mobile phone network, a wireless network, a landline telephone network, the Internet, an intranet, a local area network (LAN), a wide area network (WAN), and/or an Ethernet network. Here, the wireless network can include an RF connection(s) via, for example, Bluetooth, WiFi (such as IEEE 802.11a/b/n), WiMax, cellular, satellite, laser, and/or infrared.

3. Hardware Configuration of Terminal Device 20

Figure 2:
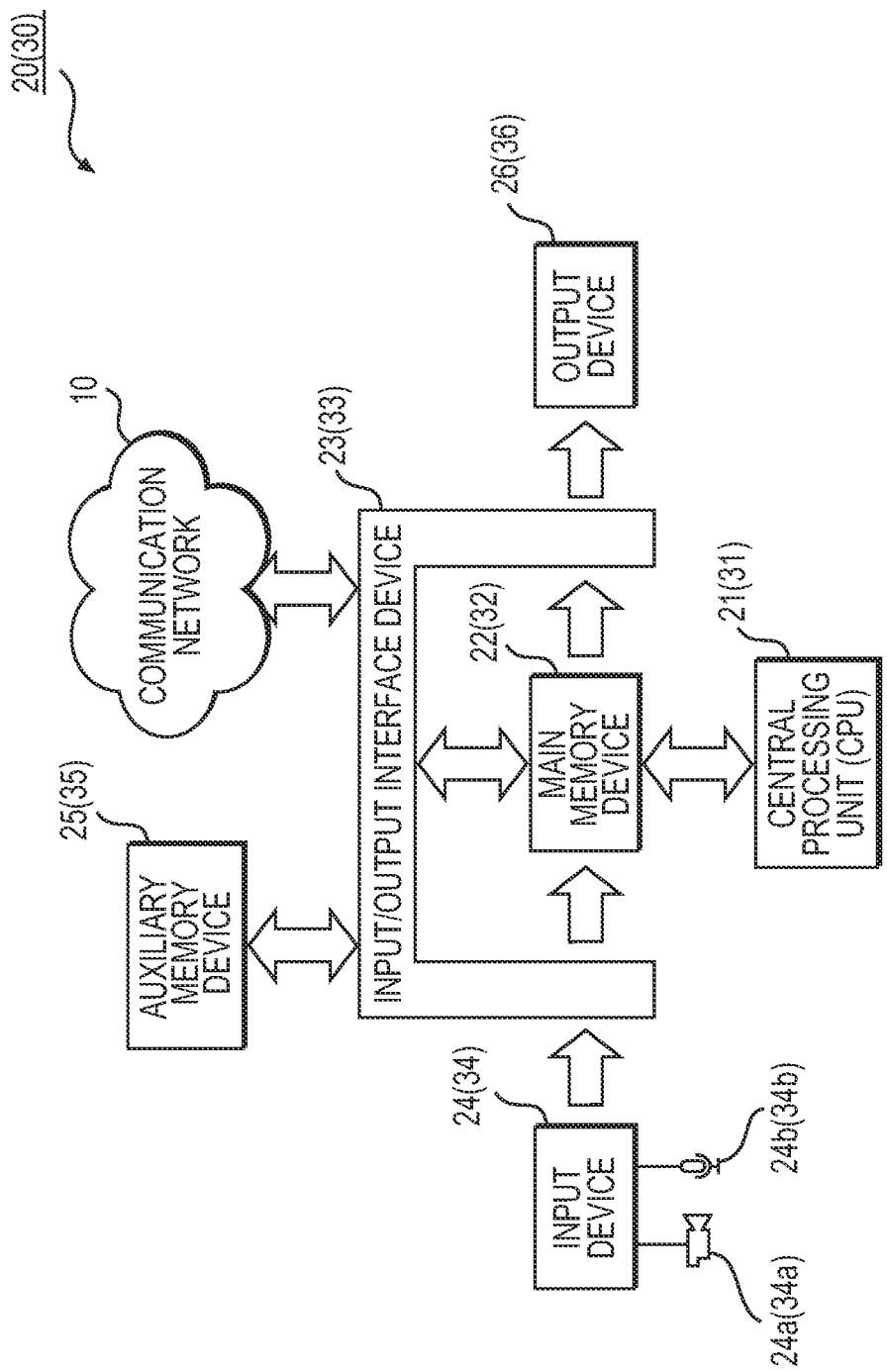
FIG. 2 is a block diagram showing an example of a hardware configuration of a terminal device 20 used in a communication system 1 shown in FIG. 1.

Next, the configuration of a terminal device 20 used in the communication system 1 described above will be described with reference to FIG. 2. FIG. 2 is a block diagram showing an example of the hardware configuration of the terminal device 20 used in the communication system 1 shown in FIG. 1 (In FIG. 2, reference numerals in parentheses are described in relation to the server device 30 that will be described later).

As shown in FIG. 2, each terminal device 20 can primarily include a central processing unit 21, a main memory device 22, an input/output interface device 23, an input device 24, an auxiliary memory device 25, and an output device 26. These devices are connected to each other by a data bus and/or a control bus.

The central processing unit 21 is called a "CPU," can operate on commands and data stored in the main memory 22, and can store the results of the calculations in the main memory device 22. Furthermore, the central processing unit 21 can control the input device 24, the auxiliary memory device 25, the output device 26, and the like via the input/output interface device 23. The terminal device 20 may include one or more such central processing units 21.

The main memory device 22 is called a "memory," and can store commands and data received from the input device 24, the auxiliary memory device 25, and the communication network 10 (the server device 30 and the like) via the input/output interface device 23, as well as calculation results from the central processing unit 21. The main memory device 22 can include, but is not limited to, computer-readable media such as volatile memory (for example, a register, cache, random access memory (RAM)), non-volatile memory (for example, read-only memory (ROM), EEPROM, and flash memory), and storage (for example, a hard disk drive (HDD), a solid state drive (SSDs), a magnetic tape, and optical media). As will be readily understood, the term "computer-readable storage media" can include media for data storage such as memory and storage, rather than transmission media such as modulated data signals, that is, transient signals.

The auxiliary memory device 25 is a memory device having a larger capacity than the main memory device 22. The auxiliary memory device 25 can store commands and data (computer programs) that make up an operating system, a web browser application, a specific application for distributing and/or receiving videos, and the like. Furthermore, the auxiliary memory device 25 can send these commands and data (computer programs) to the main memory device 22 via the input/output interface device 23 under the control of the central processing unit 21. The auxiliary memory device 25 can include, but is not limited to, a magnetic disk device and/or an optical disk device, or the like.

The input device 24 is a device that takes in data from the outside, and can include, but is not limited to, a touch panel, buttons, a keyboard, a mouse and/or a sensor, or the like. The sensor can include, but is not limited to, a sensor including one or more cameras 24a, or the like, and/or one or more microphones 24b, or the like.

The output device 26 can include, but is not limited to, a display device, a touch panel and/or a printer device, or the like.

In a first aspect, the terminal device 20 can be a terminal device 20 that generates motion data that is based on the first tracking method. In this case, the terminal device 20 (typically, a personal computer or the like) can have (i) a device (HMD or VR device, or the like) that functions as the input device 24 and the output device 26 and is attached to the head of the user, and (ii) at least one controller that functions as the input device 24 and is attached to or held by the body other than on the head of the user (or may be connected to these devices and a controller(s)). The at least one controller can, for example, include, but is not limited to, a right-hand controller that may be held by or attached to the right hand of the user and a left-hand controller that may be held by or attached to the left hand of the user.

Figure 3:
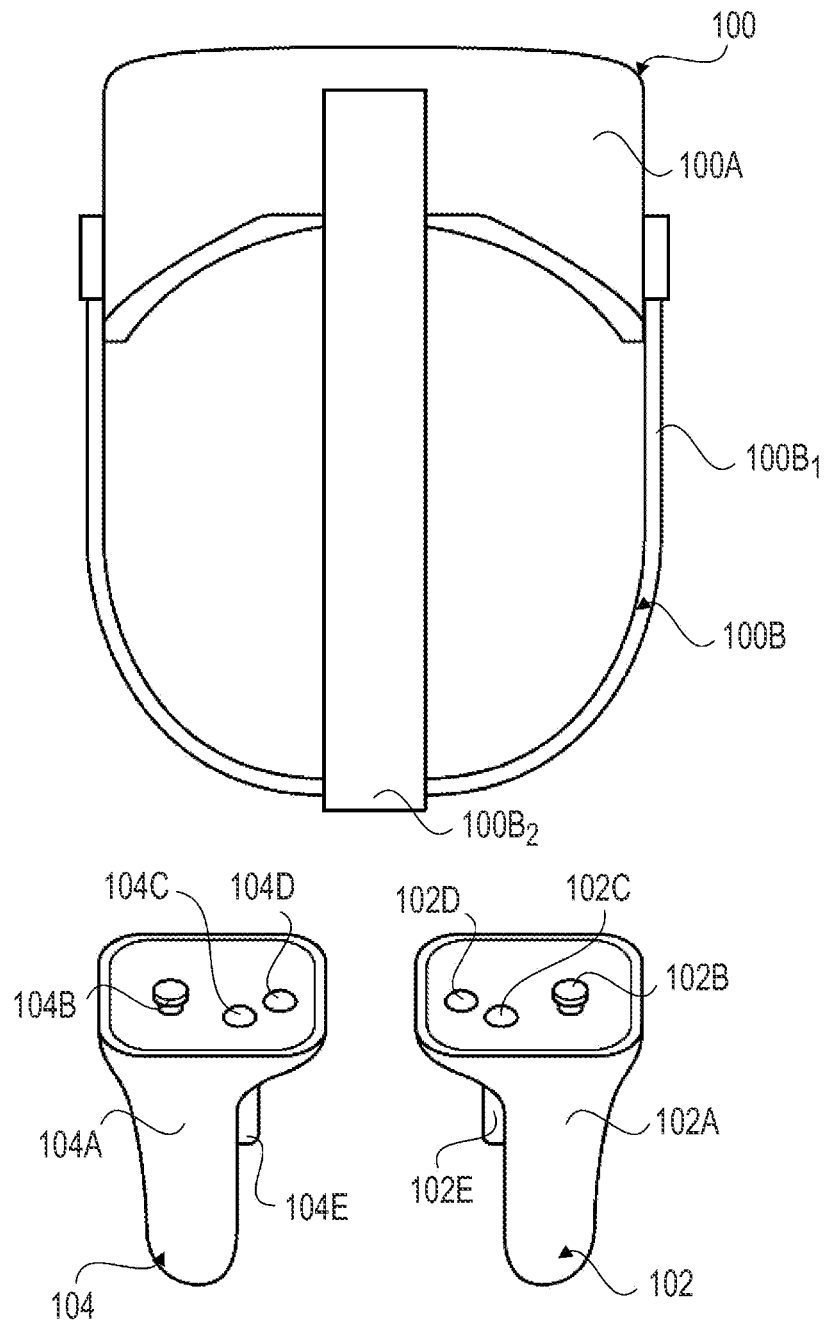
FIG. 3 is a schematic diagram showing an example of a device that can be connected to the terminal device 20 or the like to generate motion data that is based on a first tracking method in the communication system 1 shown in FIG. 1.

FIG. 3 is a schematic diagram showing an example of a device that can be connected to the terminal device 20 or the like to generate motion data that is based on the first tracking method in the communication system 1 shown in FIG. 1. As shown in FIG. 3, the terminal device 20 that generates motion data that is based on the first tracking method may include (or be connected to) an HMD (or VR glasses or the like) 100 attached to the head of the user, a right-hand controller 102 that can be held by or attached to the body (here, the right hand of the user) other than on the head of the user, and a left-hand controller 104 that can be held by or attached to the body (here, the left hand of the user) other than on the head of the user.

The HMD 100 can include a base portion 100A and a fixing portion 100B for fixing the base portion 100A to the head of the user (not shown). The base portion 100A can include a display portion (not shown) arranged to face the user's eyes, a sensor portion (not shown) that detects the coordinates and angles of the head of the user and generates motion data indicating such, and a communication portion (not shown) that communicates various data (including motion data, operation data, and the like) among the display portion, the sensor portion, the right-hand controller 102, the left-hand controller 104, and the (input/output interface device 23 of the) terminal device 20. The sensor portion can also include an eye-tracking sensor (not shown) that is provided facing the user's eyeballs so as to directly detect the motion of the user's eyeballs. The eye-tracking sensor may be, for example, a line-of-sight detection sensor configured to input near-infrared light into the iris and detect the reflected light. Such an eye-tracking sensor can generate operation data that indicates the motion of the user's line of sight. By moving the eyeballs, a user wearing such an HMD 100 can cause an object displayed on the display portion (for example, a pointer 630 shown in FIG. 15 or the like) to move, and/or select objects displayed on the display portion (for example, icons 620, 622, 624, or the like, shown in FIG. 15 or the like).

The fixing portion 100B includes a first fixing portion 100B$_1$ having both ends fixed to the base portion 100A and extending in a substantially U shape, and a second fixing portion 100B$_2$ having one end fixed to the base portion 100A and the other end fixed to the first fixing portion $100B_1$. The HMD 100 can be attached to the head of the user by the first fixing portion $100B_1$ and the second fixing portion $100B_2$ surrounding the head of the user and being biased toward the base portion 100A.

The right-hand controller 102 and the left-hand controller 104 can respectively have housings 102A and 104A that exhibit bilaterally symmetrical shapes. The right-hand controller 102 can include, for example, (i) a joystick 102B that can be operated by the finger of the user, and (ii) at least one button (here, for example, buttons 102C, 102D and 102E) that can be pressed by the finger of the user, which are provided on the housing 102A. Furthermore, the right-hand controller 102 can include (i) a sensor portion (not shown) provided inside the housing 102A and configured so as to (a) detect the coordinates and angle of the user's right hand and generate motion data that indicates such and (b) generate operation data that indicates operations executed by the user to the joystick 102B and each of the buttons 102C, 102D and 102E, and (ii) a communication portion (not shown) that communicates various data (including the motion data and the operation data) to the HMD 100.

Similarly, the left-hand controller 104 can include, for example, (i) a joystick 104B that and can be operated by the finger of the user, and (ii) at least one button (here, for example, buttons 104C, 104D and 104E) that can be pressed by the finger of the user, which are provided on the housing 104A. Furthermore, the left-hand controller 104 can include (i) a sensor portion (not shown) provided inside the housing 104A and configured so as to (a) detect the coordinates and angle of the user's right hand and generate motion data that indicates such and (b) generate operation data that indicates operations executed by the user to the joystick 104B and each of the buttons 104C, 104D and 104E, and (ii) a communication portion (not shown) that communicates various data (including the motion data and the operation data) to the HMD 100.

The communication portion of the HMD 100 can send, to the terminal devices 20 or the like, motion data and/or operation data generated by the sensor portion of the HMD 100, motion data and/or operation data generated by the right-hand controller 102, and motion data and/or operation data generated by the left-hand controller 104.

Returning to FIG. 2, in a second aspect, the terminal device 20 can be a terminal device 20 that generates motion data that is based on the second tracking method. In this case, the terminal device 20 (typically a smartphone, tablet, personal computer, or the like) can have at least one camera 24a (and at least one microphone 24b) functioning as the input device 24, and a touch panel functioning as the output device 26 (or may be connected to these devices).

In such a hardware configuration, the central processing unit 21 can sequentially load the commands and data (computer programs) constituting the specific application stored in the auxiliary memory device 25 into the main memory device 22, and operate on the loaded commands and data. Thereby, the central processing unit 21 can control the output device 26 via the input/output interface device 23, or send and receive various data to and from other devices (for example, the server device 30 and/or other terminal devices 20) via the input/output interface device 23 and the communication network 10.

As a result, by executing the specific application that has been installed, the terminal device 20 can execute various operations related to distribution, generation and/or display of videos (including operations and the like described with reference to FIGS. 4A to 4D, FIGS. 5A to 5D, FIGS. 6A to 6D, FIG. 14, FIG. 21 and the like).

The terminal device 20 may include one or more microprocessors and/or graphics processing units (GPUs) in place of or in addition to the central processing unit 21.

4. Hardware Configuration of Server Device 30

Next, the configuration of the server devices 30 used in the communication system 1 described above will be described, also with reference to FIG. 2. As the hardware configuration of each server device 30, for example, the same hardware configuration as that of each terminal device 20 described above can be used. Accordingly, reference numerals for the structural elements of each server device 30 are shown in parentheses in FIG. 2.

As shown in FIG. 2, each server device 30 can include a central processing unit 31, a main memory device 32, an input/output interface device 33, an input device 34, an auxiliary memory device 35, and an output device 36. These devices are connected to each other by a data bus and/or a control bus.

The central processing unit 31, the main memory device 32, the input/output interface device 33, the input device 34, the auxiliary memory device 35, and the output device 36 can be substantially the same as the central processing unit 21, the main memory device 22, the input/output interface device 23, the input device 24, the auxiliary memory device 25 and the output device 26, respectively, included in each of the terminal devices 20 described above.

In such a hardware configuration, the central processing unit 31 can sequentially load the commands and data (computer programs) constituting the specific application stored in the auxiliary memory device 35 into the main memory device 32, and operate on the loaded commands and data. Thereby, the central processing unit 31 can control the output device 36 via the input/output interface device 33, or send and receive various data to and from other devices (for example, other server devices 30 and/or the terminal devices 20) via the input/output interface device 33 and the communication network 10.

As a result, by executing the specific application that has been installed, the server device 30 can execute various operations related to distribution, generation and/or display of videos (including operations and the like described with reference to FIGS. 4A to 4D, FIGS. 5A to 5D, FIGS. 6A to 6D, FIG. 14, FIG. 21, and the like).

The server device 30 may include one or more microprocessors and/or graphics processing units (GPUs) in place of or in addition to the central processing unit 31.

The server device 30 can also function as a web server by executing the above-described specific application that has been installed. This server device 30 can send a web page containing a computer program to each terminal device 20 (and/or other server devices 30) that has accessed this server device 30. By executing the computer program included in the web page, such a terminal device 20 (and/or other server device 30) can execute various operations related to distribution, generation and/or display of videos (including operations and the like described with reference to FIGS. 4A to 4D, FIGS. 5A to 5D, FIGS. 6A to 6D, FIG. 14, FIG. 21, and the like).

5. Platform

Next, an example of a platform realized by the communication network 1 will be described. This platform enables the terminal device of each distributor and the terminal device of each viewer to appropriately display videos, regardless of whether each distributor uses (i) a terminal device 20 that generates and sends motion data that is based on the first tracking method or (ii) a terminal device 20 that generates and sends motion data that is based on the second tracking method.

The following three cases are taken as examples to illustrate the motions executed in this platform. For convenience of explanation, a terminal device 20 that generates and sends motions that are based on the first tracking method is referred to as a "VR terminal device," and a terminal device 20 that generates and sends motions that are based on the second tracking method is referred to as a "smartphone terminal device." However, even a smartphone, tablet, or the like can become a "VR terminal device" by using a plurality of tracking devices (for example, the device shown in FIG. 3) connected thereto.

First case (FIGS. 4A to 4D): A first distributor using a VR terminal device and a second distributor using a smartphone terminal device jointly provide a video to each viewer. After that, one viewer (viewer A) uses a VR terminal device or a smartphone terminal device to provide the video to each viewer in cooperation with the first distributor and the second distributor.

Second case (FIGS. 5A to 5D): A first distributor using a VR terminal device independently provides a video to each viewer. After that, a viewer A uses a VR terminal device or a smartphone terminal device to provide the video to each viewer in cooperation with the first distributor.

Third case (FIGS. 6A to 6D): A second distributor using a smartphone terminal device independently provides a video to each viewer. After that, a viewer A uses the VR terminal device or the smartphone terminal device to provide the video to each viewer in cooperation with the second distributor.

5-1. First Case

First, the first case will be described with reference to FIGS. 4A to 4D. FIGS. 4A to 4D are schematic diagrams explaining the first case regarding provision of videos using the platform realized by the communication system 1 shown in FIG. 1. For convenience, the communication network 10 interposed between each terminal device 20 and the server device 30 is omitted in FIGS. 4A to 4D.

Figure 4A:
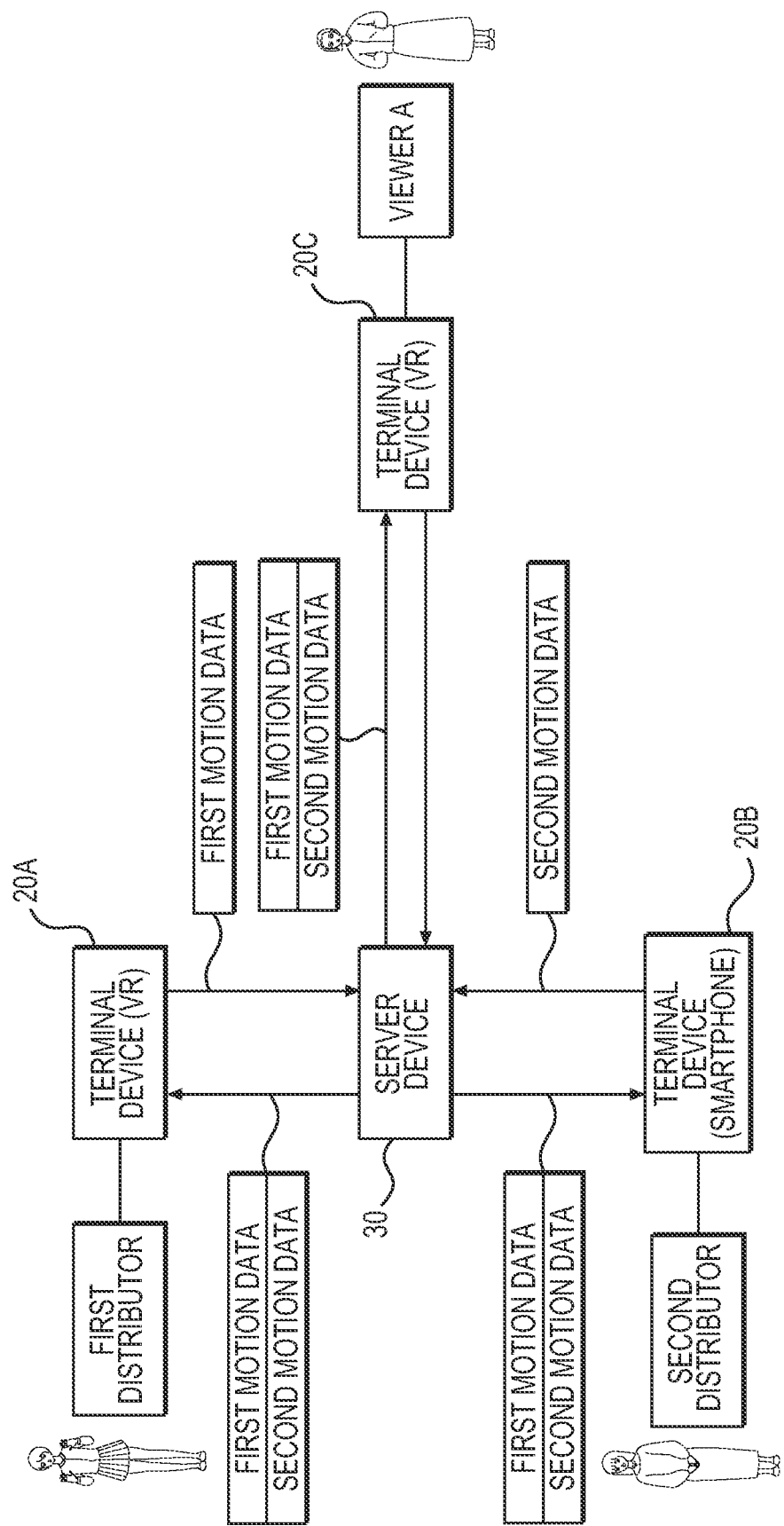
FIG. 4A is a schematic diagram explaining a first case regarding provision of video using a platform realized by the communication system 1 shown in FIG. 1.

(1) Regarding FIG. 4A

Referring to FIG. 4A, the first distributor using the VR terminal device 20A and the second distributor using the smartphone terminal device 20B jointly provide a video to the terminal devices 20 of a plurality of viewers including the terminal device 20C of the viewer A. However, for simplification of the drawings, FIGS. 4A to 4D show only the terminal device 20C of the viewer A, which is a VR terminal device, as the terminal devices 20 of the plurality of viewers.

The terminal device 20A of the first distributor can generate motion data (first motion data) based on the motion of the first distributor using the first tracking method every unit time or at arbitrary timing. The length of the unit time referred to herein may be fixed or variable. This first motion data may include motion data indicating coordinates and angles (orientation) generated by each tracking device included in a plurality of tracking devices attached to the body of the first distributor (for example, in association with a time stamp).

For example, when the terminal device 20A uses the tracking device illustrated in FIG. 3, the first operation data may include, without limitation, the data illustrated below.

Motion data that indicates the coordinates and angle of the head, generated by the HMD 100 (the above-described sensor portion mounted on the HMD 100 can generate motion data showing the coordinates and angle of the head by having a gyro sensor, an acceleration sensor, and/or a geomagnetic sensor.)

Motion data that indicates the coordinates and angle of the right hand, generated by the right-hand controller 102 (the above-described sensor portion mounted on the right-hand controller 102 can generate motion data showing the coordinates and angle of the right hand by having a gyro sensor, an acceleration sensor, and/or a geomagnetic sensor.)

Motion data that indicates the coordinates and angle of the left hand, generated by the left-hand controller 104 (the above-described sensor portion mounted on the left-hand controller 104 can generate motion data showing the coordinates and angle of the left hand by having a gyro sensor, an acceleration sensor, and/or a geomagnetic sensor.)

Operation data that indicates contents of operations executed on the joystick or the like with the right hand, generated by the right-hand controller 102

Operation data that indicates contents of operations executed on the joystick or the like with the left hand, generated by the left-hand controller 104

Furthermore, the terminal device 20A of the first distributor can also generate audio data (first audio data) that is based on speech of the first distributor (for example, using the microphone 24b).

The terminal device 20A can continue to send the first motion data thus generated (and optionally the first audio data) to the server device 30 every unit time or at arbitrary timing.

Meanwhile, the terminal device 20B of the second distributor can generate motion data (second motion data) using the second tracking method based on the motion of the second distributor every unit time or at arbitrary timing. The length of the unit time referred to herein may be fixed or variable. This second motion data includes motion data indicating the depth of each of a plurality of parts of the face and the coordinates and angle of the head (for example, in association with a time stamp), generated by image processing using at least one sensor (the camera 24a or the like). For example, a dot projector emits an infrared laser in a dot (point) pattern onto the face of the user and the near-infrared camera 24a captures the infrared dots projected onto and reflected from the face of the user, to generate an image of the infrared dots thus captured. The terminal device 20B compares the image of the pre-registered dot pattern emitted by the dot projector and the image captured by the near-infrared camera, and can calculate the depth (the distance between the near infrared camera and each point/feature point) of each point (each feature point) using the positional deviation in each point (each feature point) (for example, each of 51 points/feature points) in the two images. The terminal device 20B can generate motion data indicating the depth calculated in this way. Furthermore, the terminal device 20B can generate motion data indicating the coordinates and angle of the head by having a gyro sensor, an acceleration sensor, and/or a geomagnetic sensor.

Furthermore, the terminal device 20B can also generate audio data (second audio data) based on speech of the second distributor (for example, using the microphone 24b).

The terminal device 20B can continue to send the second motion data thus generated (and optionally the second audio data) to the server device 30 every unit time or at arbitrary timing.

The server device 30 can continue to send "one set of motion data" that includes the first motion data (and optionally the first audio data) from the terminal device 20A and the second motion data (and optionally the second audio data) from the terminal device 20B to each of the terminal device 20A, the terminal device 20B, and the terminal device 20 of the viewer A (and also to the terminal devices 20 of the other viewers (not shown)). In this sense, the "one set of motion data" could be said to be the data sent in common to the terminal device 20A, the terminal device 20B, and the terminal device 20 of the viewer A (and to the terminal devices 20 of each of the other viewers, not shown).

The server device 30 can also add the data exemplified below to the "one set of motion data" and send such.

(A) For motion data (and audio data) generated by each of the terminal devices 20 (here, the terminal devices 20A and 20B) of the plurality of distributors, data identifying the terminal device 20 and/or a transmitter that sent that motion data.

(B) For motion data (and audio data) generated by each of the terminal devices 20 (here, terminal devices 20A and 20B) of the plurality of distributors, data indicating whether that motion data was generated in accordance with either the first tracking method or the second tracking method.

By referencing the data (A), each of the terminal devices 20 that has received such "one set of motion data" can identify whether motion data (and audio data) generated by a number of distributors is included in the "one set of motion data." Furthermore, each terminal device 20 can identify in which part of the "one set of motion data" the motion data (and audio data) generated by the terminal device of each distributor is included.

In addition, by referencing the data (B), each terminal device 20 can determine whether the motion data (and audio data) generated by the terminal device of each distributor was generated in accordance with the first tracking method or the second tracking method. Each terminal device 20 recognizes in advance what type of data is included in the motion data (and audio data) generated in accordance with each tracking method. For example, each terminal device 20 recognizes in advance that the motion data generated in accordance with the first tracking method is data and the like indicating the coordinates and angle of the corresponding portion generated by each tracking device (and operation data indicating the content of operations executed by the distributor on the joystick, button, or the like). Similarly, each terminal device 20 recognizes in advance that the motion data generated in accordance with the second tracking method includes data indicating the depth of each of a plurality of parts on the face and the coordinates and angle of the head. Therefore, by referencing the data of (B), each terminal device 20 can recognize and use the content of the motion data generated in accordance with one of the tracking methods generated by the terminal device 20 of each distributor.

In order to be able to extract and use the motion data generated by the terminal device of each distributor from the "one set of motion data" received by each terminal device 20, the server device 30 can add other data at any position in the "one set of motion data."

The terminal device 20A, the terminal device 20B, and the terminal device 20C (terminal devices 20 of other viewers) can generate videos based on the "one set of motion data" received. In the following description, each terminal device 20 can receive and hold, from the server device 30, in advance or at arbitrary timing, drawing data for drawing an avatar in association with avatar identification data that identifies the avatar used by each distributor. Accordingly, by identifying the distributor, each terminal device 20 can identify the avatar used by the distributor, and can generate and display animation of the avatar.

We will first focus on the terminal device 20A.

The terminal device 20A can generate a video including (i) an animation of the avatar of the first distributor (first avatar) based on the first motion data and (ii) an animation of the avatar of the second distributor (second avatar) based on the second motion data. Specifically, since the terminal device 20A is a VR terminal device, this terminal device 20A can generate two types of videos, namely a first video and a second video. The terminal device 20A can extract, by the method described above, each of the first motion data and the second motion data from the one set of motion data received from the server device 30, and use such to generate videos.

The first video may be a video depicted (expressed/represented) from the "viewpoint of the first distributor," arranging the first avatar and the second avatar in a first virtual space (for example, a three-dimensional virtual space). The second video may be a video depicted (expressed) from a viewpoint in the first virtual space (for example, a virtual camera arranged in the first virtual space), arranging the first avatar and the second avatar in the first virtual space. Furthermore, the second video may be a video depicted (expressed) from a "viewpoint common to each viewer." That is, the viewpoint may be a common viewpoint for each viewer.

In another embodiment, this second video may be a video depicted (expressed) from a "viewpoint common to each viewer and each distributor." That is, the viewpoint may be a common viewpoint for each viewer and each distributor.

Figure 7:
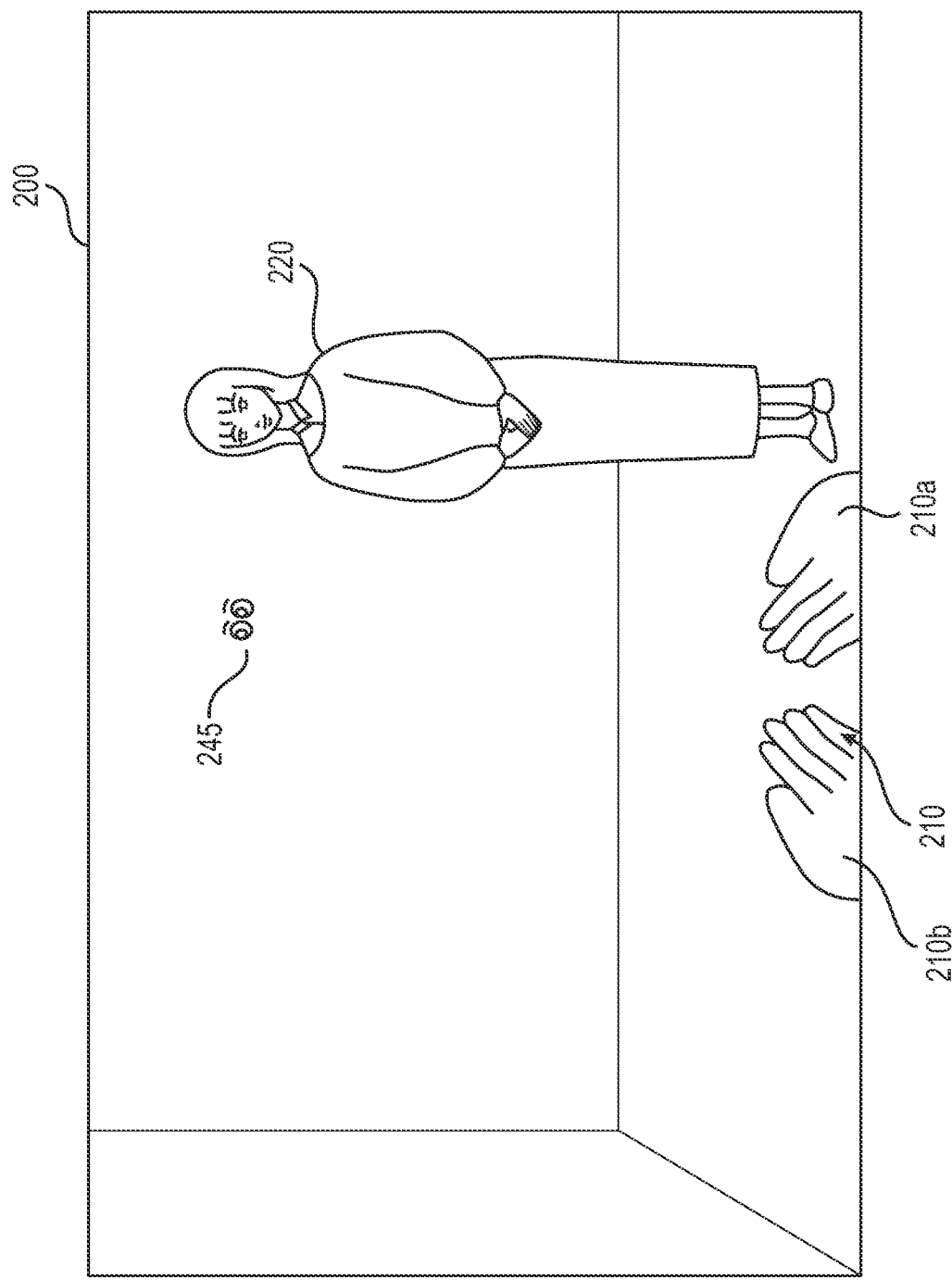
FIG. 7 is a diagram showing an example of a first video displayed by a terminal device of a first distributor in the communication system 1 shown in FIG. 1.

FIG. 7 is a diagram showing an example of the first video displayed by the terminal device of the first distributor in the communication system 1 shown in FIG. 1. As shown in FIG. 7, a first video 200 displayed by the terminal device 20A of the first distributor can include (i) a first avatar 210 of the first distributor that operates in accordance with the first motion data, and (ii) a second avatar 220 of the second distributor that operates in accordance with the second motion data. Here, the first video 200 does not include the avatar of the viewer A (third avatar).

The first video 200 may be a video that depicts the first virtual space from the viewpoint of the first avatar 210 arranged in the first virtual space (that is, from the viewpoint of the first distributor). The current position of the first avatar 210 in the first virtual space and the angle at which the first avatar 210 is facing, and the like, can be determined and change in accordance with the first motion data included in the one set of video data received from server device 30 (or the first motion data that is generated by the terminal device 20A and temporarily stored).

For example, when the first distributor rotates the head rightward (or leftward) by 15 degrees, the terminal device 20A can include, in the motion data, data indicating the angle of the head rotated rightward (or leftward) by 15 degrees. Accordingly, the terminal device 20A updates the angle of the head of the first avatar 210, thereby causing the angle at which the first avatar 210 faces in the first video 200 to rotate rightward (or leftward) by 15 degrees. Also, when the first distributor lifts the right-hand controller 102 and the left-hand controller 104 in front of his chest, the terminal device 20A can include, in the motion data, data indicating the changed coordinates of the right hand and left hand. Accordingly, the terminal device 20A updates the coordinates of the right hand and left hand of the first avatar 210, so that the right hand 210a and the left hand 210b of the first avatar 210 are lifted and depicted in the first video 200 as illustrated in FIG. 7. Furthermore, when the first distributor presses the button 102E of the right-hand controller 102 (or the button 104E of the left-hand controller 104), the terminal device 20A can include, in the video data, data indicating the advanced (or updated) coordinates of the head. Accordingly, the terminal device 20A updates the coordinates at which the first avatar 210 is positioned, so that the viewpoint of the first avatar 210 advances (or retreats) in the first video 200. Along with this, the second avatar 220 is depicted larger (or smaller) in the first video 200.

In the first video 200, the second avatar 220 moves in accordance with the second motion data in the same manner as the first avatar 210 moves in accordance with the first motion data. However, since the terminal device 20B of the second distributor is a smartphone terminal device, the second motion data generated by the terminal device 20B is motion data generated based on the second tracking method (motion data indicating the depth of each of a plurality of parts of the face and the coordinates and angle of the head). Therefore, in the first video 200, the head of the second avatar 220 moves (for example, shaking the head left and right) based on the second motion data (for example, data indicating the coordinates and angle of the head). Also, the facial expression of the second avatar 220 changes based on the second motion data (data indicating the depth of each of a plurality of parts of the face). Furthermore, the direction in which the second avatar 220 faces changes based on the second motion data (data indicating the coordinates and angle of the head). However, the position of the second avatar 220 does not change.

The object 245 illustrated in FIG. 7 will be described later in "5-4. Modifications."

Figure 8:
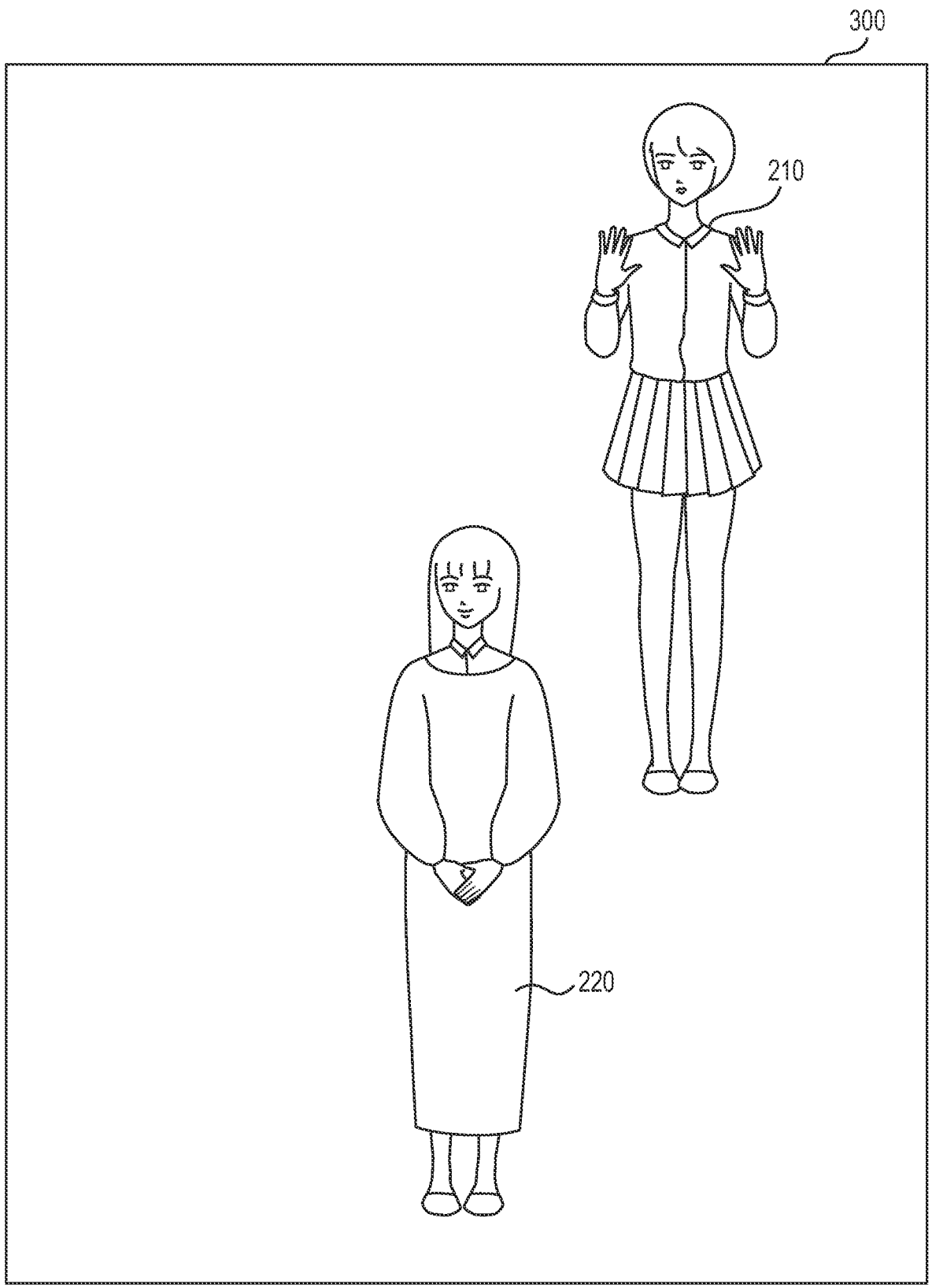
FIG. 8 is a diagram showing an example of a second video displayed by the terminal device of the first distributor in the communication system 1 shown in FIG. 1.

FIG. 8 is a diagram showing an example of a second video displayed by the terminal device of the first distributor in the communication system 1 shown in FIG. 1. As illustrated in FIG. 8, a second video 300 includes (i) the first avatar 210 of the first distributor, moving in accordance with the first motion data, and (ii) the second avatar 220 of the second distributor, moving in accordance with the second motion data 220, but does not include the avatar of the viewer A (third avatar).

The second video 300 is a video depicting the first virtual space from a viewpoint common to all of the plurality of viewers (including the viewer A). The common viewpoint referred to here can be a viewpoint viewed from an arbitrary point (a virtual camera or the like installed at this point) in the above-described first virtual space. For simplicity, FIG. 8 shows an example in which the second video 300 is depicted with both the first avatar 210 and the second avatar 220 viewed from the front, but depending on the position of the viewpoint placed in the first virtual space, the first avatar 210 and/or the second avatar 220 may face sideways or backward in the second video 300. In one embodiment, the second video 300 may be generated such that both the first avatar 210 and the second avatar 220 face the front regardless of the position of the viewpoint placed in the first virtual space.

Since the first motion data is generated in accordance with the first tracking method, the position in the first virtual space of the first avatar 210 moving based on this first motion data can change, and the direction in which the first avatar 210 faces can also change. Therefore, in the second video 300, the position of the first avatar 210 can change, and the direction in which the first avatar 210 faces can also change. In contrast, since the second motion data is generated in accordance with the second tracking method, the coordinates in the first virtual space of the second avatar 220 moving based on this second motion data do not change. Therefore, the position of the second avatar 220 does not change in the second video 300 (however, in the second video 300, the facial expression and the like of the second avatar 220 may change based on the second motion data).

For this reason, in one embodiment, as illustrated in FIG. 8, the second avatar 220 whose position in the first virtual space is fixed is placed in the front row, and the first avatar 210 whose position in the first virtual space changes is placed in the back row behind the front row. Further, in one embodiment, as illustrated in FIG. 8, the first avatar 210 placed in the back row may be placed in a higher position than the second avatar 220 placed in the front row. In this way, by arranging a plurality of avatars in rows corresponding to their characteristics among a plurality of rows (front row and back row), each of this plurality of avatars can be easy to see for each user (the first distributor, the second distributor, each viewer). In another embodiment, opposite to the above, the first avatar 210 can be placed in the front row, and the second avatar 220 can be placed in the back row.

In one embodiment, on a display portion (HMD 100 or the like) that is the output device 26, the terminal device 20A displays, in mutually differing areas, (i) the first video 200 described above with reference to FIG. 7, and (ii) the second video 300 described above with reference to FIG. 8. For example, the terminal device 20A can display the first video 200 in part of the area such as the right portion, the left portion, the upper portion, or the lower portion of a specific area included in the display area formed by the display portion, and can display the second video 300 in the remaining area of the specific area. In another preferred embodiment, as illustrated in FIG. 9, the terminal device 20A can also display the second video 300 inside an area in which the first video 200 is displayed.

Figure 9:
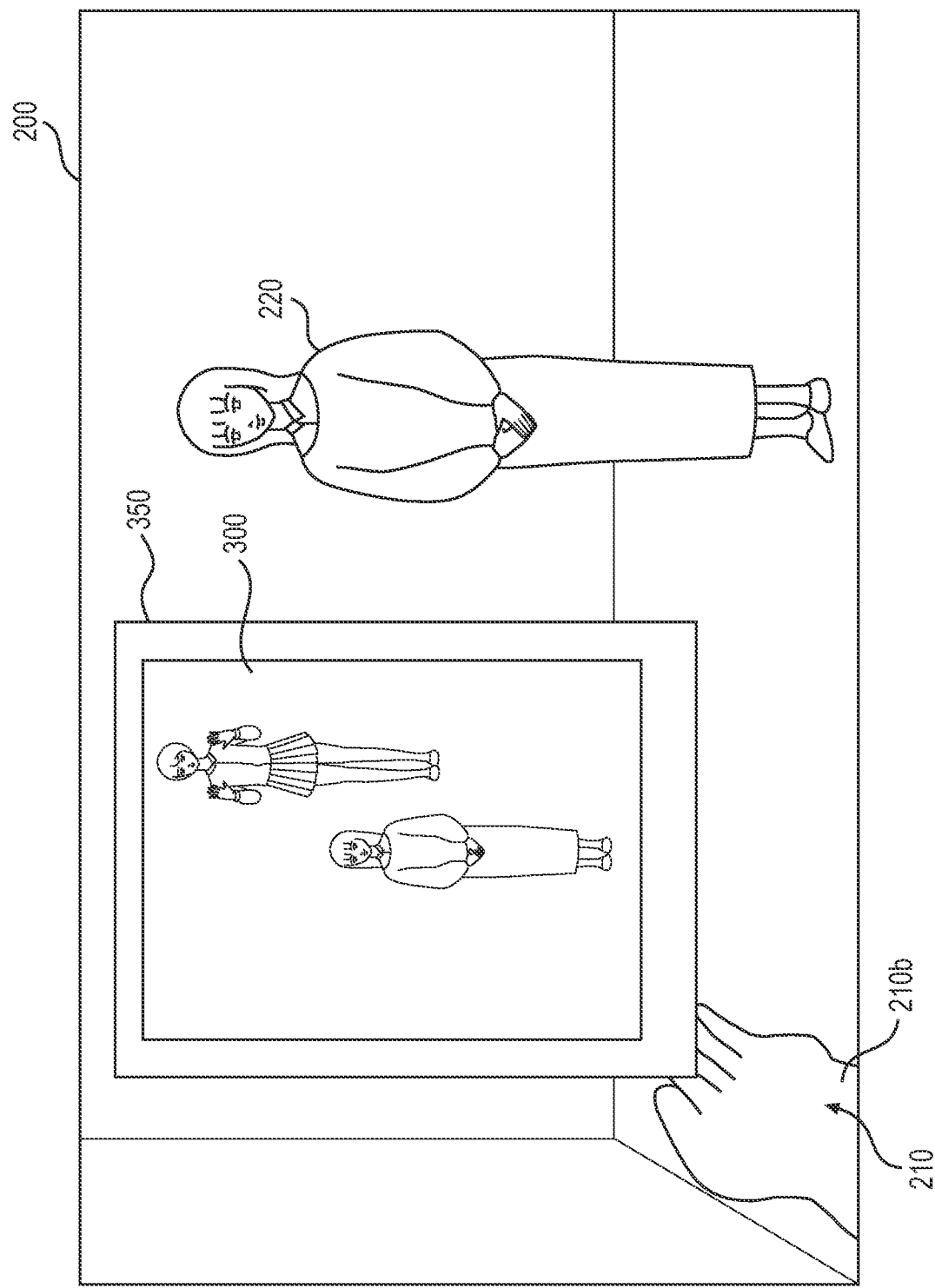
FIG. 9 is a diagram showing another example of the first video and the second video displayed by the terminal device of the first distributor in the communication system 1 shown in FIG. 1.

FIG. 9 is a diagram showing another example of the first video and the second video displayed by the terminal device of the first distributor in the communication system 1 shown in FIG. 1. As shown in FIG. 9, the terminal device 20A can display the second video 300 in combination with the first video 200, for example, inside the area where the first video 200 is displayed. Specifically, the terminal device 20A can movably display the second video 300 in conjunction with a portion (here, the left hand 210b) of the first avatar 210 included in the first video 200. In this case, when the first distributor moves the left hand holding the left-hand controller 104, the left hand 210b of the first avatar 210 included in the first video 200 moves accordingly. In conjunction with the left hand 210b, the second video 300 (depicted as though) held in the left hand 210b can also move. In one embodiment, the second video 300 may be displayed as a terminal device (pseudo (virtual) terminal device) that is displayed in a pseudo manner in the first video 200.

Returning to FIG. 4A, we will next focus on the terminal device 20B.

The terminal device 20B can generate a video including (i) an animation of the avatar of the first distributor (the first avatar) based on the first motion data, and (ii) an animation of the avatar of the second distributor (the second avatar) based on the second motion data. Specifically, since the terminal device 20A is a smartphone terminal device, it can generate the second video. The terminal device 20B can extract each of the first motion data and the second motion data from the one set of motion data received from the server device 30 by the method described above, and use such in generating videos.

The second video may be, as described above, a video in which the first avatar and the second avatar are placed in the first virtual space, and depicted (expressed) from a viewpoint (for example, a virtual camera placed in the first virtual space) in the first virtual space. Furthermore, this second video may be a video that is depicted (expressed) from a "viewpoint common to each viewer." Here, the "one set of motion data" received by the terminal device 20B from the server device 30 is the same as the "one set of motion data" received by the terminal device 20A from the server device 30. Also, the method by which the terminal device 20B generates the second video is the same as the above-described method by which the terminal device 20A generates the second video. Accordingly, the second video generated by the terminal device 20B can be substantially the same as the second video 300 (see FIG. 8) generated by the terminal device 20A. Therefore, the terminal device 20B can display the second video 300 as illustrated in FIG. 8 on a touch panel, display, or the like, which is the output device 26.

Referring to FIG. 4A again, we will next focus on the terminal device 20C.

The terminal device 20C can generate a video including (i) an animation of the avatar of the first distributor (the first avatar) based on the first motion data, and (ii) an animation of the avatar of the second distributor (the second avatar) based on the second motion data. Specifically, since the terminal device 20C, is a VR terminal device, it can generate two types of videos, namely a first video and a second video, like the terminal device 20A described above. The terminal device 20A can extract each of the first motion data and the second motion data by the method described above from the one set of motion data received from the server device 30, and use such in generating videos.

The first video may be a video depicted (expressed) from the "viewpoint of viewer A" with the first avatar and the second avatar placed in the first virtual space (for example, a three-dimensional virtual space).

Figure 10:
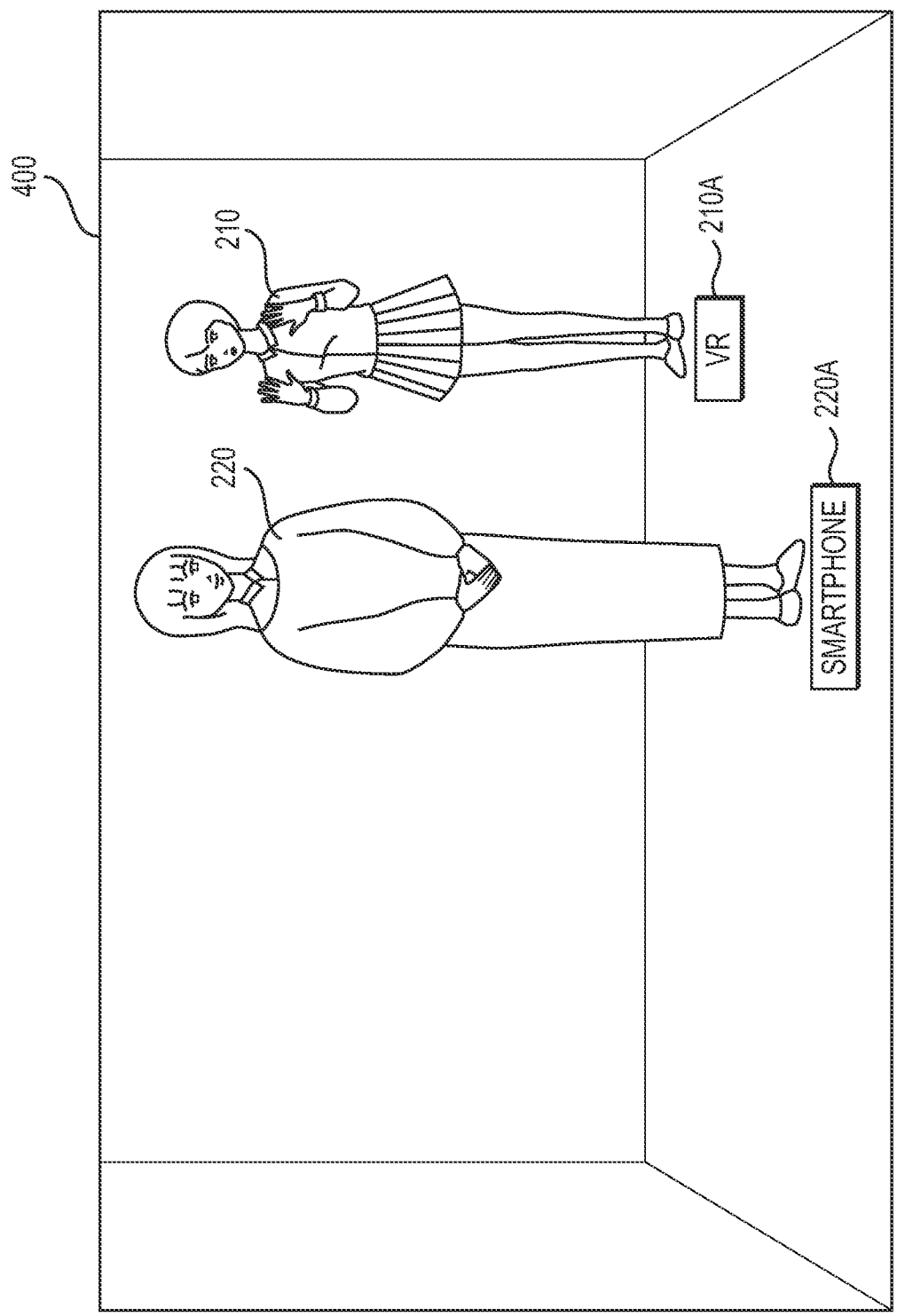
FIG. 10 is a diagram showing an example of a first video displayed by a terminal device of a viewer A in the communication system 1 shown in FIG. 1.

FIG. 10 is a diagram showing an example of a first video displayed by a terminal device of the viewer A in the communication system 1 shown in FIG. 1. As shown in FIG. 10, a first video 400 displayed by the terminal device 20C of the viewer A can include (i) the first avatar 210 of the first distributor that moves in accordance with the first motion data, and (ii) the second avatar 220 of the second distributor that moves in accordance with the second motion data. Here, the first video 400 does not display the avatar (the third avatar) of the viewer A.

Since the terminal device 20C is a VR terminal device, it can generate motion data (third motion data) using the first tracking method based on the motion of the viewer A who is the user of the terminal device 20C.

The first video 400 can be a video that depicts the first virtual space from the viewpoint of the third avatar of the viewer A (that is, the viewpoint of the viewer A) placed in the first virtual space. The current position of the third avatar in the first virtual space, the angle at which the third avatar faces, and the like (that is, the viewpoint of the third avatar used in the first video 400 or of the viewer A) are determined and changed in accordance with the third motion data. This point is the same as the first video 200 generated by the terminal device 20A described above.

For example, when the viewer A rotates the head rightward (or leftward) by 15 degrees, the angle at which the third avatar faces (and thus the viewpoint of the third avatar) in the first video 400 is rotated rightward (or leftward) by 15 degrees. Also, when the viewer A lifts the right-hand controller 102 and the left-hand controller 104 to in front of his chest, the right hand and left hand of the third avatar are depicted as being lifted in the first video 400 as described above. Furthermore, when the viewer A presses the button 102E of the right-hand controller 102 (or the button 104E of the left-hand controller 104), the viewpoint of the third avatar advances (or retreats), and accordingly, the first avatar 210 and the second avatar 220 are depicted larger (or smaller) in the first video 400.

In the first video 400, the first avatar 210 moves in accordance with the first motion data. Since the terminal device 20A of the first distributor is a VR terminal device, the first motion data generated by the terminal device 20A is motion data generated based on the first tracking method. Therefore, in the first video 400, the position of the first avatar 210, the direction in which the first avatar 210 faces, and the like, may change based on the first motion data.

In contrast to the first video 200 (FIG. 7) generated by the terminal device 20A, in the first video 400 (FIG. 10) generated by the terminal device 20C, the entirety of the first avatar 210 of the first distributor can be displayed. This is because the first video 400 depicts the first virtual space from the viewpoint of the viewer A (the third avatar).

Also, in the first video 400, the second avatar 220 moves in accordance with the second motion data. However, since the terminal device 20B of the second distributor is a smartphone terminal device, the second motion data generated by the terminal device 20B is motion data generated based on the second tracking method (motion data indicating the depth of each of a plurality of parts of the face, and the coordinates and angle of the head). Therefore, in the first video 400, the head of the second avatar 220 moves (for example, shaking the head left and right) based on the second motion data, but the position of the second avatar 220 does not change.

As described above, the second video can be a video depicted (expressed) from a certain viewpoint in the first virtual space, with the first avatar and the second avatar placed in the first virtual space. Furthermore, this second video may be a video that is depicted (expressed) from the "viewpoint common to each viewer." Here, the "one set of motion data" received by the terminal device 20C from the server device 30 is the same as the "one set of motion data" received by the terminal devices 20A and 20B from the server device 30. Also, the method by which the terminal device 20C generates the second video is the same as the method by which the terminal devices 20A and 20B described above generate the second video. Accordingly, the second video generated by the terminal device 20C can be substantially the same as the second video 300 (see FIG. 8) generated by the terminal devices 20A and 20B. Therefore, the terminal device 20C can display the second video 300 as illustrated in FIG. 8 on the HMD 100 or the like that is the output device 26.

In addition, the terminal device 20C can also display a combination of the first video 400 and the second video 300 in the same manner as the terminal device 20A described above. The method described above with reference to FIG. 9 in relation to the terminal device 20A can be similarly applied to the first video 400 and the second video 300 displayed by the terminal device 20C.

Figure 4B:
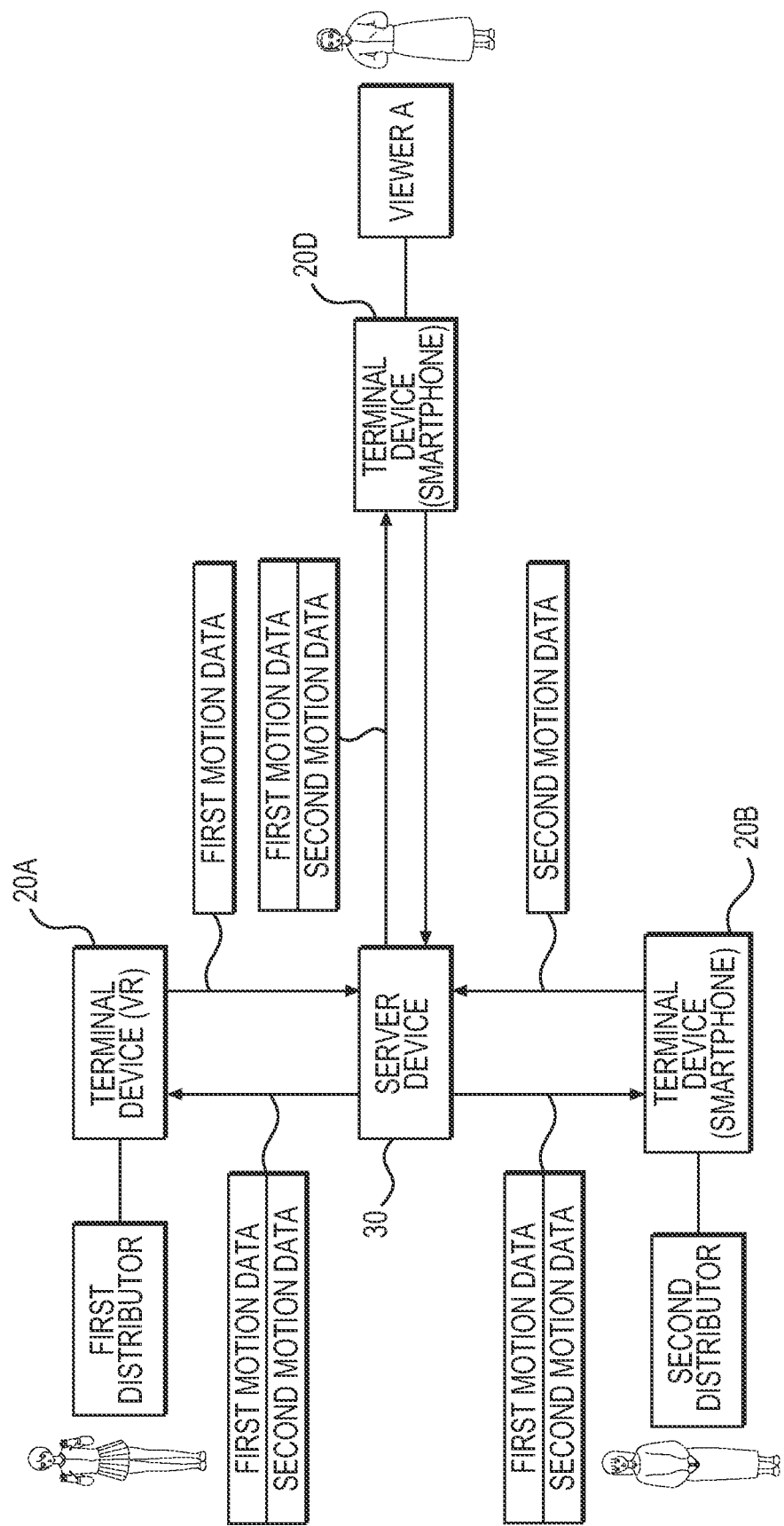
FIG. 4B is a schematic diagram explaining the first case regarding provision of video using the platform realized by the communication system 1 shown in FIG. 1.

(2) Regarding FIG. 4B

Referring to FIG. 4B, the first distributor using the VR terminal device 20A and the second distributor using the smartphone terminal device 20B jointly provide a video to the terminal devices 20 of a plurality of viewers including the terminal device 20C of the viewer A. FIG. 4B differs from FIG. 4A only in that the viewer A uses terminal device 20D, which is a smartphone terminal device, instead of the terminal device 20C (FIG. 4A), which is a VR terminal device.

The operations executed by the terminal device 20A (including displaying two types of video) and the operations executed by the terminal device 20B (including displaying one type of video) are the same as those described above with reference to FIG. 4A.

The terminal device 20D can generate a video including (i) an animation of the avatar (first avatar) of the first distributor based on the first motion data, and (ii) an animation of the avatar (second avatar) of the second distributor based on the second motion data. Specifically, since the terminal device 20D, is a smartphone terminal device, it can generate the second video. The terminal device 20D can extract each of the first motion data and the second motion data from the one set of motion data received from the server device 30 by the method described above, and use such in generating a video.

Unlike the terminal device 20C shown in FIG. 4A, the terminal device 20D can display the second video instead of the first video. As described above, the second video may be a video in which the first avatar and the second avatar are placed in the first virtual space, and depicted (expressed) from a viewpoint in the first virtual space. Furthermore, this second video may be a video that is depicted (expressed) from the "viewpoint common to each viewer." Here, the "one set of motion data" received by the terminal device 20D from the server device 30 is the same as the "one set of motion data" received by the terminal device 20A from the server device 30. Also, the method by which the terminal device 20D generates the second video is the same as the above-described method by which the terminal device 20A generates the second video. Accordingly, the second video generated by the terminal device 20D can be substantially the same as the second video 300 (see FIG. 8) generated by the terminal device 20A. Therefore, the terminal device 20D can display the second video 300 as illustrated in FIG. 8 on the touch panel, display, or the like, which is the output device 26.

Figure 4C:
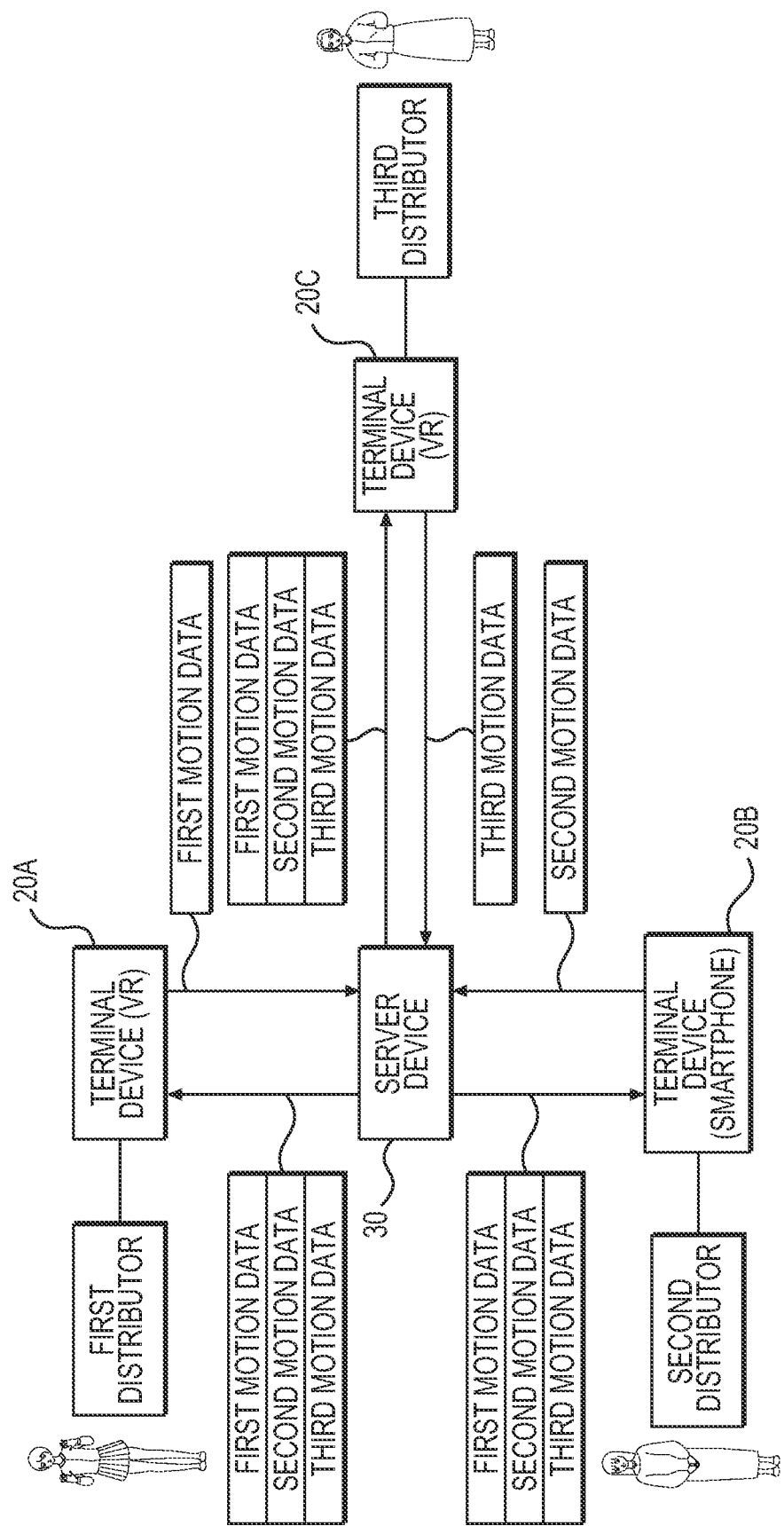
FIG. 4C is a schematic diagram explaining the first case regarding provision of video using the platform realized by the communication system 1 shown in FIG. 1.

(3) Regarding FIG. 4C

FIG. 4C, shows a situation in which the aspect shown in FIG. 4A has transitioned to an aspect in which the viewer A who is the user of the terminal device 20C provides, as a third distributor, the video jointly with the first distributor and the second distributor.

FIG. 4C differs from FIG. 4A in that the terminal device 20C, which is a VR terminal device, sends to the server device 30 third motion data generated using the first tracking method based on the motion of the third distributor. As a result, the server device 30 continues to send to the terminal device 20A, the terminal device 20B, the terminal device 20C, and the terminal device 20 of each viewer (not shown) one set of motion data that includes the first motion data, the second motion data and the third motion data.

We will now focus on the terminal device 20A.

The terminal device 20A can generate a video that includes (i) an animation of the avatar of the first distributor (the first avatar) based on the first motion data, (ii) an animation of the avatar of the second distributor (the second avatar) based on the second motion data, and (iii) an animation of an avatar of a third distributor (the third avatar) based on the third motion data. Specifically, since the terminal device 20A is a VR terminal device, it generate two types of videos, namely the first video and the second video. The terminal device 20A can extract, by the method described above, each of the first motion data, the second motion data, and the third motion data from the one set of motion data received from the server device 30, and use such in generating the videos.

Figure 11:
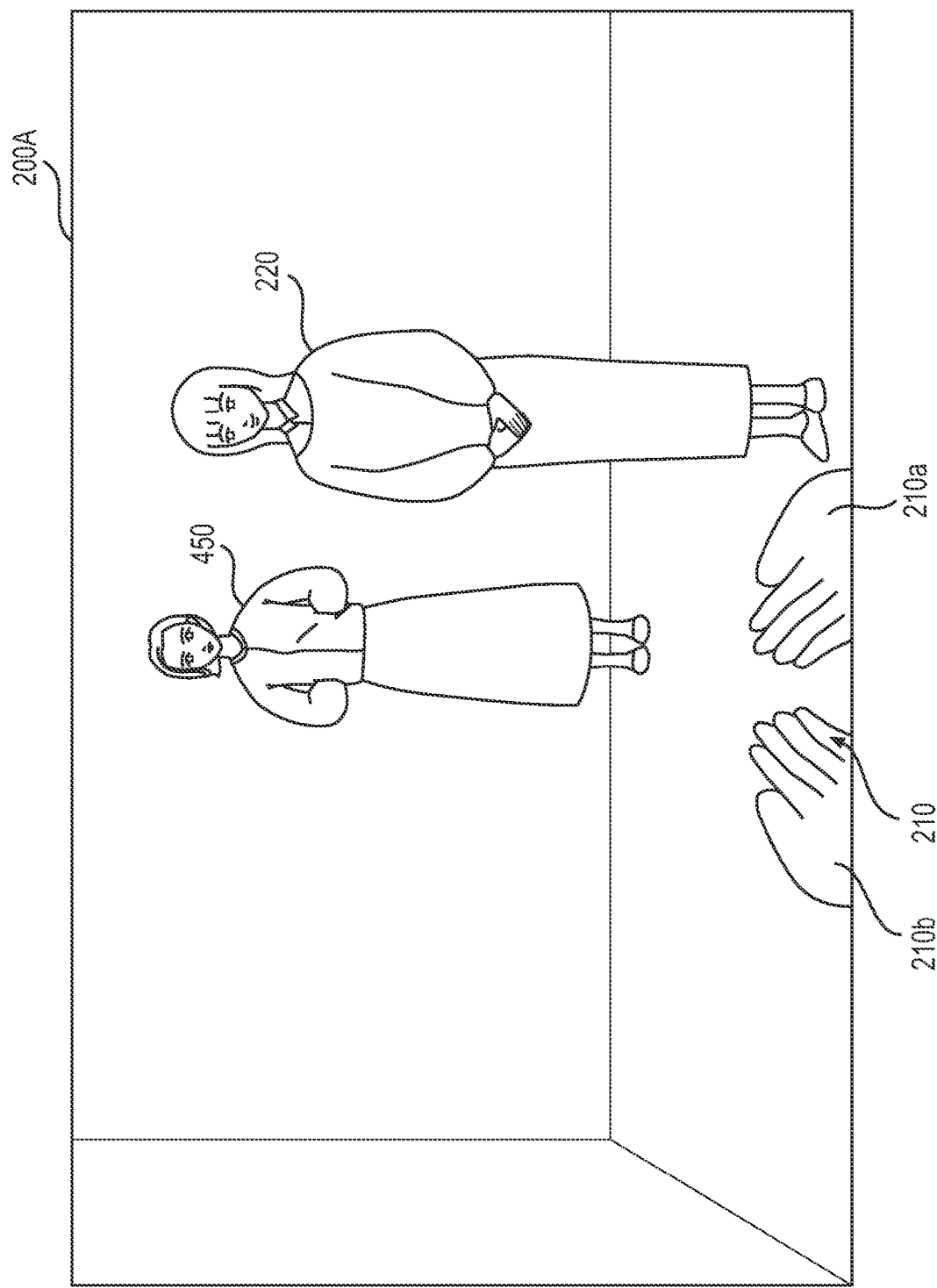
FIG. 11 is a diagram showing another example of the first video displayed by the terminal device of the viewer A in the communication system 1 shown in FIG. 1.

FIG. 11 is a diagram showing another example of the first video displayed by the terminal device of the first distributor in the communication system 1 shown in FIG. 1. As shown in FIG. 11, the first video 200A displayed by the terminal device 20A of the first distributor includes (i) the first avatar 210 of the first distributor that moves in accordance with the first motion data, (ii) the second avatar 220 of the second distributor that moves in accordance with the second motion data, and (iii) a third avatar 450 that moves in accordance with the third motion data.

The method of generating or displaying the second avatar 220 in the first video 200A is the same as in the first video 200, so description thereof will be omitted.

In the first video 200A, the third avatar 450 moves in accordance with the third motion data. Because the terminal device 20C of the third distributor is a VR terminal device, the third motion data generated by the terminal device 20C is motion data generated based on the first tracking method. Therefore, in the first video 200A, the position of the third avatar 450, the direction in which the third avatar 450 faces, and the like, can change based on the third motion data.

Figure 12:
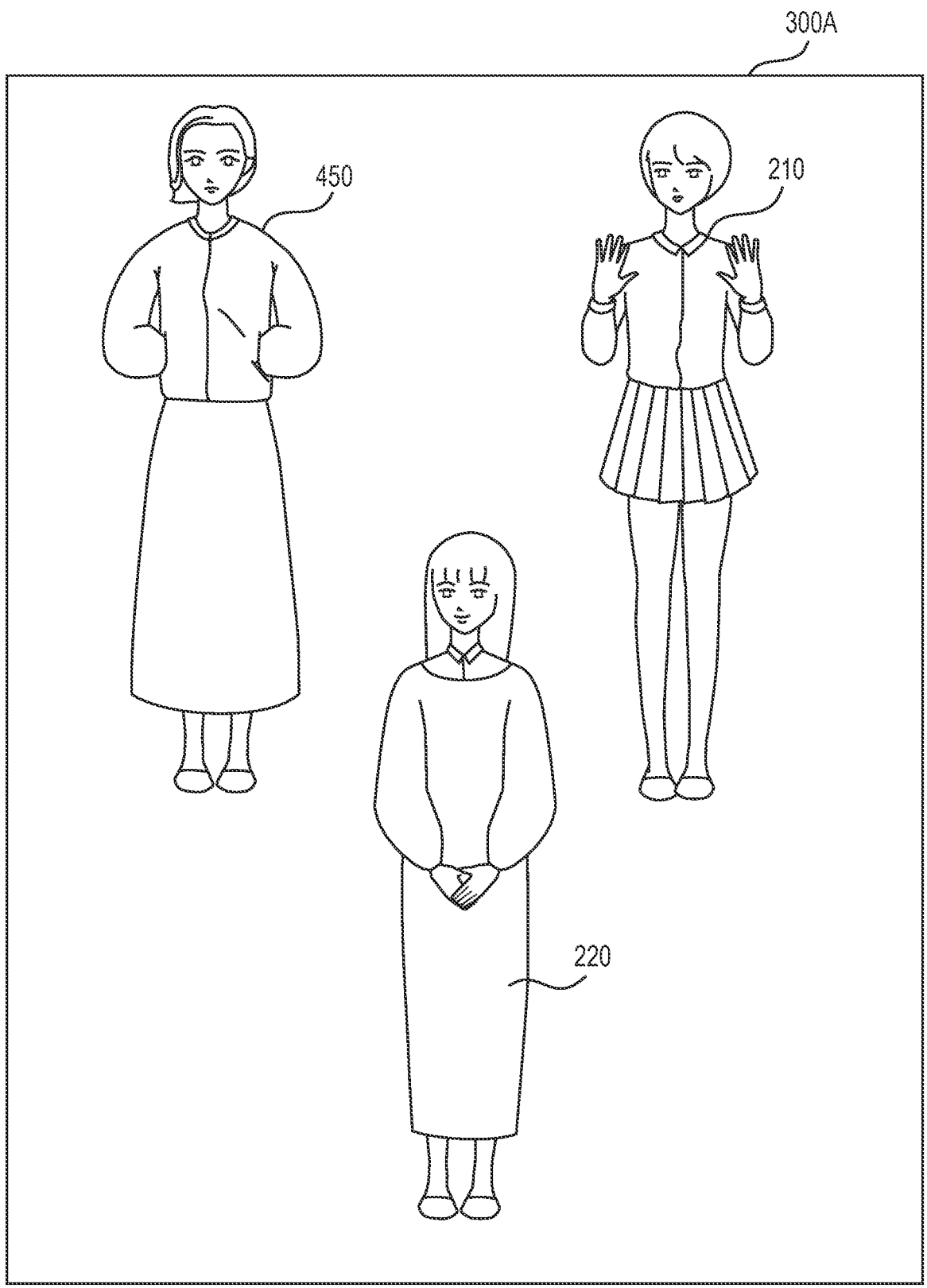
FIG. 12 is a diagram showing another example of the second video displayed by the terminal device of the first distributor in the communication system 1 shown in FIG. 1.

FIG. 12 is a diagram showing another example of the second video displayed by the terminal device of the first distributor in the communication system 1 shown in FIG. 1. As illustrated in FIG. 12, the second video 300A can include (i) the first avatar 210 of the first distributor that moves in accordance with the first motion data, (ii) the second avatar 220 of the second distributor that moves in accordance with the second motion data, and (iii) the third avatar 450 of the third distributor that moves in accordance with the third motion data.

The second video 300A differs from second video 300 shown in FIG. 8 in that the second video 300A includes the third avatar 450 (other points are as described above in relation to the second video 300).

Since the third motion data is generated according to the first tracking method, the position in the first virtual space of the third avatar 450 that moves based on this third motion data can change, and the direction in which the third avatar 450 faces can also change. Therefore, in the second video 300A, the position of the third avatar 450 can change, the direction in which the third avatar 450 faces, and the like can also change.

In addition, it is preferable that the third avatar 450 be placed in the back row together with the first avatar 210 for the reasons described above in relation to the second video 300.

Returning to FIG. 4C, we will next focus on the terminal device 20B.

Since the terminal device 20B, is a smartphone terminal device, it can generate the second video.

The second video generated by the terminal device 20B is substantially the same as the second video (FIG. 12) generated by the terminal device 20A, as described above.

Next, we will focus on the terminal device 20C.

The terminal device 20C can generate a video including (i) an animation of the avatar of the first distributor (the first avatar) based on the first motion data, (ii) an animation of the avatar of the second distributor (the second avatar) based on the second motion data, and (iii) an animation of the avatar of the third distributor (the third avatar) based on the third motion data. Specifically, since the terminal device 20C, is a VR terminal device, it can generate two types of videos, namely the first video and the second video. The terminal device 20C can extract each of the first motion data, the second motion data, and the third motion data from the one set of motion data received from the server device 30 by the above-described method, and use them in generating the videos.

Figure 13:
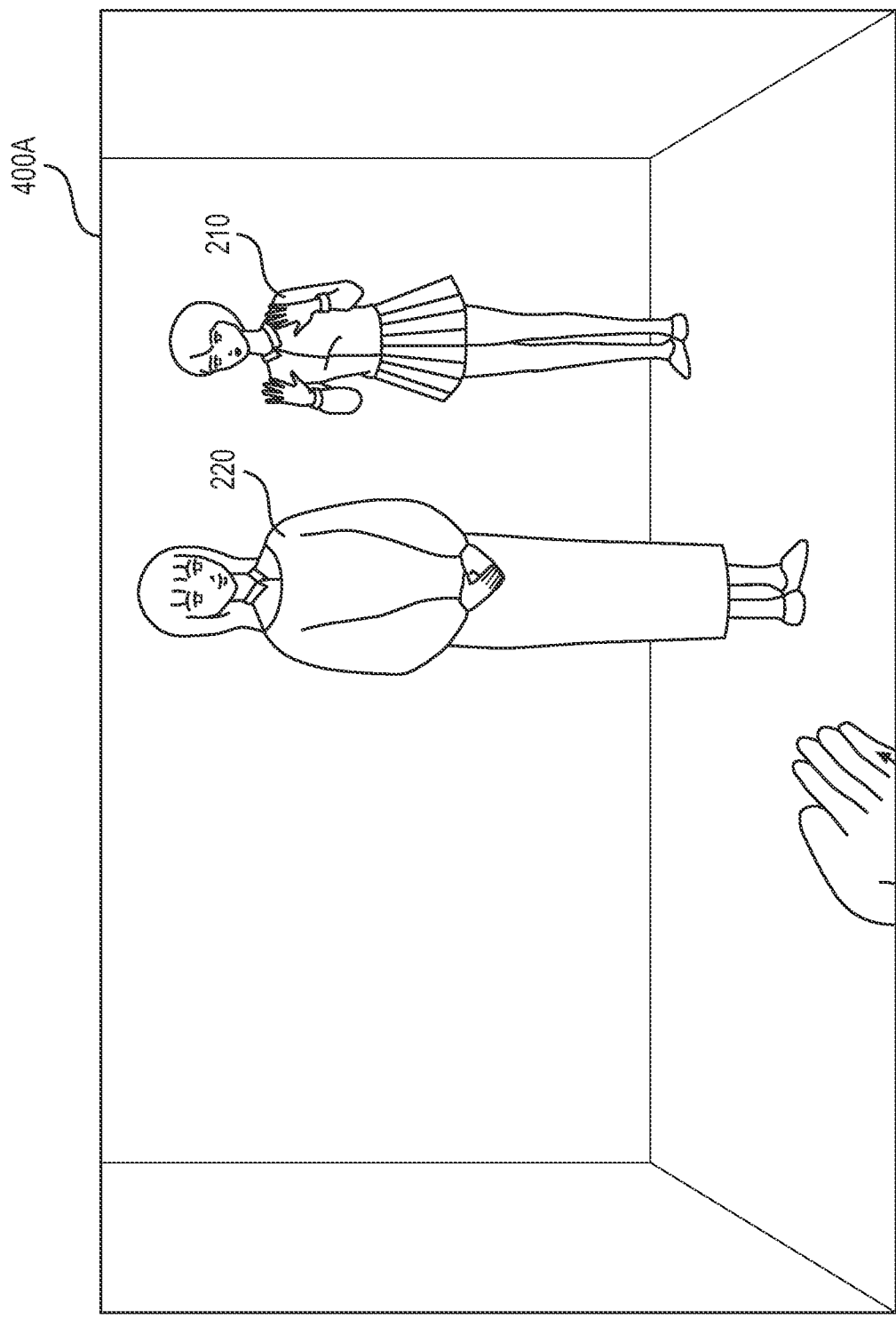
FIG. 13 is a diagram showing an example of a first video displayed by a terminal device of a third distributor in the communication system 1 shown in FIG. 1.

FIG. 13 is a diagram showing an example of the first video displayed by the terminal device of the third distributor in the communication system 1 shown in FIG. 1. The first video 400A generated by the terminal device 20C differs from the first video 400 (FIG. 10) generated by the terminal device 20C described above in that the first video 400A includes the third avatar 450 that moves in accordance with the third motion data. FIG. 13 shows an example in which a portion (left hand 450a) of the third avatar 450 is displayed in the first video 400A. As the third distributor lifts the left hand holding the left-hand controller 104, the left hand 450a is depicted as lifted in the first video 400A, as illustrated in FIG. 13. As described above in relation to the first video 400, the viewpoint of the third avatar 450 or the third distributor in the first video 400A can change according to the third motion data.

The second video displayed on the terminal device 20C is substantially the same as the second video (FIG. 12) displayed by the terminal devices 20A and 20B, for the reasons described above.

Figure 4D:
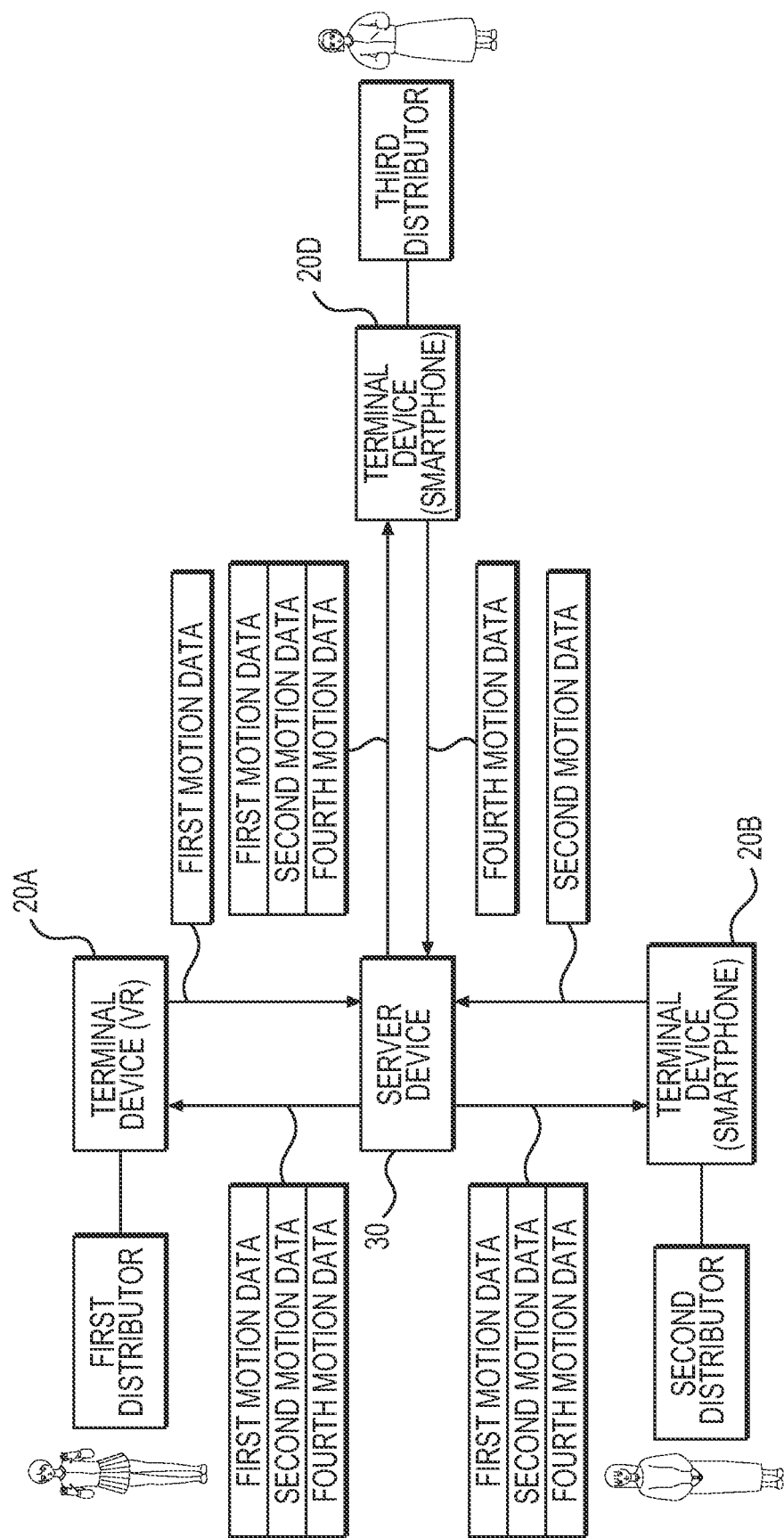
FIG. 4D is a schematic diagram explaining the first case regarding provision of video using the platform realized by the communication system 1 shown in FIG. 1.
Figure 6A:
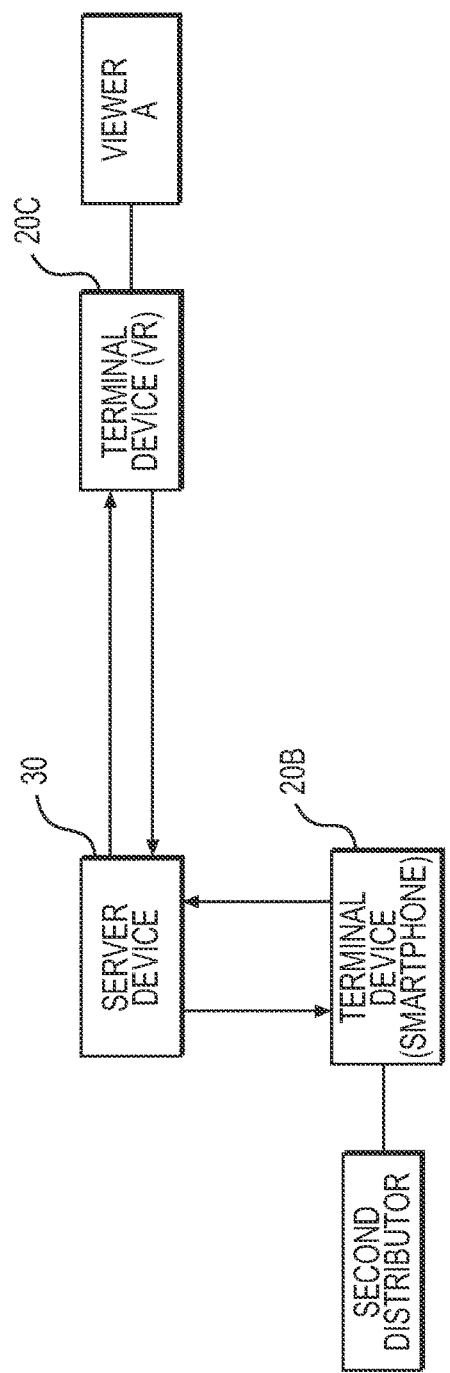
FIG. 6A is a schematic diagram explaining a third case regarding provision of video using the platform realized by the communication system 1 shown in FIG. 1.
Figure 6B:
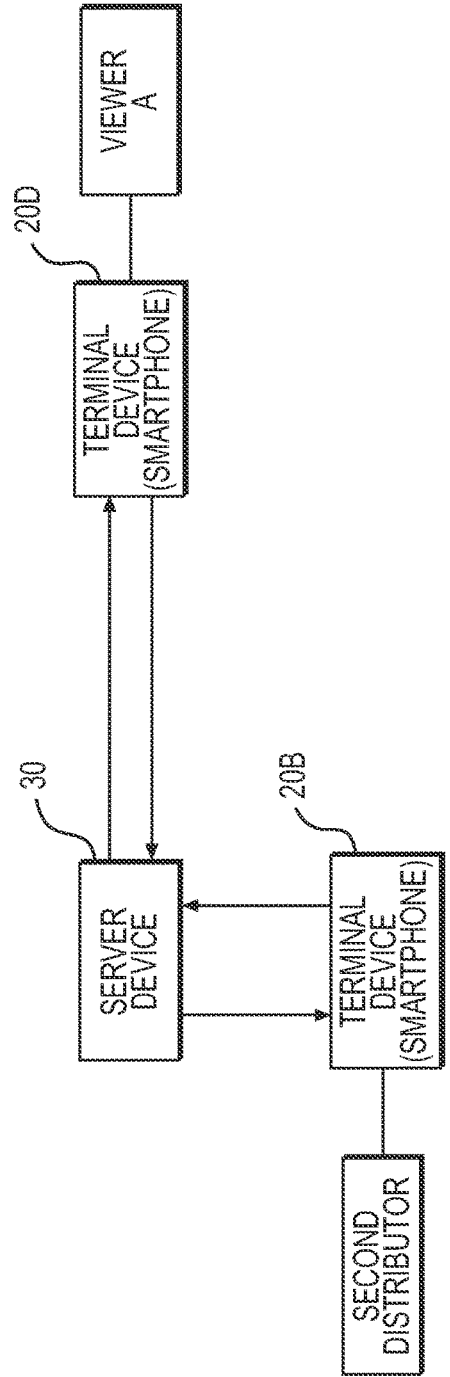
FIG. 6B is a schematic diagram explaining the third case regarding provision of video using the platform realized by the communication system 1 shown in FIG. 1.
Figure 6C:
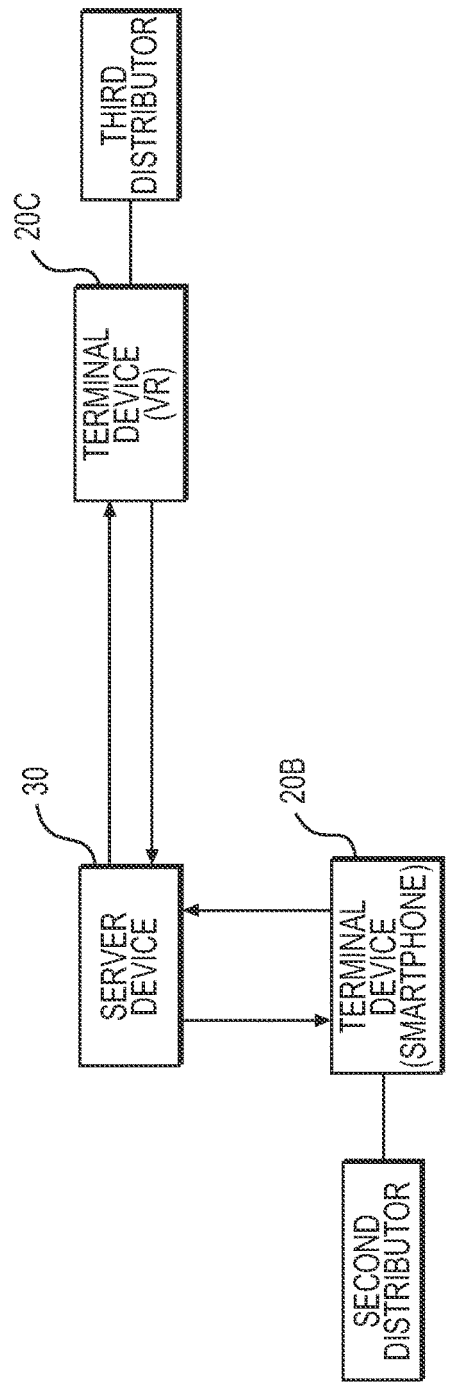
FIG. 6C is a schematic diagram explaining the third case regarding provision of video using the platform realized by the communication system 1 shown in FIG. 1.
Figure 6D:
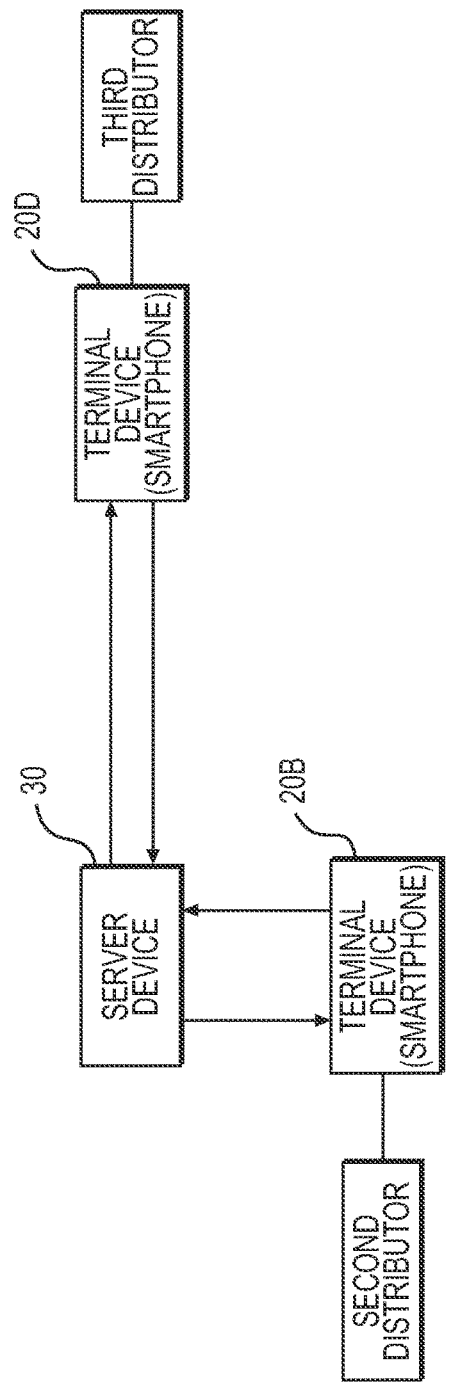
FIG. 6D is a schematic diagram explaining the third case regarding provision of video using the platform realized by the communication system 1 shown in FIG. 1.

(4) Regarding FIG. 4D

FIG. 4D shows the situation of transitioning from the aspect shown in FIG. 4B to an aspect in which the viewer A who is the user of the terminal device 20C provides, as a third distributor, a video jointly with the first distributor and the second distributor.

FIG. 4D differs from FIG. 4B in that the terminal device 20D, which is a smartphone terminal device, sends to the server device 30 fourth motion data generated using the second tracking method based on the motion of the third distributor. As a result, the server device 30 continues to send to the terminal device 20A, the terminal device 20B, the terminal device 20D, and the terminal device 20 of each viewer (not shown) one set of motion data that includes the first motion data, the second motion data and the fourth motion data.

We will now focus on the terminal device 20A.

The terminal device 20A can generate a video that includes (i) an animation of the avatar of the first distributor (the first avatar) based on the first motion data, (ii) an animation of the avatar of the second distributor (the second avatar) based on the second motion data, and (iii) an animation of the avatar of a third distributor (the third avatar) based on the fourth motion data. Specifically, since the terminal device 20A is a VR terminal device, it can generate two types of videos, namely the first video and the second video. The terminal device 20A can extract, by the method described above, each of the first motion data, the second motion data, and the fourth motion data from the one set of motion data received from the server device 30, and use such in generating the videos.

In the aspect shown in FIG. 4D, the first video generated by the terminal device 20A differs from the first video (FIG. 11) generated by the terminal device 20A in the aspect shown in FIG. 4C in that third avatar 450 moves based on the fourth motion generated in accordance with the second tracking method. Therefore, as described above, the position of the third avatar 450 does not change in the first video. However, the head of the third avatar 450 moves based on the fourth motion data (for example, shaking the head left and right, or changing the direction in which the head faces), and the facial expression and the like of the third avatar 450 may change based on the fourth motion data.

Meanwhile, in the aspect shown in FIG. 4D, the second video generated by the terminal device 20A differs from the second video (FIG. 12) generated by the terminal device 20A in the aspect shown in FIG. 4C in that the third avatar 450 moves based on the fourth motion generated in accordance with the second tracking method. Therefore, as described above, the position of the third avatar 450 does not change in the second video. However, the head of the third avatar 450 moves based on the fourth motion data (for example, shaking the head left and right, or changing the direction in which the head faces), and the facial expression and the like of the third avatar 450 may change based on the fourth motion data.

Next, we will focus on the terminal device 20B.

Since the terminal device 20B, is a smartphone terminal device, it can generate the second video.

For the reasons described above, the second video generated by the terminal device 20B is substantially the same as the second video generated by the terminal device 20A in the aspect shown in FIG. 4D.

Next, we will focus on the terminal device 20D.

Since the terminal device 20D is also a smartphone terminal device, it can generate the second video.

For the reasons described above, the second video generated by the terminal device 20D is substantially the same as the second video generated by the terminal device 20A in the aspect shown in FIG. 4D.

5-2. Second Case

In a second case, the first distributor using the VR terminal device independently provides a video to each viewer. After that, the viewer A uses the VR terminal device or the smartphone terminal device to provide each viewer with the video jointly with the first distributor.

The second case corresponds to a case in which the second distributor, the terminal device 20B thereof, and the second motion data are excluded from the first case (FIGS. 4A to 4D) described above. That is, FIGS. 5A to 5D respectively correspond to FIGS. 4A to 4D excluding the second distributor, the terminal device 20B thereof, and the second motion data. Therefore, in order to avoid redundant description, FIGS. 5A to 5D only show the data (first motion data to fourth motion data) sent between the devices, and the description thereof is omitted.

5-3. Third Case

In a third case, the second distributor using a smartphone terminal device independently provides a video to each viewer. After that, the viewer A uses the VR terminal device or the smartphone terminal device to provide each viewer with the video jointly with the second distributor.

The third case corresponds to a case in which the first distributor, the terminal device 20A thereof, and the first motion data are excluded from the first case (FIGS. 4A to 4D) described above. That is, FIGS. 6A to 6D respectively correspond to FIGS. 4A to 4D excluding the first distributor, the terminal device 20A thereof, and the first motion data.

Therefore, in order to avoid redundant description, FIGS. 6A to 6D only show the data sent between the devices, and the explanation thereof is omitted.

5-4. Modified Example

In the various embodiments described above, cases were described in which the server device 30 sends all motion data received from the terminal device 20 of each distributor to the terminal device 20 of each distributor and the terminal device 20 of each viewer as one set of motion data. That is, in the above-described various embodiments, cases were described in which the server device 30 sends particular motion data included in the one set of motion data even to the terminal device of the distributor that has sent the particular motion data.

In this case, as the total number of distributors who jointly distribute videos increases, the volume of motion data received from the server device 30 by the terminal device 20 of each distributor, that is, the volume of motion data the server device 30 sends to the terminal device 20 of each distributor, increases, and as a result, problems can arise that there is a possibility that the communication network will become strained and smoothly providing videos from the terminal device 20 of each distributor to the terminal device 20 of each viewer via the server device 30 could become difficult. In order to deal with such problems, in another embodiment, the server device 30 can adopt a configuration in which particular motion data is not sent to the terminal device of the distributor that has sent that particular motion data. This makes it possible to reduce the volume of motion data that the terminal device 20 of each distributor receives from the server device 30, that is, the volume of motion data that the server device 30 sends to the terminal device 20 of each distributor, and therefore it is possible to provide videos more smoothly from the terminal device 20 of each distributor to the terminal device 20 of each viewer via the server device 30. In this case, the terminal device of this distributor can generate a video using the particular motion data generated by the distributor himself/herself. For example, in the configuration shown in FIGS. 4A to 4D, the server device 30 sends the first motion data only to the terminal device 20B and the terminal device 20 of each viewer, and not to the terminal device 20A, and similarly, the second motion data can be sent only to the terminal device 20A and the terminal device 20 of each viewer, and not sent to the terminal device 20B. Further, in the configuration shown in FIG. 4C, the server device 30 can be configured not to send the third motion data to the terminal device 20C and not to send the fourth motion data to the terminal device 20D.

In the various embodiments described above, when the viewer A using the terminal device 20C, which is a VR terminal device, views the first video provided by the terminal device 20 of each distributor (for example, the aspects respectively shown in FIGS. 4A, 5A, and 6A), the third avatar 450 of the viewer A is not displayed in the first video displayed by the terminal device 20C of the viewer A, nor in the first video displayed by the terminal device 20 of each distributor. That is, each distributor can recognize where the avatar of each distributor is in the first video, but cannot recognize where the avatar of each viewer is. Therefore, for example, even if a situation occurs in which the avatar of the viewer is in closer contact than necessary with the distributor's own avatar in the first video, a problem arises in which the distributor does not recognize such a situation at all. Furthermore, the problem may occur that the sense of reality is lost or a sense of unease arises because the avatar of the distributor and the avatar of the viewer are in too close contact with each other.

Therefore, in one embodiment, the terminal device 20 of the viewer can determine whether the distance between the avatar of the viewer and a target avatar that is the avatar of at least one of the distributors is less than or equal to a threshold value in the first virtual space. When the terminal device 20 of the viewer determines that the above-described distance is less than or equal to the above-described threshold value, if the motion data related to the motion of the viewer generated by the terminal device 20 of that viewer indicates a motion progressing toward the target avatar (for example, the motion data indicates a motion that progresses in a direction that further reduces the distance between the coordinates of the target avatar and the coordinates of the avatar of the viewer), such motion data can be invalidated (not used to generate or display the first video). As a result, in the first video, the avatar of the viewer cannot proceed to an area is less than or equal to a threshold value about the target avatar, so the distributor can participate in providing videos to the viewers with a sense of security that the above situation will not occur. Furthermore, by suppressing the occurrence of a situation in which a plurality of avatars is crowded upon each other, it is possible to deal with the problem of impairing the sense of reality or causing a sense of unease.

In combination with or separately from such methods of invalidating the motion data, the following display methods may also be used to suppress at least partially the above-described situation from occurring. Specifically, in the first virtual space, if the distance between the avatar of a particular distributor and the avatar of the viewer is less than or equal to a threshold value, the terminal device of the particular distributor can display, in the first video, an arbitrary object (for example, the object 245 or the like illustrated in FIG. 7) indicating that the avatar of the viewer (not displayed in the first video as described above) exists at the position of this avatar. The arbitrary object can be text and/or an image, and can include information about the avatar of the viewer (the screen name of the viewer and/or an image using a portion of the avatar of the viewer). In order to realize this, the terminal device of the distributor needs to recognize the coordinates of the avatar of the viewer in the first virtual space and thus can receive the coordinates of the avatar of this viewer or motion data or the like related to the motion of this viewer in order to calculate the coordinates thereof.

The method of invalidating the motion data described above can be similarly applied not only to the terminal device 20 of the viewer, but also to the terminal device 20 of the distributor. For example, the terminal device 20 of a particular distributor can determine, in the first virtual space, whether the distance between a target avatar that is the avatar of at least one other distributor and the avatar of the particular distributor is less than or equal to a threshold value. When the terminal device 20 of the particular distributor determines that the above-described distance is less than or equal to the threshold value, if the motion data related to the motion of the particular distributor generated by the terminal device 20 of the particular distributor indicates motion progressing toward the target avatar (for example, the motion data indicates a motion in a direction that further reduces the distance between the coordinates of the target avatar and the coordinates of the avatar of the particular distributor), the terminal device 20 of the particular distributor can invalidate such motion data (not use such motion data to generate or display the first video). As a result, in the first video, the avatar of the distributor cannot proceed to an area less than or equal to the threshold value about the target avatar. Although each distributor can recognize where the avatars of other distributors are, each distributor can participate in providing videos to the viewers jointly with the other distributors while having a sense of security that the avatars of the other distributors will not approach abnormally close to the distributor's own avatar.

Further, in the various embodiments described above, it was described that the server device 30 sends "one set of motion data" including motion data relating to the motion of each distributor to the terminal device of each distributor and the terminal device of each viewer. This "one set of motion data" may include data indicating which of the first tracking method and the second tracking method each distributor adopts to generate the motion data. In this case, the terminal device of each distributor and/or the terminal device of each viewer receive the "one set of motion data," and thereby, when displaying the first video and/or the second video, can display on the display portion which tracking method the distributor uses, in combination with the first video and/or the second video.

Specifically, as a first example, when focusing on FIG. 16, which will be referred to later, in FIG. 16, an example is shown in which the terminal device 20C, which is a VR terminal device, displays a below-described input object 710 in combination with a first video 700 that moves (i.e., is generated) based on motion data relating to the motion of a user A.

The terminal device 20C can display six icons respectively displaying the screen names "Mr./Ms. U," "Mr./Ms. V," "Mr./Ms. W," "Mr./Ms. X," "Mr./Ms. Y," and "Mr./Ms. Z." User A can determine a distributor to be viewed by placing the pointer on an icon corresponding to a desired distributor from among these distributors and selecting the icon. In association with each distributor, the terminal device 20C can display an image (for example, a profile image) showing the avatar of the distributor, the name of the content distributed by the distributor, and/or the details and the like of the content distributed by the distributor. In this case, the terminal device 20C can receive information to be displayed in such manner from the server device 30.

The terminal device 20C can display information indicating which of the first tracking method and the second tracking method is used to distribute the video in association with the icon of each distributor. Here, as an example, the terminal device 20C can display the information "VR" in association with a distributor using the first tracking method, and displays the information "smartphone" in association with a distributor using the second tracking method.

By having the terminal device 20C display such information, when each viewer including the user A has a desire such as "I want to distribute a video jointly with a distributor using a VR terminal device" or "I want to distribute a video jointly with a distributor using a smartphone terminal device," the viewer can determine which distributor to select by referencing the above-described information. Furthermore, upon considering whether the terminal device the viewer himself/herself is using is a VR terminal device with higher drawing performance (or whether such is a smartphone terminal device with lower drawing performance), and/or whether to attempt distribution of a video jointly with one of the distributors with reference to the stability of the current communication network, the viewer can select a distributor using a smartphone terminal device ("Mr./Ms. U," "Mr./Ms. V," "Mr./Ms. W," or the like) when desiring distribution and the like with a lower load, and can select a distributor using a VR terminal device ("Mr./Ms. X," "Mr./Ms. Y," "Mr./Ms. Z," or the like) when desiring distribution and the like that is enjoyed by moving together in the virtual space. As a result, it is possible to suppress the communication network from being overloaded when a plurality of distributors jointly distributes videos.

Figure 16:
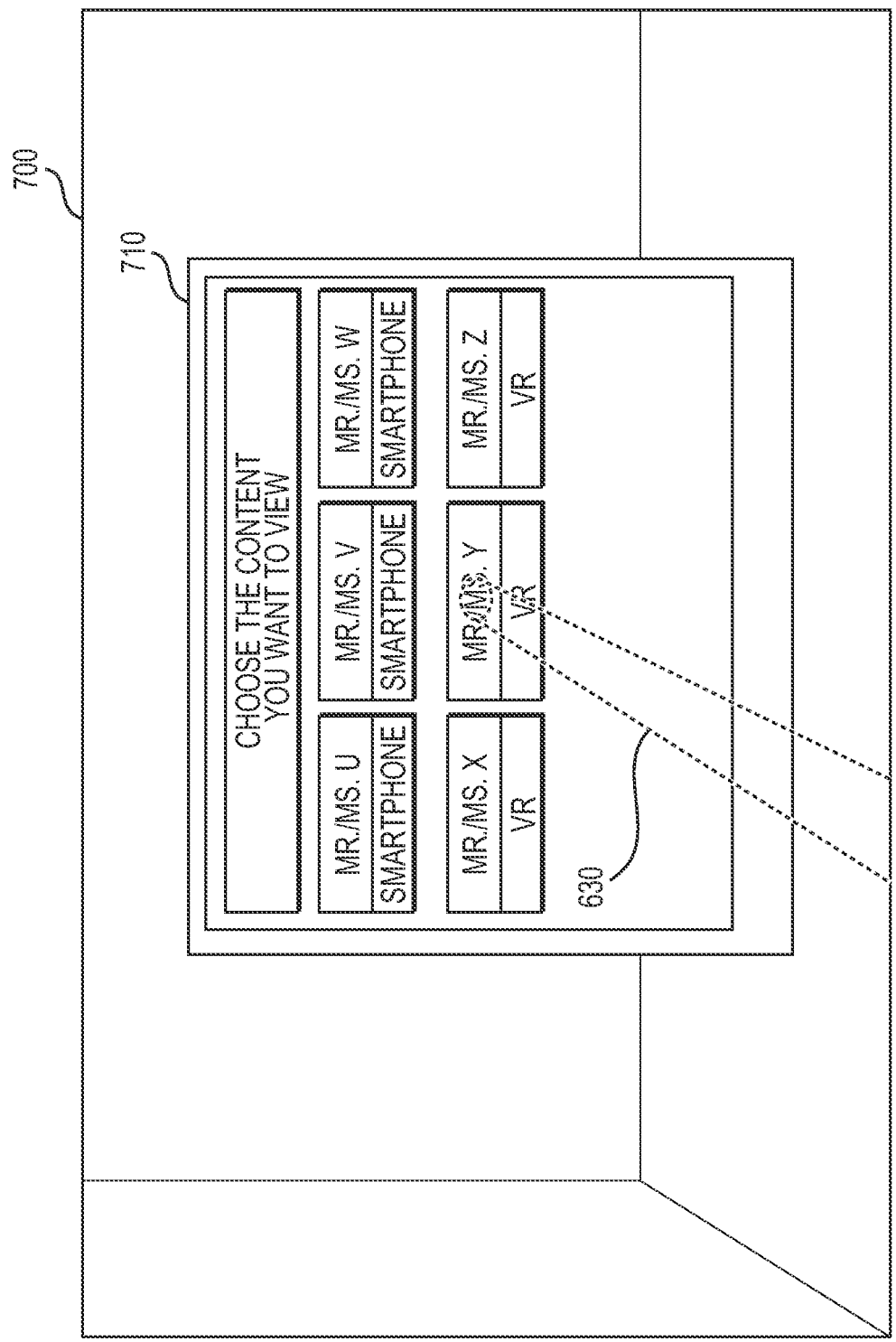
FIG. 16 is a diagram showing an example of a screen displayed when a terminal device executes a "viewing mode" in the communication system shown in FIG. 1.

FIG. 16 exemplifies a screen displayed by the terminal device 20C, which is a VR terminal device, but on a screen displayed by a smartphone terminal device also, information (such as "VR" or "smartphone") indicating the tracking method used by the distributor may be displayed in association with each distributor as well.

As a second example, when focusing on FIG. 10 referred to above, FIG. 10 illustrates the first video 400 displayed by the terminal device 20C of the viewer A. As shown in FIG. 10, the terminal device 20C can display information indicating the tracking method used by each distributor in association with the avatar of each distributor displayed in the first video 400. For example, the terminal device 20C can display (i) information 210A "VR" indicating the first tracking method used by the first distributor in association with the first avatar 210 of the first distributor (for example, below the first avatar 210), and (ii) information 220A "smartphone" indicating the second tracking method used by the second distributor in association with the second avatar 220 of the second distributor (for example, below the second avatar 220).

By having the terminal device 20C display such information, each viewer including the viewer A, in a situation of selecting a gift to be sent to any of the distributors, can select a gift suitable for the tracking method used by that distributor from among a plurality of gifts. For example, since the first distributor uses the first tracking method, each viewer can recognize that the first avatar 210 of the first distributor can have attached thereto a (more complex) gift that is held and used or operated such as a "microphone," a "tambourine," or a "gun" that is held in the hand. Thus, each viewer can send a more complex gift to the first distributor, such as a "microphone" suitable for the first tracking method. On the other hand, since the second distributor uses the second tracking method, each viewer can recognize that the second avatar 220 of the second distributor preferably has attached thereto a simpler gift. Therefore, each viewer can send to the second distributor a (simpler) gift that the avatar can simply have attached to the body, such as a "hat," a "ribbon," or a "beard" suitable for the second tracking method.

Figure 28:
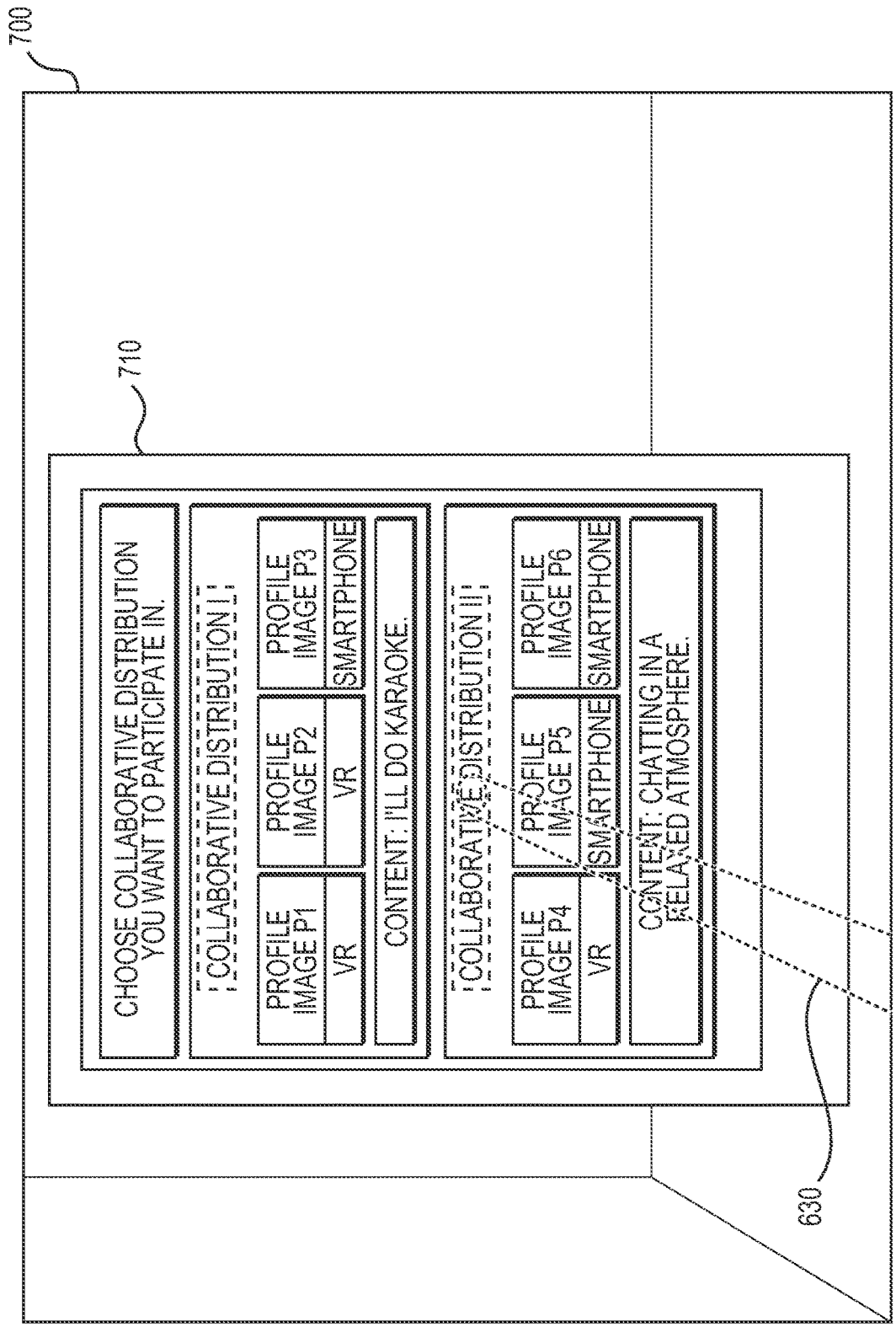
FIG. 28 is a diagram showing another example of a screen displayed when a terminal device executes a "joint distribution mode" in the communication system shown in FIG. 1.

As a third example, a situation in which the user A participates in joint distribution can be considered. FIG. 28 is a diagram showing another example of a screen displayed when the terminal device executes the "joint distribution mode" in the communication system shown in FIG. 1.

The terminal device 20C can display, for example, "collaborative distribution I" and "collaborative distribution II" in the input object 710 as icons indicating joint distribution (collaborative distribution) in which the user A can participate. The terminal device 20C can display the profile image (avatar image) of each distributor who appears in the joint distribution, and the contents of the joint distribution, and the like, in association with each icon. For example, for the icon "collaborative distribution I," the terminal device 20C can display profile images (P1, P2, P3) corresponding to each of the, for example, three distributors who appear in this joint distribution, and the contents ("I'll do karaoke") of the joint distribution. In addition, for the icon "collaborative distribution II," the terminal device 20C can display profile images (P4, P5, P6) corresponding to each of the, for example, three distributors who appear in this joint distribution, and the contents ("chatting in a relaxed atmosphere") of the joint distribution.

Further, the terminal device 20C can display (i) the information "VR" in association with (the profile images P1, P2, and P4 of) each of the distributors using the first tracking method, and (ii) the information "smartphone" in association with (the profile images P3, P5 and P6 of) each of the distributors using the second tracking method.

The user A can participate in the joint distribution corresponding to any desired icon by selecting that icon (in FIG. 28, by placing a pointer 630 on the icon "collaborative distribution II").

As a result, referring to the information illustrated in FIG. 28, the user A can select either joint distribution with numerous distributors using the first tracking method or joint distribution with numerous distributors using the second tracking method.

Thus, the terminal device 20C can improve usability by displaying information indicating whether video is distributed using either the first tracking method or the second tracking method in association with the profile image (avatar image) of each distributor.

Also, in the various embodiments described above, although not explicitly mentioned because such is obvious, the terminal device of each distributor and the terminal device of each viewer can acquire audio data generated by the terminal device of each distributor contained within the "one set of motion data" or combined with the "one set of motion data" received from the server device. By using such audio data, the terminal device of each distributor and the terminal device of each viewer can reproduce the first video and/or the second video in which the audio produced by each distributor is incorporated, and can reproduce audio produced by each distributor while displaying the first video and/or the second video.

In addition, in the various examples described above, the description has focused on a method (client rendering method) in which each terminal device 20 executes operations related to generation of the first video, the second video, and the like. However, it is also possible to adopt a method (server rendering method) in which one server device 30 alone executes, or a plurality of server devices 30 share and execute, operations related to generation of videos, which have been described as being executed by each terminal device 20 in each of FIG. 4A to FIG. 6D. In this case, instead of each terminal device 20, the one or more server devices 30 execute various operations related to generation of videos0, and thereby the first video and/or the second video can be generated and sent to the terminal device 20C. As described above, since the server device 30 receives motion data from the terminal device 20 of each distributor, the server device 30 instead of each terminal device 20 can use this motion data to generate various videos. On the other hand, the server device 30 does not necessarily receive motion data from the terminal device 20 of each viewer. Therefore, when the server rendering method is adopted, the server device 30 may receive motion data from the terminal device of each viewer every unit time or at arbitrary timing.

In addition, in the various examples described above, the description has focused on a method (client rendering method) in which each terminal device 20 executes operations related to generation of the first video, the second video, and the like. However, each terminal device 20 may adopt a method (browser rendering method) in which a web page is received from the server device 30 or a web server device 30 via a web browser and operations related to generation of such a first video and a second video and the like are performed by executing a computer program included in this web page.

According to the platform described above, regardless of which distributor's terminal device uses which of the first tracking method and the second tracking method to generate motion data, each terminal device can generate or display videos in accordance with the tracking method adopted by the terminal device of the distributor. Furthermore, each terminal device can generate or display one or both of the available first video and second video depending on whether this terminal device is a VR terminal device or a smartphone terminal device. Thereby, the platform enables the distributor to provide each viewer and the like with a video using a tracking device attached (or the like) to the body of the distributor.

6. Operations Executed by the Communication Network 1

6-1. Basic Operations

Next, a specific example of operations executed in the communication network 1 using the platform described above will be described with particular attention to the above-described second video displayed by the terminal device 20. Hereinafter, the description of items related to the platform described above are omitted in order to avoid redundant description.

Figure 14:
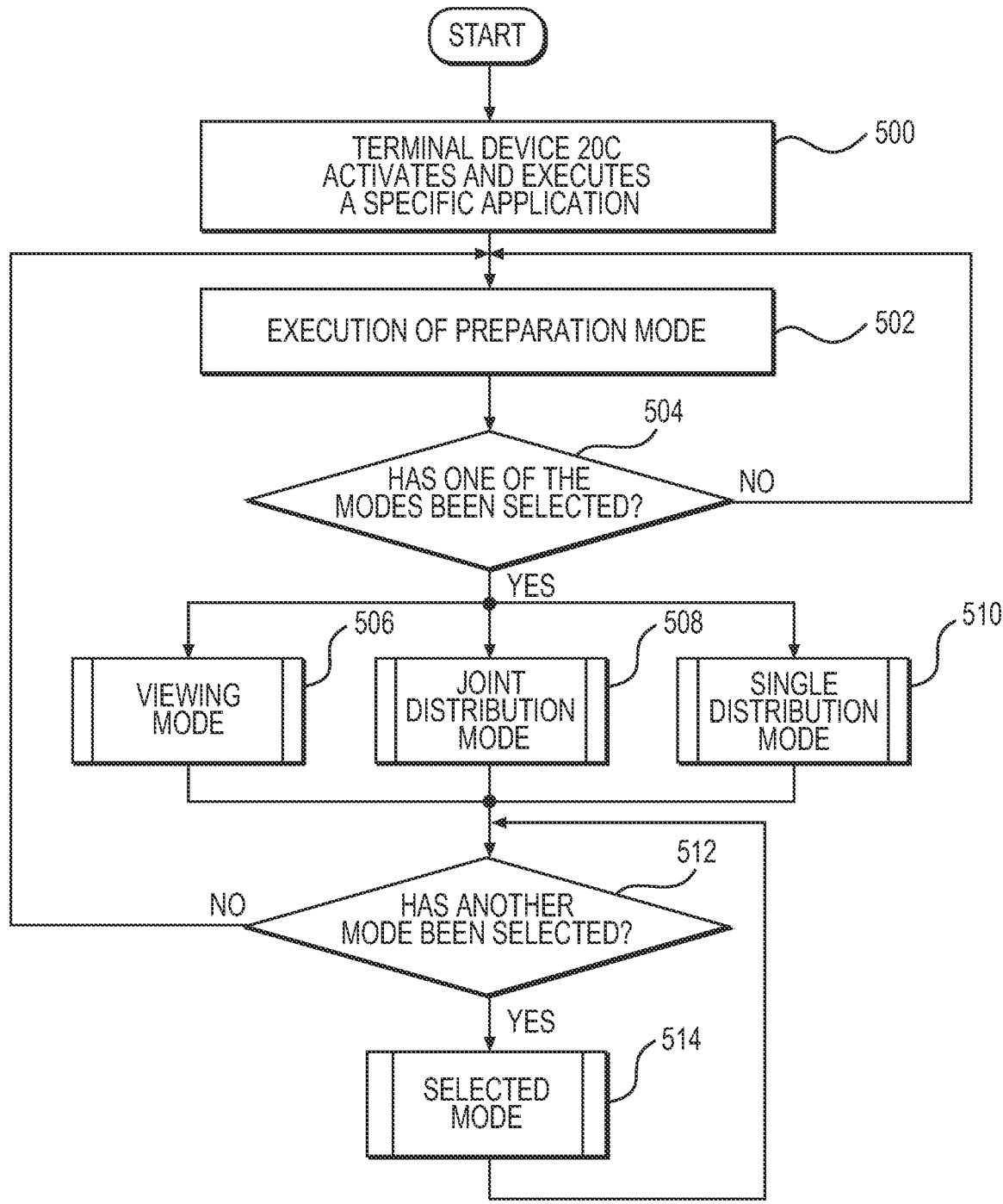
FIG. 14 is a flow diagram showing an example of operations executed in the communication network 1 shown in FIG. 1.

FIG. 14 is a flowchart showing an example of operations executed in the communication network 1 shown in FIG. 1. First, in step (hereinafter referred to as "ST") 500, a user (here, "user A") operates the terminal device 20C to cause a specific application to be activated and executed for receiving an offer for video services to the terminal device 20C. The operations described below similarly apply to any other terminal device (VR terminal device) 20 as well.

Next, in ST502, the terminal device 20C executing the specific application can execute a "preparation mode." This "preparation mode" is a mode to prepare for receiving or distributing a video when the terminal device 20C neither receives a video provided by another terminal device 20C nor distributes a video to another terminal device 20. The terminal device 20C can store mode identification data indicating which mode is being executed as the current mode. The terminal device 20C can store the mode identification data indicating the "preparation mode" during the period from the transition to the "preparation mode" to the end of the "preparation mode." At arbitrary timing, the terminal device 20C can determine which mode is being executed by referring to the mode identification data.

Figure 15:
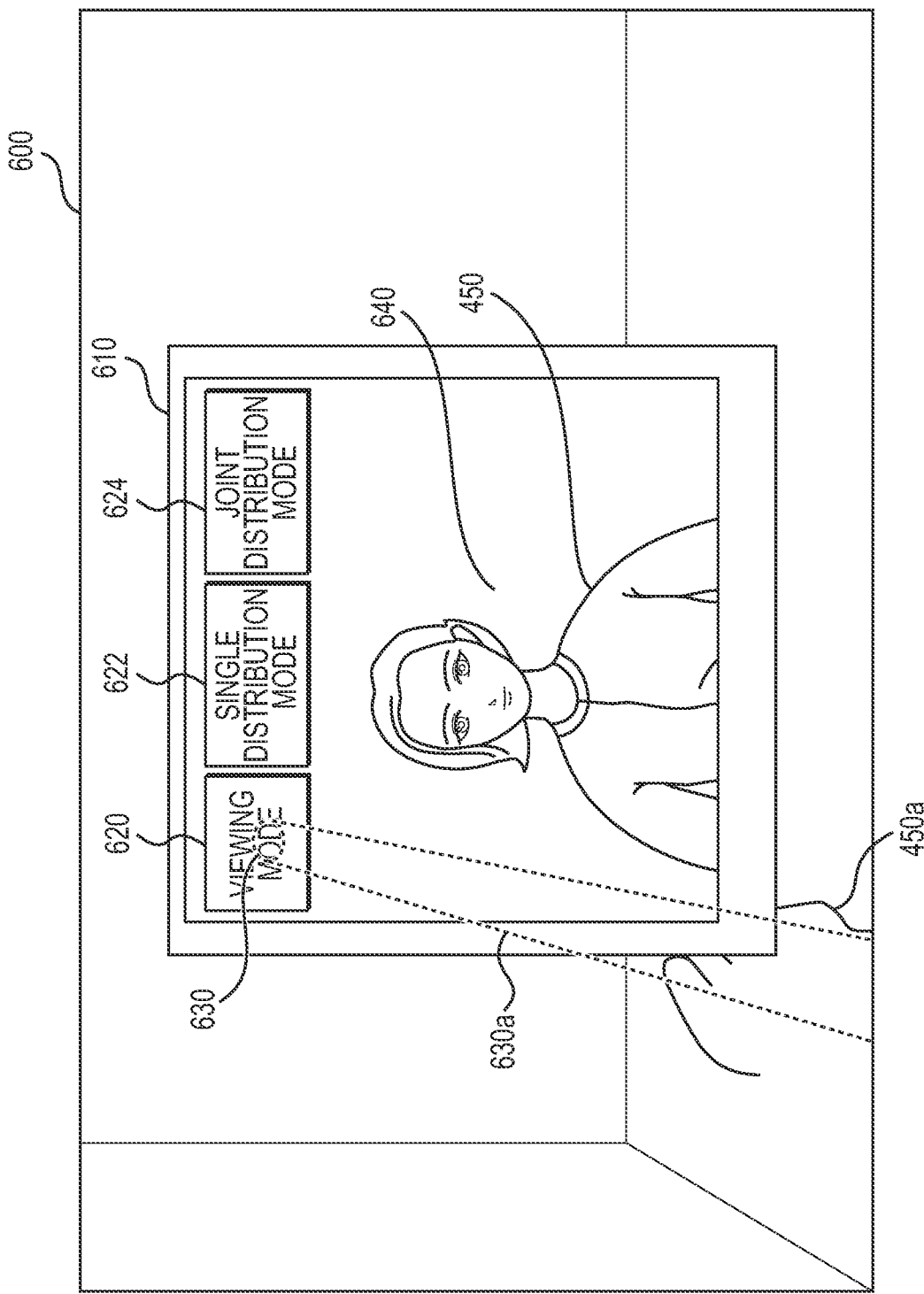
FIG. 15 is a diagram showing an example of a screen displayed when a terminal device executes a "preparation mode" in the communication system shown in FIG. 1.

The terminal device 20C can display a screen (home screen) as shown in FIG. 15 when executing the "preparation mode."

FIG. 15 is a diagram showing an example of a screen displayed when the terminal device executes the "preparation mode" in the communication system shown in FIG. 1. As shown in FIG. 15, the terminal device 20C, which is a VR terminal device, can display on the home screen a first video (first type of video) 600 that moves based on motion data related to the motion of the user A. As described in "5. Platform" above, the first video 600 is depicted from the viewpoint of the user A, and the viewpoint can change based on the above motion data. Also, the first video 600 can display the avatar 450 of the user A (here, the left hand 450a of the avatar 450, or the like). The avatar 450 displayed in the first video 600 also moves according to the motion data indicating the motion of the user A.

Furthermore, the terminal device 20C can display an input object 610 in combination with the first video 600. The input object 610 can function as a user interface that allows operational input by the user A. Specifically, the input object 610 may include a plurality of icons, for example, an icon 620 for causing the terminal device 20C to transition to a "viewing mode," an icon 622 for causing the terminal device 20C to transition to a "single distribution mode," and an icon 624 or the like for causing the terminal device 20C to transition to a "joint distribution mode" ("collaborative distribution mode").

The terminal device 20C can display a tracking device attached to or held by the user A in conjunction with the input object 610, here, for example, a pointer (laser pointer) 630 that moves in accordance with operation by the user A on the right-hand controller 102 or the left-hand controller 104. The terminal device 20C can depict the pointer 630 as a laser beam flowing upward on the paper surface. The terminal device 20C can also depict a trajectory 630a of this pointer 630.

The user A can move the pointer 630 on the surface of the input object 610 by moving the right-hand controller 102 or the left-hand controller 104. The user A can select the mode corresponding to the icon by positioning the pointer 630 on one of the icons 620, 622, and 624 and pressing a button on either the right-hand controller 102 or the left-hand controller 104. As a result, the user A can operate the pseudo-displayed terminal device using the tracking device of the right-hand controller (left-hand controller) or the like as though operating the terminal device by touching the touch panel of a terminal device, for example, a smartphone.

The terminal device 20C can also display a second video 640 on the input object 610. The second video 640 can arrange the avatar 450 that moves based on the motion data indicating the motion of the user A in the first virtual space, and can display this avatar 450 as viewed from the front.

The terminal device 20C can movably display such an input object 610 in conjunction with a portion of the avatar 450 of the user A included in the first video 600 (here, the left hand 450a). Specifically, for example, the terminal device 20C can move the left hand 450a of the avatar 450 in the first video 600 in response to the user A moving the left-hand controller 104, and can move the input object 610 accordingly.

Furthermore, the terminal device 20C can display such an input object 610 as a terminal device expressed in a pseudo manner (pseudo terminal device), as illustrated in FIG. 15. A pseudo terminal device may include, as one aspect, a pseudo smartphone expressed in a pseudo manner (pseudo smartphone).

In addition, in one embodiment, the terminal device 20C can also display the first video 600 and the input object 610 in mutually different areas on the display portion (HMD 100 or the like) that is the output device 26. For example, the terminal device 20C can display (i) the first video 600 in a partial area such as the right portion, the left portion, the upper portion, or the lower portion of a specific area included in the display area formed by the display portion, and (ii) the input object 610 in the remaining area of the specific area. In another preferred embodiment, the terminal device 20A can also display the input object 610 inside an area where the first video 600 is displayed, as illustrated in FIG. 15.

Returning to FIG. 14, next, in ST504, the terminal device 20C, while executing the "preparation mode," can determine whether one of the modes (here, for example, the "viewing mode," the "single distribution mode" or the "joint distribution mode") has been selected by the user A. If it is determined that none of the modes has been selected, the terminal device 20C can continue to execute ST502. On the other hand, if it is determined that one of the modes has been selected, the terminal device 20C can proceed to the step corresponding to the selected mode. Specifically, if it is determined that the "viewing mode" has been selected, the terminal 20C can proceed to ST506, if it is determined that the "joint distribution mode" has been selected, the terminal 20C can proceed to ST508, and if it is determined that the "single distribution mode" has been selected, the terminal 20C can proceed to ST510.

In ST506, the terminal device 20C can execute the "viewing mode," which is a mode for displaying a video provided by the distributor selected by the user A. The user A can, for example, execute the "viewing mode" in the terminal device 20C by placing the pointer 630 shown in FIG. 15 on the "viewing mode" icon 620 and pressing a button of the right-hand controller 102 or the left-hand controller 104.

The terminal device 20C can store mode identification data indicating the "viewing mode" during the period from the transition to the "viewing mode" to the end of the "viewing mode." As described above, at arbitrary timing, the terminal device 20C can determine which mode is being executed by referring to the mode identification data.

FIG. 16 is a diagram showing an example of a screen displayed by the terminal device when executing the "viewing mode" in the communication system shown in FIG. 1. As shown in FIG. 16, when the "viewing mode" is executed, the terminal device 20C, which is a VR terminal device, can display a first video (fourth type of video) 700 that moves based on the motion data related to the motion of the user A. As described in "5. Platform" above, the first video 700 is depicted from the viewpoint of the user A, and the viewpoint can change based on the motion data. Also, the first video 700 does not display the avatar 450 of the user A.

Furthermore, the terminal device 20C can display the input object 710 in combination with the first video 700. The terminal device 20C can display the screen name of at least one distributor currently distributing a video, in the form of an icon in the input object 710. Here, as an example, the terminal device 20C can display six icons respectively displaying the screen names "Mr./Ms. U," "Mr./Ms. V," "Mr./Ms. W," "Mr./Ms. X," "Mr./Ms. Y," and "Mr./Ms. Z." The user can determine the distributor to be the target of viewing by aligning the pointer with the icon corresponding to the desired one of these distributors and selecting the icon. Here, user A can select the "Mr./Ms. Y" icon in order to view the video distributed by "Mr./Ms. Y."

Figure 17:
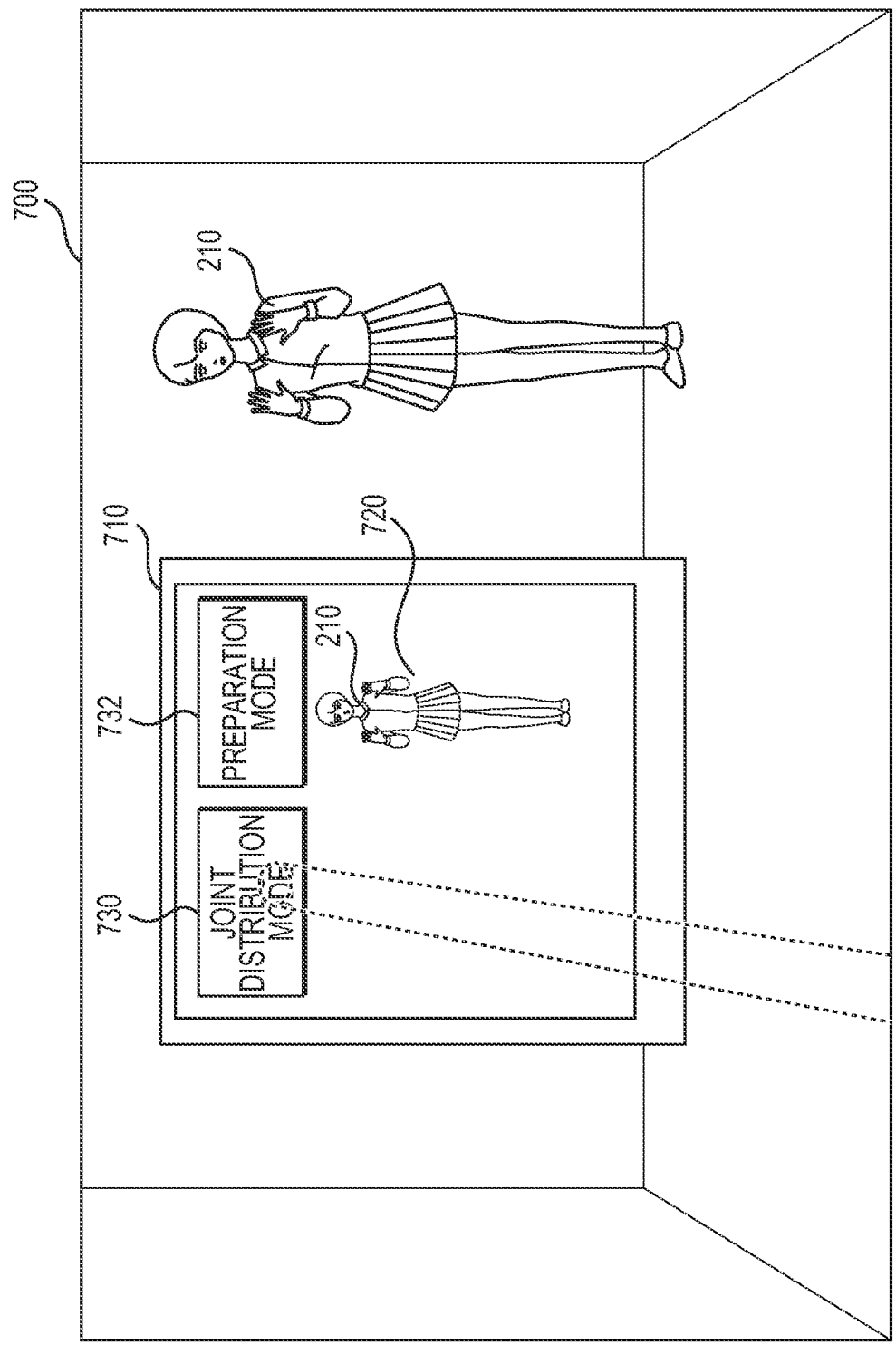
FIG. 17 is a diagram showing another example of a screen displayed when a terminal device executes a "viewing mode" in the communication system shown in FIG. 1.

Accordingly, the terminal device 20C can display the first video 710 as illustrated in FIG. 17. This first video (fourth type of video) 700 is a video in which an avatar 210 that moves based on the motion of the distributor "Mr./Ms. Y" is placed in the first virtual space. The first video 700 does not display the avatar 450 of the user A.

Furthermore, the terminal device 20C can display the input object 710 in combination with the first video 700. The input object 710 can arrange the avatar 210 that moves based on the motion of the distributor "Mr./Ms. Y" in the first virtual space, and can display a second video 720 that displays this avatar 210 as viewed from the front. The second video 720 displayed on the input object 710 when executing the "viewing mode" differs from the second video 640 displayed on the input object 610 when executing the above-described "preparation mode" in that the second video 720 does not display the avatar 450 of the user A.

The second video 720 may be the same as the video displayed in common on the terminal device 20 of each viewer. In addition, the second video 720 can display each avatar (here, avatar 210) viewed from the position of a virtual camera placed in the first virtual space (three-dimensional space) used in the first video 700.

In addition, the input object 710 may include a plurality of icons, for example, an icon 730 for causing the terminal device 20C to transition to the "joint distribution mode," an icon 732 for causing the terminal device 20C to transition to the "preparation mode," or the like.

In this way, the terminal device 20C can execute the "viewing mode."

Returning to FIG. 14, next, in ST512, the terminal device 20C can determine whether the user A has selected another mode. When it is determined that another mode has not been selected, the terminal device 20C can return to ST502 described above and execute the "preparation mode."

On the other hand, when it is determined that another mode has been selected, the terminal device 20C can move to ST514 and execute the mode so selected. Here, we consider a case in which, accompanying the user A's selection of the "joint distribution mode" icon 730 shown in FIG. 17 in ST506 described above, the terminal device 20C ends the "viewing mode," goes through ST512, and in ST514 executes the "joint distribution mode" as the selected mode.

In ST514, the terminal device 20C can execute the "joint distribution mode," which is a mode for the user A to jointly distribute a video with at least one distributor. This "joint distribution mode" can be initiated, for example, by any of the procedures exemplified below.

When a user A (guest user) sends a request (for example, via the screen shown in FIG. 17) to a distributor (host user) of a video to be viewed in "viewing mode," and the distributor approves the request.

When, while a user A (host user) is distributing a video independently in the "single distribution mode," one of the viewers (guest user) sends a request to the user A, and the user A approves the request.

When the user A (host user), while distributing a video independently in the "single distribution mode," sends a request to any viewer (guest user) to invite that viewer to become a joint distributor, and the viewer approves that request.

By the operations exemplified below being executed, for example, between the host user and the guest user, the host user and the guest user can jointly distribute a video.

(i) The terminal device 20 of the host user receives request data from the terminal device 20 of the guest user via the server device 30 (or the terminal device 20 of the host user sends request data to the terminal device of the guest user via the server device 30).

(ii) The terminal device 20 of the host user sends approval data indicating acceptance of the request to the terminal device 20 of the guest user via the server device 30 (or the terminal device 20 of the guest user sends approval data indicating acceptance of the request to the terminal device 20 of the host user via the server device 30).

(iii) The server device 30 sends a list indicating joint distributors to the terminal device 20 of the host user and the terminal device 20 of the guest user.

(iv) The terminal device 20 of the host user sends motion data to the server device 30.

(v) The terminal device 20 of the guest user sends motion data to the server device 30.

(vi) The server device 30 sends the motion data received in (iv) and (v) described above as one set of motion data to the terminal device 20 of the host user, the terminal device 20 of the guest user, and the terminal device 20 of each viewer.

(vii) The subsequent operations are as described in "5. Platform" above.

In addition, during the period from transitioning to the "joint distribution mode" until the end of the "joint distribution mode," the terminal device 20C can store the mode identification data indicating the "joint distribution mode." As described above, at arbitrary timing, the terminal device 20C can determine which mode is being executed by referring to the mode identification data.

While the terminal device 20C is executing the "joint distribution mode" (the user A is distributing a video in cooperation with another distributor), the user A can operate the terminal device 20C (or the above-described other distributor can operate a terminal device 20) and send a request to any viewer to invite that viewer to become a joint distributor. When the viewer operates a terminal device 20 and approves the request, the user A, the above-described other distributor, and the viewer (new distributor) can jointly distribute a video.

Figure 18:
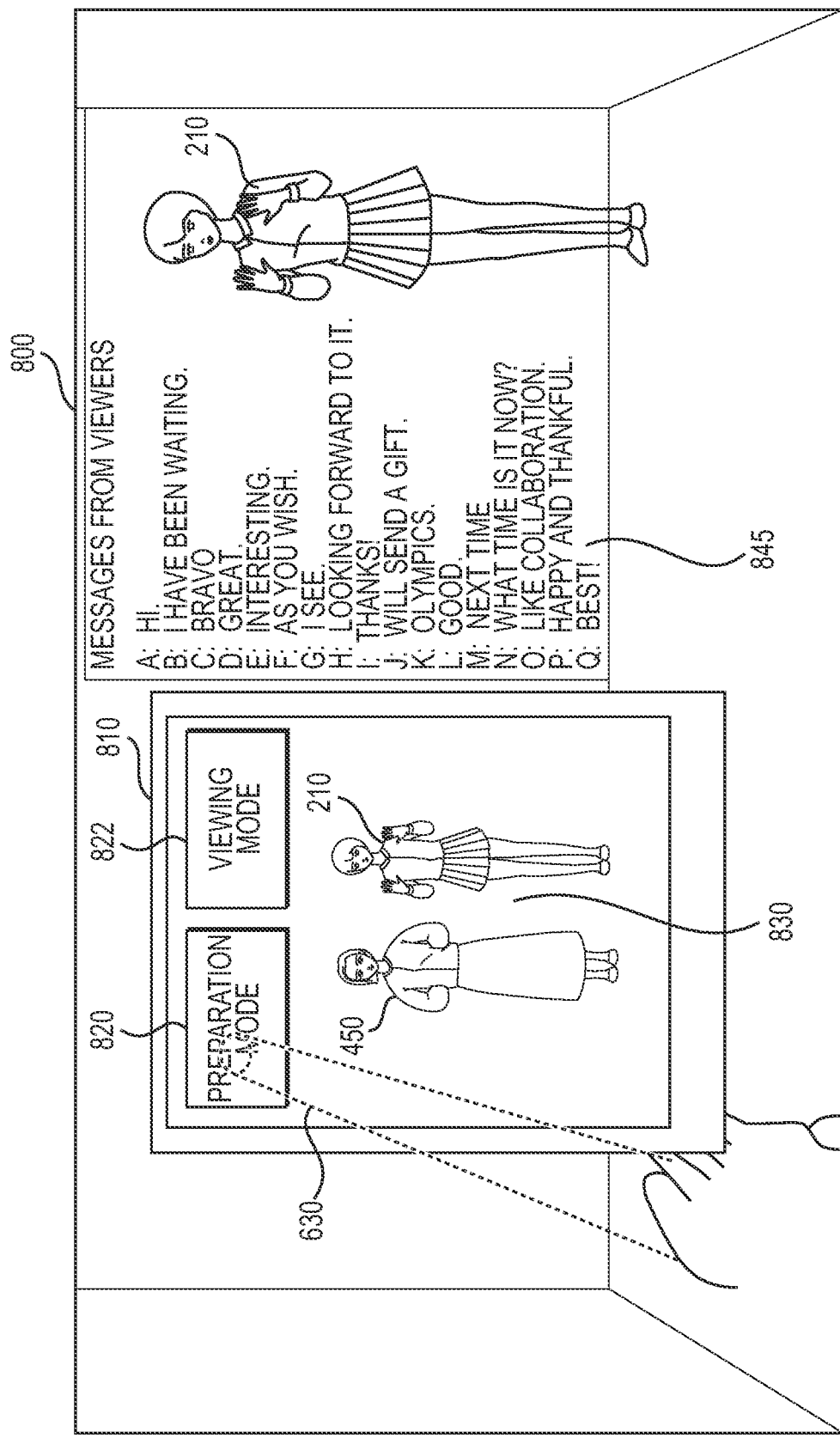
FIG. 18 is a diagram showing an example of a screen displayed when a terminal device executes a "joint distribution mode" in the communication system shown in FIG. 1.

FIG. 18 is a diagram showing an example of a screen displayed when a terminal device executes the "joint distribution mode" in the communication system shown in FIG. 1. As shown in FIG. 18, a terminal device 20C, which is a VR terminal device, can display a first video (third type of video) 800 that moves based on motion data related to the motion of the user A. As described in "5. Platform" above, the first video 800 is depicted from the viewpoint of the user A, and the viewpoint can change based on the motion data. In addition, the first video 800 can display the avatar 210 of the distributor "Mr./Ms. Y" and the avatar 450 of the user A (here, the left hand 450a of the avatar 450, or the like). The avatar 210 displayed in the first video 800 moves in accordance with the motion data related to the motion of the distributor "Mr./Ms. Y," and the avatar 450 displayed in the first video 800 moves in accordance with the motion data indicating the motion of the user A.

Furthermore, the terminal device 20C can display the input object 810 in combination with the first video 800. The input object 810 can include a plurality of icons, for example an icon 820 for causing the terminal device 20C to transition to the "preparation mode," an icon 822 for causing the terminal device 20C to transition to the "viewing mode," and the like The terminal device 20C can also display a second video 830 on the input object 810. The second video 830 arranges, in the first virtual space, (i) the avatar 210 that moves based on the motion data indicating the motion of the distributor "Mr./Ms. Y" and (ii) the avatar 450 that moves based on the motion data indicating the motion of the user A, and both the avatar 210 and the avatar 450 can be displayed as viewed from the front.

The second video 830 may be the same as the video displayed in common on the terminal device 20 of each viewer. In addition, the second video 830 can display each avatar (here, the avatar 210 and the avatar 450) viewed from the position of a virtual camera placed in the first virtual space (three-dimensional space) used in the first video 800.

Thus, the terminal device 20C can execute the "joint distribution mode."

Returning to FIG. 14, in ST514, the terminal device 20C can execute and end the "joint distribution mode" that is the selected mode. After that, the terminal device 20C returns to ST512 described above.

In addition, it has been described that when the "joint distribution mode" is selected in ST504, the terminal device 20C executes the "joint distribution mode" in ST508, and when the "single distribution mode" is selected in ST504, the terminal device 20C executes the "single distribution mode" in ST510. The process executed by the terminal device 20C in relation to the "joint distribution mode" in ST508 is as described above in relation to ST514.

The process executed by the terminal device 20C in relation to the "single distribution mode" in ST510 will be explained.

The terminal device 20C can store the mode identification data indicating the "single distribution mode" during the period from the transition to the "single distribution mode" to the end of the "single distribution mode." As described above, at arbitrary timing, the terminal device 20C can determine which mode is being executed by referring to the mode identification data.

Figure 19:
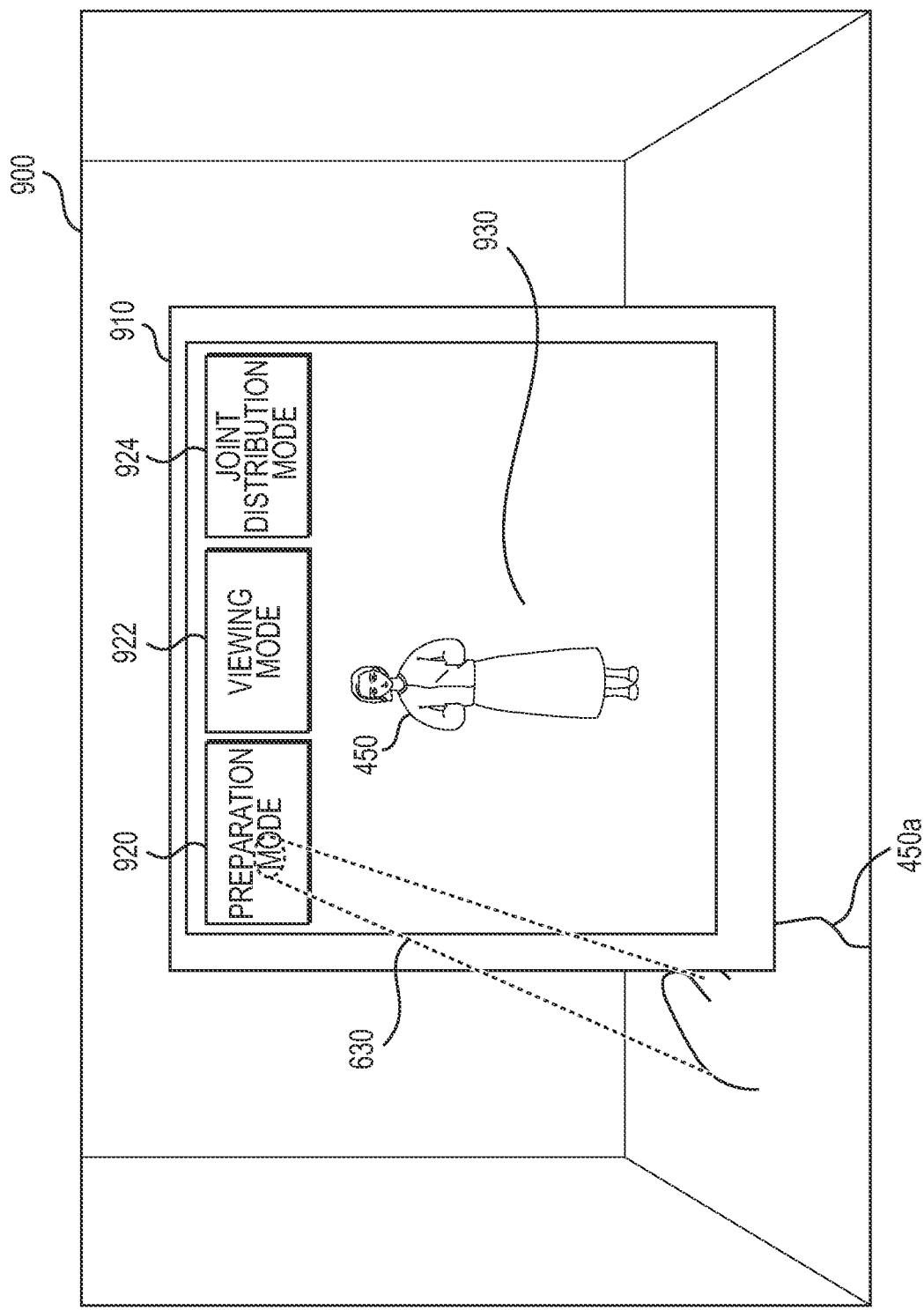
FIG. 19 is a diagram showing an example of a screen displayed when a terminal device executes a "single distribution model" in the communication system shown in FIG. 1.

FIG. 19 is a diagram showing an example of a screen displayed when the "single distribution mode" is executed by the terminal device in the communication system shown in FIG. 1. As shown in FIG. 19, a terminal device 20C, which is a VR terminal device, can display a first video (second type of video) 900 that moves based on motion data related to the motion of the user A. As described in "5. Platform" above, the first video 900 is depicted from the viewpoint of the user A, and the viewpoint can change based on the motion data. In addition, the first video 900 can display the avatar 450 of user A (here, the left hand 450a of the avatar 450, or the like). The avatar 450 displayed in the first video 900 moves in accordance with the motion data indicating the motion of the user A.

Furthermore, the terminal device 20C can display an input object 910 in combination with the first video 900. The input object 910 can include a plurality of icons, for example, an icon 920 for causing the terminal device 20C to transition to the "preparation mode," an icon 922 for causing the terminal device 20C to transition to the "viewing mode," an icon 924 for causing the terminal device 20C to transition to the "joint distribution mode," and the like.

The terminal device 20C can also display a second video 930 on the input object 910. The second video 930 can arrange, in the first virtual space, the avatar 450 that moves based on the motion data indicating the motion of the user A, and can display the avatar 450 as viewed from the front.

The second video 930 may be the same as the video displayed in common on the terminal device 20 of each viewer. Also, the second video 930 can display each avatar (here, avatar 450) viewed from the position of a virtual camera placed in the first virtual space (three-dimensional space) used in the first video 900.

Thus, the terminal device 20C can execute the "single distribution mode."

As described above, the terminal device 20C can display one of four types of videos selected according to the input of the user A to the input object. The four types of videos are categorized as follows.

First type of video: A video (i) that is displayed when the terminal device 20C determines that the preparation mode in which the user A is neither a distributor nor a viewer is being executed, and (ii) in which the avatar of the user A that moves based on the motion of the user A is placed in the first virtual space.

Second type of video: A video (i) that is displayed when the terminal device 20C determines that the single distribution mode in which the user A is the distributor is being executed, and (ii) in which the avatar of the user A that moves based on the motion of the user A is placed in the first virtual space.

Third type of video: A video (i) that is displayed when the terminal device 20C determines that the joint distribution mode in which the user A is a joint distributor is being executed, and (ii) in which the avatar of the user A that moves based on the motion of the user A and the avatar of at least one other distributor that moves based on the motion of that one other distributor are placed in the first virtual space.

Fourth type of video: A video (i) that is displayed when the terminal device 20C determines that the viewing mode in which the user A is a viewer is being executed, and (ii) in which the avatar of at least one distributor that moves based on the motion of that one distributor is placed in the first virtual space.

6-2. Modified Example

As described above, the terminal device 20C can display the second video in the input object even while executing any of the "preparation mode," the "viewing mode," the "joint distribution mode" or the "single distribution mode." When the terminal device 20C is executing a mode other than the "viewing mode" (that is, the "preparation mode," the "joint distribution mode," or the "single distribution mode"), the second video can display the avatar of the user A that moves based on the motion of the user A of the terminal device 20C. The avatar of the user A is also displayed in common (in the case of the "joint distribution mode" and the "single distribution mode") on the terminal device of each viewer and each distributor (including VR terminal devices and smartphone terminal devices). Therefore, it is conceivable that the user A would like to see the avatar of the user A displayed in this second video and check how his/her avatar is seen by others (appearance, behavior, and the like).

In consideration of such a circumstance, the terminal device 20C can display the input object (and thus the second video) in a first size when executing the "viewing mode," and can display the input object (and thus the second video) in a second size that is larger than the first size while executing the "joint distribution mode" or the "single distribution mode." As a result, while the user A is distributing the video as a distributor, the user A can see his own avatar displayed in the second video at arbitrary timing, and can easily and effectively confirm how the avatar looks. Moreover, it can be said that the situation in which the user A takes a certain amount of time to carefully check how his own avatar looks is while the terminal device 20C is executing the "preparation mode." Therefore, the terminal device 20C can display the input object (and thus the second video) in the second size larger than the first size even while executing the "preparation mode."

In addition, in the "viewing mode" described above, the terminal device 20C of the user A can display messages and/or comments, sent to the distributor from one of the viewers, in the second video displayed on the input object. Similarly, in the "single distribution mode" or the "joint distribution mode," the terminal device 20C of the user A can display messages and/or comments and the like, sent to the user A who is a distributor or to another distributor from one of the viewers, in the second video displayed on the input object. In such a case, when the number of messages or the like sent from the viewer exceeds the display area of the input object, it is conceivable to sequentially delete the oldest messages from the input object and display the new messages. On the other hand, typically the display area of the first video could be larger than the display area of the input object. Therefore, the terminal device 20C can display a message or the like sent to the distributor from each viewer in the first video. In a preferred embodiment, the terminal device 20C displays the messages or the like in an area corresponding to the background located behind the input object (for example, an area 845 or the like illustrated in FIG. 18) in the display area of the first video.

In addition, in the "viewing mode" described above, the terminal device 20C of the user A can send a gift (token) to the distributor by operating an icon or the like displayed on the input object. In this case, the terminal device 20C can more easily send the gift to the distributor using the first video. A specific example thereof will be described with reference to FIG. 20.

Figure 20:
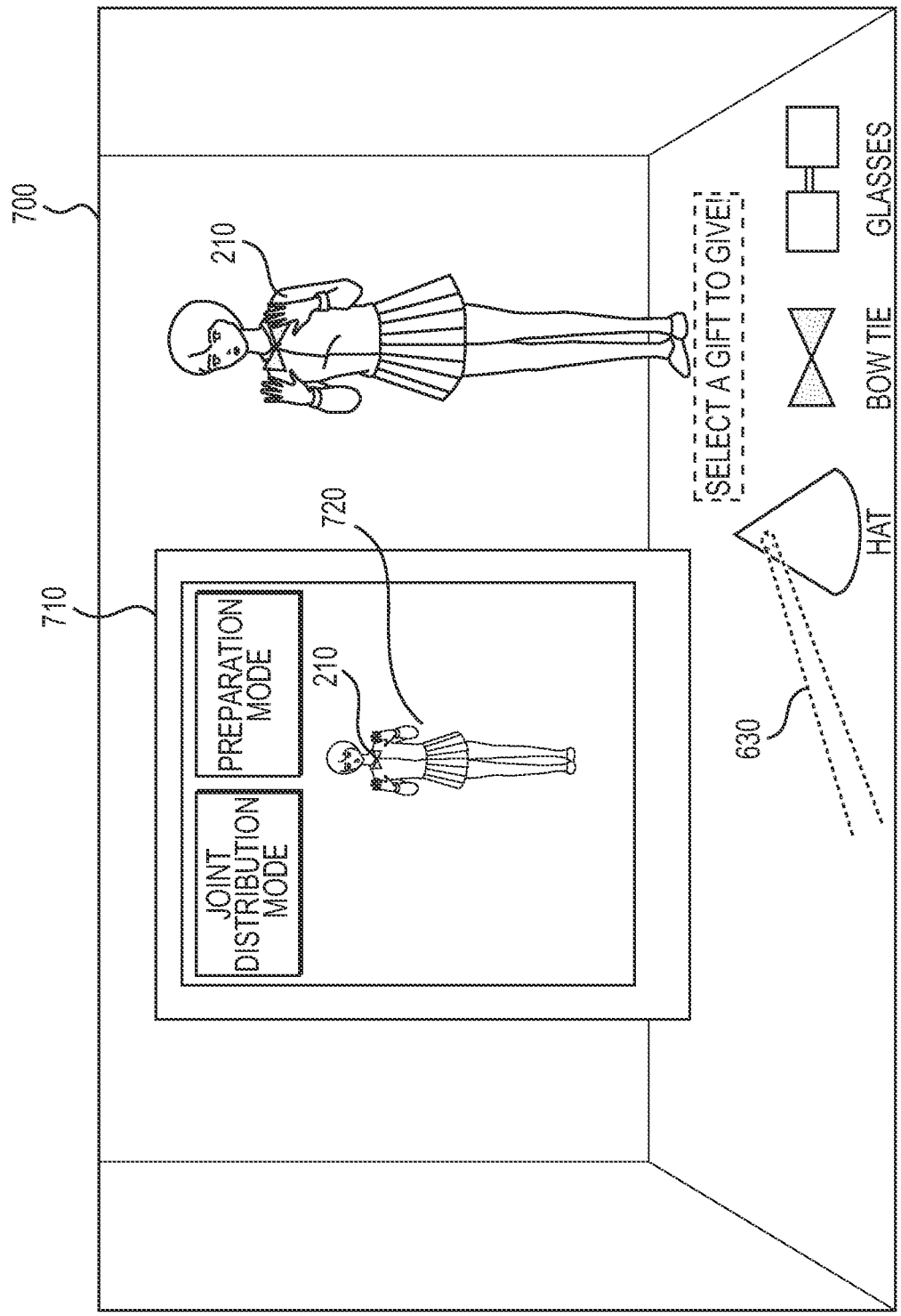
FIG. 20 is a diagram showing another example of a screen displayed when a terminal device executes a "viewing mode" in the communication system shown in FIG. 1.

FIG. 20 is a diagram showing another example of a screen displayed by the terminal device when executing the "viewing mode" in the communication system shown in FIG. 1. As illustrated in FIG. 20, the terminal device 20C can display a plurality of objects (three objects in FIG. 20) as candidates for sending at the side of, above, or below the avatar 210 of the distributor in the first video 700. The terminal device 20C can sequentially switch and display the plurality of objects displayed in the first video 700 to different objects in response to user A executing a predetermined gesture (for example, a gesture of waving the hand controller rightward or leftward, or the like) using the right-hand controller 102 (or the left-hand controller 104).

The user A can, for example, select an object to be sent and send such by aligning the pointer 630 with a desired object among the plurality of objects displayed in this way, pressing one of the buttons on the right-hand controller 102 (or the left-hand controller 104), and executing a gesture of throwing the hand controller being held. Here, suppose that the user A has decided on a "bow tie" as an object to be sent. In response to this, the distributor "Mr./Ms. Y" can operate the terminal device 20 to have the "bow tie" received as a gift attached to the avatar 210. Alternatively, the terminal device 20 of the distributor "Mr./Ms. Y" can automatically attach the "bow tie" received as a gift to the avatar 210 without any operation by the distributor "Mr./Ms. Y." As a result, the terminal device 20C can display the avatar 210 to which the bow tie is attached in the first video 700 and/or the second video 720. In this way, the terminal device 20C can provide a user interface for easily and effectively determining and sending a gift by using the larger first video rather than using the smaller input object.

Further, in the various examples described above, the description has focused on the method (client rendering method) in which the terminal device 20C executes the operations in each step (ST502 to ST514). However, in at least one of the target steps of ST502 to ST514, it is possible to adopt a method (server rendering method) in which one server device 30 alone, or a plurality of server devices 30, shares and executes the operations related to the generation of a video that have been described as being executed by the terminal device 20C. In this case, the one or more server devices 30, instead of the terminal device 20C, execute various operations related to the at least one target step so that the first video and the second video (input object) can be generated and sent to the terminal device 20C. As described in "5. Platform" above, the server device 30 receives motion data from the terminal device 20 of each distributor, so it is possible for server device 30 to execute generation of each type of video using the motion data instead of each terminal device 20. On the other hand, the server device 30 does not necessarily receive motion data from the terminal device 20 of each viewer. Therefore, when the server rendering method is adopted, the server device 30 may receive motion data from the terminal device of each viewer every unit time or at arbitrary timing.

Also, in the various examples described above, the description has focused on the method (client rendering method) in which each terminal device 20C executes the operations related to the generation of the first video and the second video (input object). However, the terminal device 20C can adopt a method (browser rendering method) in which operations related to generation of this first video and second video (input object) and the like are executed by receiving a web page from the server device 30 or a web server device 30 via a web browser and executing a computer program included in this web page.

Further, in the various examples described above, the case was described in which the avatar 450 or the like of the user A, which moves based on the motion data related to the motion of the user A, is displayed in the second video (input object). Here, while the terminal device 20C is executing any one of the "preparation mode," the "joint distribution mode," and the "single distribution mode," the image of the avatar 450 (that is, the appearance of the avatar 450) viewed from a virtual camera placed in the first virtual space can be reversed (mirrored) and displayed on the second video (input object).

In this case, since the avatar 450 placed in the first virtual space moves based on the motion data related to the motion of the user A, the avatar 450 can move in accordance with the motion of the user A (generally accurately in comparison with "reversal"). In contrast, the avatar 450 displayed in the second video (input object) is a reversal (reflection in a mirror) of the image of the avatar 450 viewed from a virtual camera placed in the first virtual space. Therefore, the appearance of the avatar 450 displayed in the second video (input object) corresponds to the reversed (mirrored) appearance of the avatar 450 in the first virtual space acting as a representation of the user A. From the viewpoint of the user A, the motion of the avatar 450 displayed in the second video (input object) corresponds to the motion of the user A himself/herself as if reflected in a mirror. As a result, the user A can observe the second video (input object) as though watching the avatar 450, which is a representation of the user A and not the user A himself/herself, move in a mirror placed before the eyes of the user A.

The image of the avatar 450 viewed from a virtual camera placed in the first virtual space is displayed in reverse in the second video (input object), and the icons, messages, comments and/or pointers, and the like displayed in the second video (input object) may be displayed as described above and not reversed.

As described above, in the various embodiments, the terminal device used by the user can display the input object that displays the second video, in combination with the first video. As a result, even if the user uses a tracking device attached to or held on the body, the user can operate the input object as if operating the display device (touch panel or the like) of a conventional terminal device, and receive an offer of services related to the distribution and/or display of the video. If the operation method for the input object (user interface, icon display, or the like) is made substantially the same or similar to the operation method used in the conventional terminal device, a user familiar with the operation method for the conventional terminal device can easily use the operation method for the input object without taking much time.

Furthermore, the terminal device can change the input object displaying the second video in accordance with the type of the first video displayed in combination with this input object. For example, the terminal device can enlarge or reduce the size of the input object displaying the second video in accordance with the type of the displayed first video.

As a result, when a user distributes the video as a distributor, prepares for distribution of the video, or the like, the user can watch the second video included in the input object displayed in an enlarged manner and more effectively check the appearance of his/her own avatar. By displaying the second video in an enlarged manner in this way, the user can more easily check his/her own avatar which has been enlarged for easy viewing. In addition, when the user, as a viewer, watches the video distributed to the distributor, the user can more effectively enjoy the avatar of the distributor displayed in the first video by using the first video displayed on a relatively wide area as the input object is being reduced in size.

Furthermore, the terminal device automatically changes the size of the input object in accordance with the state of the user, that is, whether the user is in a state of distributing a video (or preparing to distribute a video) or is in a state of viewing a video, and thus can eliminate the need for time-consuming and labor-intensive operations by the user via a touch panel, a user interface, or the like. Thus, not only can usability be improved, but the power consumption of the terminal device and/or the tracking device can also be reduced.

Furthermore, the user only needs to operate the input object (that is intuitively easy to accept, such as a mirror) that is virtually expressed on a display or the like, without holding a physically existing smartphone, tablet, or the like, and therefore the user can freely move his/her limbs when distributing the video or when preparing to distribute the video (or when viewing the video). Therefore, usability can be improved in this sense as well.

7. Regarding Closet Mode

7-1. Basic Configuration

Figure 21:
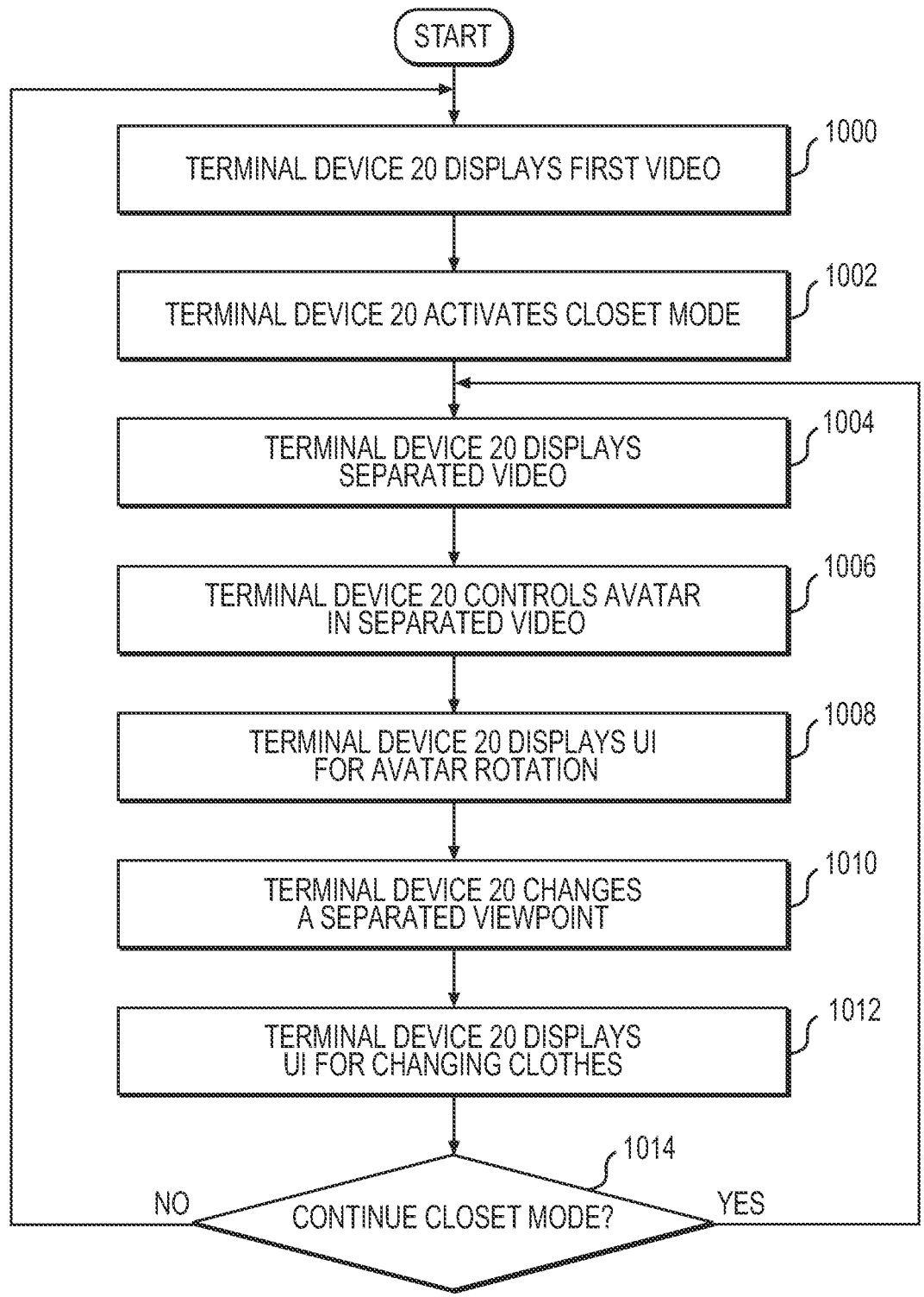
FIG. 21 is a flow diagram explaining another example of operations executed by the communication system 1 shown in FIG. 1.

Next, a mode (closet mode) that changes the display method of the avatar of the user in combination with the above-described first video will be described with reference to FIG. 21. FIG. 21 is a flowchart explaining another example of operations executed by the communication system 1 shown in FIG. 1.

Again, for the purpose of convenience, the operations executed in the communication system 1 in relation to the above-described terminal device (VR terminal device) 20C of the user A will be described, but such operations may be similarly applied to the terminal device (VR device) 20 of any other user as well.

Referring to FIG. 21, first, in ST1000, the terminal device 20C can display the first video. As described above, the first video may be a video that is generated based on the motion data relating to the user A and depicts the first virtual space (three-dimensional virtual space) as viewed from the viewpoint of the user A. For example, the first video may be the first video displayed when the terminal device 20C is executing the above-described "preparation mode," "joint distribution mode," or "single distribution mode." The details of this first video are as described above, so the description thereof will be omitted.

Next, in ST1002, the terminal device 20C can activate the closet mode when the user A executes a specific operation indicating that the closet mode is to be executed. The terminal device 20C can execute the closet mode in any situation in which the user A wants to objectively observe his/her own avatar. This situation may include at least one situation exemplified below.

A situation in which the user A attaches or detaches an object, gift, and/or item, or the like to/from his/her own avatar.

A situation in which the user A checks his/her own avatar as a preparatory step before distributing a video containing his/her own avatar.

A situation in which the user A is live-distributing a video containing his/her own avatar.

Further, the specific operation referred to here can be, for example, at least one of the operations exemplified below.

User A holds the right-hand controller 102 (or the left-hand controller 104) and makes a specific gesture.

User A presses one of the buttons provided on the right-hand controller 102 (or the left-hand controller 104).

User A has the HMD 100 attached to his/her head and makes a specific gesture (for example, shakes the head left and right).

User A selects a specific icon displayed on the above-mentioned input object.

By activating the closet mode, in ST1004, the terminal device 20C can display a separated video instead of the first video (for example, the first video 400A shown in FIG. 13) that has been displayed so far. The separated video (which is described as a "second video" for convenience in the Scope of Claims) may be a video that depicts the first virtual space including the avatar of the user A from a separated viewpoint at a distance from the avatar of the user A, moving based on the motion data relating to the motion of the user A.

Figure 22:
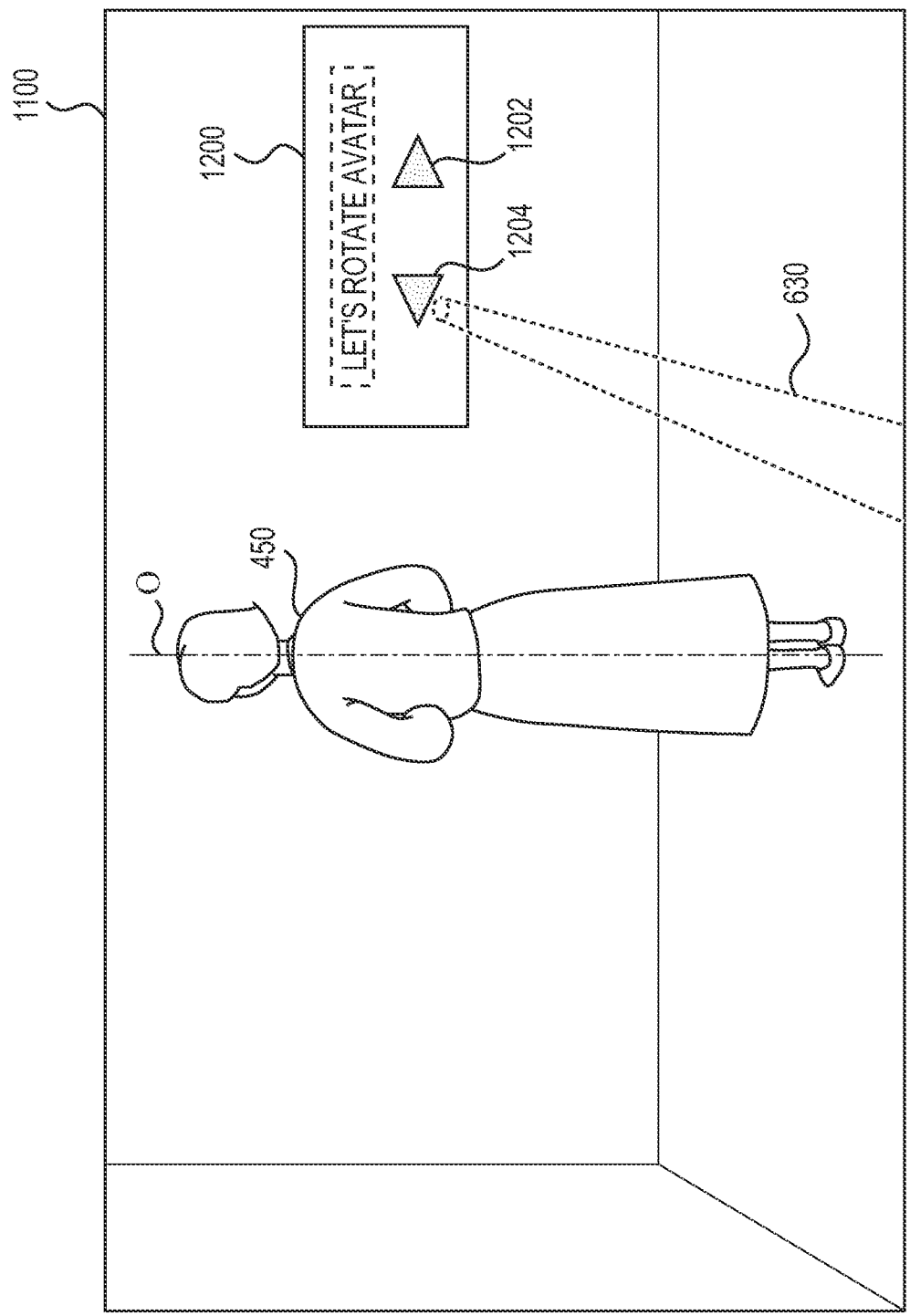
FIG. 22 is a diagram showing an example of a screen displayed when a terminal device executes a "closet mode" in the communication system shown in FIG. 1.

FIG. 22 is a diagram showing an example of a screen displayed by the terminal device when executing the "closet mode" in the communication system shown in FIG. 1. As exemplified in FIG. 22, a separated video 1100 may be a video depicting the above-described first virtual space (three-dimensional virtual space) including the avatar 450 as viewed from a separated viewpoint at a distance from the avatar 450 of the user A.

The first video (here, the first video 400A shown in FIG. 13) displayed by the terminal device 20C until the separated video 1100 is displayed is depicted from the viewpoint of the avatar 450 (the user A who is at substantially the same position as the avatar 450), so only a portion (for example, the left hand 450a) is displayed as the avatar 450. In contrast, since the separated video 1100 is depicted from a separated viewpoint that is at a distance from the avatar 450, a large portion of the avatar 450 (in FIG. 22, the whole body seen from behind) can be displayed as the avatar 450. Although FIG. 22 shows the first virtual space depicted as seen from a separated viewpoint placed at the upper left rear side of the avatar 450, the separated viewpoint can be placed at an arbitrary position at a distance from the avatar 450. For example, the terminal device 20C can display the separated video 1100 in which (the face or the like of) the avatar 450 is depicted from the front by placing the separated viewpoint in front of the avatar 450.

Furthermore, when the terminal device 20C starts displaying the separated video 1100, the terminal device 20C can depict the avatar 450 in the separated video 1100 so as to maintain the pose expressed by the avatar 450 in the first video displayed up to that point. Alternatively, the terminal device 20C can depict the avatar 450 in the separated video 1100 so as to reflect any one pose automatically selected or any one pose selected by the user A, out of at least one default pose prepared in advance, at the time when displaying of the separated video 1100 began.

In addition, the separated video 1100 shown in FIG. 22 does not display the avatar 220 or the avatar 210 shown in FIG. 13 for the purpose of simplification of the drawing. However, if these avatars enter the field of vision from the separated viewpoint, the separated video 1100 can also depict these avatars. This similarly applies to FIGS. 22, 25, and 27 to be referenced later.

Figure 23:
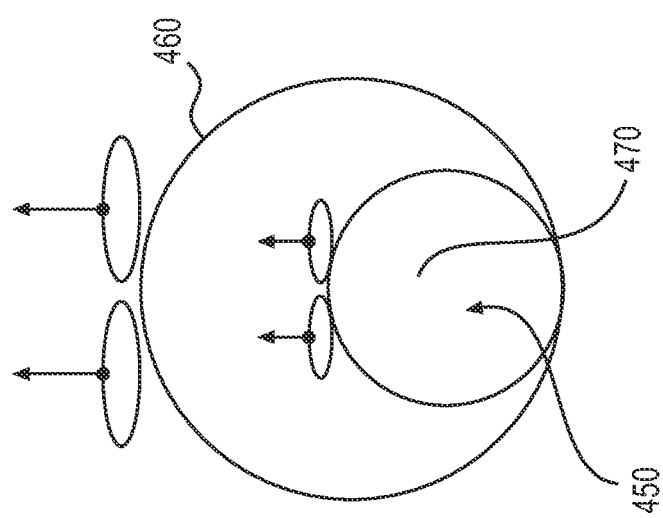
FIG. 23 is a diagram conceptually showing a viewpoint of a user (avatar) used in generating a first video in the communication network 1 shown in FIG. 1.
Figure 24B:
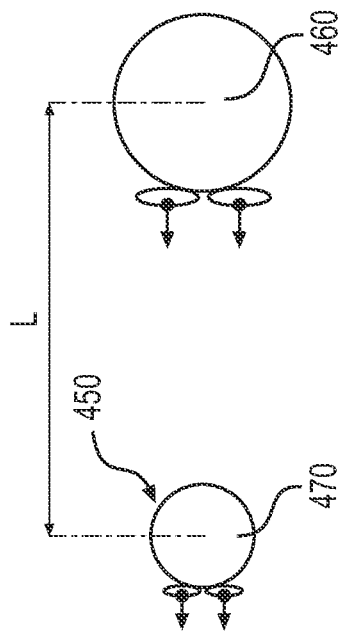
FIGS. 24A to 24C are diagrams conceptually showing a separated viewpoint used in generating a separated video in the communication network shown in FIG. 1.
Figure 24C:
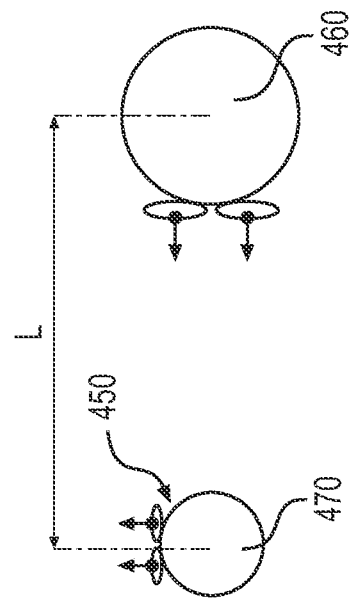
Figure 24A:
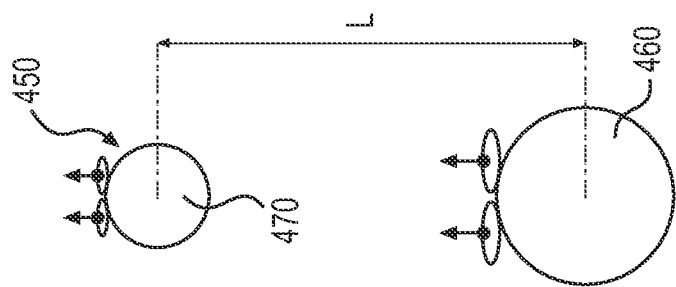

Here, the separated viewpoint will be described in comparison with the viewpoint of the user A (avatar 450). FIG. 23 is a diagram conceptually showing the viewpoint of the user (avatar) used in generating the first video in the communication network 1 shown in FIG. 1. FIGS. 24A to 24C are diagrams conceptually showing a separated viewpoint used in generating a separated video in the communication network shown in FIG. 1.

Referring to FIG. 23 related to the first video, FIG. 23 shows a head 460 of the user A viewed from above and a head 470 of the avatar 450 viewed from above. As shown in FIG. 23, the first video depicts the first virtual space as viewed from the viewpoint of the user A or the avatar 450 in a situation in which the head 470 of the avatar 450 is placed on top of the head 460 of the user A. Therefore, from such a viewpoint, the first video cannot depict the entire body of the avatar 450 and depicts only a portion 450a of the avatar 450, as shown in FIG. 13.

Referring to FIGS. 24A to 24C related to the separated video, in FIGS. 24A to 24C as well, the head 460 of the user A is shown from above, and the head 470 of the avatar 450 is shown from above. As shown in FIGS. 24A to 24C, the separated video depicts the first virtual space, for example, by setting the viewpoint (separated viewpoint) on the head 460 of the user A separated at a distance L from the head 470 of the avatar 450. Therefore, with such a separated viewpoint, the separated video can depict a larger portion of the avatar 450.

Returning to FIG. 21, next in ST1006, the terminal device 20C can control the motion of the avatar 450 displayed in the separated video 1100. The avatar 450 displayed in the first video 400A (FIG. 13 and the like) can move based on the motion data related to the motion of the user A, as described above. The avatar 450 displayed in the separated video 1100 (FIG. 22 and the like) can also basically move based on the motion data related to the motion of the user A. That is, the avatar 450 displayed in the separated video 1100 moves, basically reflecting the motion of the user A. For example, if the user A makes a gesture of raising his/her right hand which grasps the right-hand controller 102, in response to this, the avatar 450 can also raise its right hand in the separated video 1100 illustrated in FIG. 22.

In one embodiment, the terminal device 20C can control the motion of the avatar 450 so that the position (coordinates) of the avatar 450 does not change in the separated video 1100, regardless of the content of the motion data of the user A. For example, even if the user A presses one of the buttons on the right-hand controller 102 (or the left-hand controller 104) that is prepared to generate motion data indicating forward or backward motion of the avatar 450, the terminal device 20C can invalidate the motion data indicating such forward or reverse motion. Furthermore, for example, based on the position of the HMD 100 moving when the user A moves his/her head to which the HMD 100 is attached forward or backward, the terminal device 20C can invalidate the motion data indicating forward or backward motion generated by the HMD 100.

The closet mode can be executed for the purpose of user A checking the appearance of avatar 450. It is useful to avoid motion of the avatar 450 to a position in the first virtual space not intended by the user A due to the motion of the user A while the user A watches the avatar 450 to check the appearance of the avatar 450. Therefore, the terminal device 20C can control the motion of the avatar 450 so as not to change the position (coordinates) of the avatar 450 regardless of the motion data of the user A.

Further, in one embodiment, the terminal device 20C can control the motion of the avatar 450 so that the avatar 450 does not rotate about a rotation axis extending in the vertical direction in the first virtual space, regardless of the content of the motion data of the user A, in the separated video 1100. Here, FIG. 22 shows a rotation axis O extending in the vertical direction in the first virtual space in order to make the explanation easier to understand, but the separated video 1100 does not need to display such a rotation axis O (or may display the rotation axis O).

A process for suppressing the avatar 450 from rotating about the rotation axis O will be described with reference to FIGS. 24A to 24C used above. In FIG. 24A, the head 460 of the user A is positioned at a distance L from the head 470 of the avatar 450. A viewpoint viewed from the head 460 of the user A arranged in this manner is a separated viewpoint.

In the state shown in FIG. 24A, in order to change the observed part of the avatar 450 while maintaining the distance L from the head 460 of the user A, for example, the user A thinks about causing the viewpoint of the user A to rotate counterclockwise 90 degrees on the paper surface by executing an operation of pressing one of the buttons provided on the right-hand controller 102 (or the left-controller 104). With such motion data based on the motion of the user A, the head 460 of the user A can move to the position shown in FIG. 24B. However, in accordance with such motion data, the avatar 450 will also rotate counterclockwise 90 degrees as well. As a result, as is clear from FIG. 24B, the head 460 of the user A will continue to face the back of the avatar 450 in either of the states shown in FIGS. 24A and 24B. Thus, if the avatar 450 is rotated in conjunction with motion data indicating the motion of the user A, the user A cannot change the observed part of the avatar 450.

On the other hand, when the avatar 450 is not rotated about the rotation axis O extending in the vertical direction of the avatar 450, in the state shown in FIG. 24A, when the viewpoint of the user A is rotated 90 degrees counterclockwise on the paper surface by the user A operating the left-hand controller 102 or the like, the head 460 of the user A can face the right side surface of the avatar 450, as shown in FIG. 24C. Therefore, by suppressing the avatar 450 from rotating about the rotation axis O, the user A can change the observed part of the avatar 450.

Thus, in the separated video 1100, the terminal device 20C controls the motion of the avatar 450 so that the avatar 450 is not rotated about the rotation axis extending in the vertical direction in the first virtual space, regardless of the content of the motion data of the user A, whereby the user A can objectively observe the appearance of the avatar 450 (with or without at least one object attached) from a desired angle.

Suppressing the avatar 450 from being rotated about the rotation axis O means that the head of the avatar 450 cannot be shaken to the right or left (so-called head shaking) (the direction/angle in which the head of the avatar 450 faces does not change) even if the user A to which the HMD 100 is attached shakes his/her head to the right or left (rotating the head clockwise or counterclockwise about a rotation axis extending in the vertical direction).

Therefore, in one embodiment, the terminal device 20C can also have a function that enables rotation of the avatar 450. Specifically, returning to FIG. 21, in ST1008, the terminal device 20C can display a user interface for rotating the avatar.

For example, in the separated video 1100, the terminal device 20C can display a specific user interface 1200 as shown in FIG. 22. This user interface 1200 can include, for example, (i) a right icon 1202 for rotating the avatar 450 clockwise about the rotation axis O, and (ii) a left icon 1204 for rotating the avatar 450 counterclockwise about the rotation axis O. Furthermore, the terminal device 20C can also display the pointer 630 described above in association with the user interface 1200. The user A moves the right-hand controller 102 or the like, for example, to align the pointer 630 with the right icon 1202 (or the left icon 1204) and presses one of the buttons provided on this hand controller, whereby the terminal device 20C can rotate the avatar 450 clockwise (or counterclockwise) about the rotation axis O at an angle corresponding to the number of pressings or the time of the pressing. An example is shown in FIG. 25.

Similarly, in the separated video 1110, although not shown in FIG. 22, the terminal device 20C can display not only the rotation axis O of the entire avatar 450, but also, for each of a plurality of elements, including a plurality of parts and a plurality of bones included in the avatar 450, an interface for rotating that element about its rotation axis. The plurality of elements may include, but is not limited to, the head, right arm, left arm, right leg, left leg, upper body and/or lower body, or the like. The user A selects an object (an icon for rotating the element clockwise, an icon for rotating the element counterclockwise, or the like) provided in association with the desired element in the user interface displayed in this manner, whereby the terminal device 20C can rotate and move that element on the avatar 450, that is, finely adjust the pose expressed by the avatar 450, in the separated video 1100. Here, rotating and moving the above elements may include, but is not limiting to, tilting the head of the avatar 450 diagonally, rotating only the head of the avatar 450, horizontally extending only the right hand of the avatar 450, kicking with only the left leg of the avatar 450, and the like. As a result, the terminal device 20C can cause numerous variations of motion in the avatar 450 in the separated video 1100 while reducing the volume of motion data received from the HMD 100, the right-hand controller 102, and/or the left-hand controller 104. Therefore, it is also possible to suppress the power consumption of the terminal device 20C.

Figure 25:
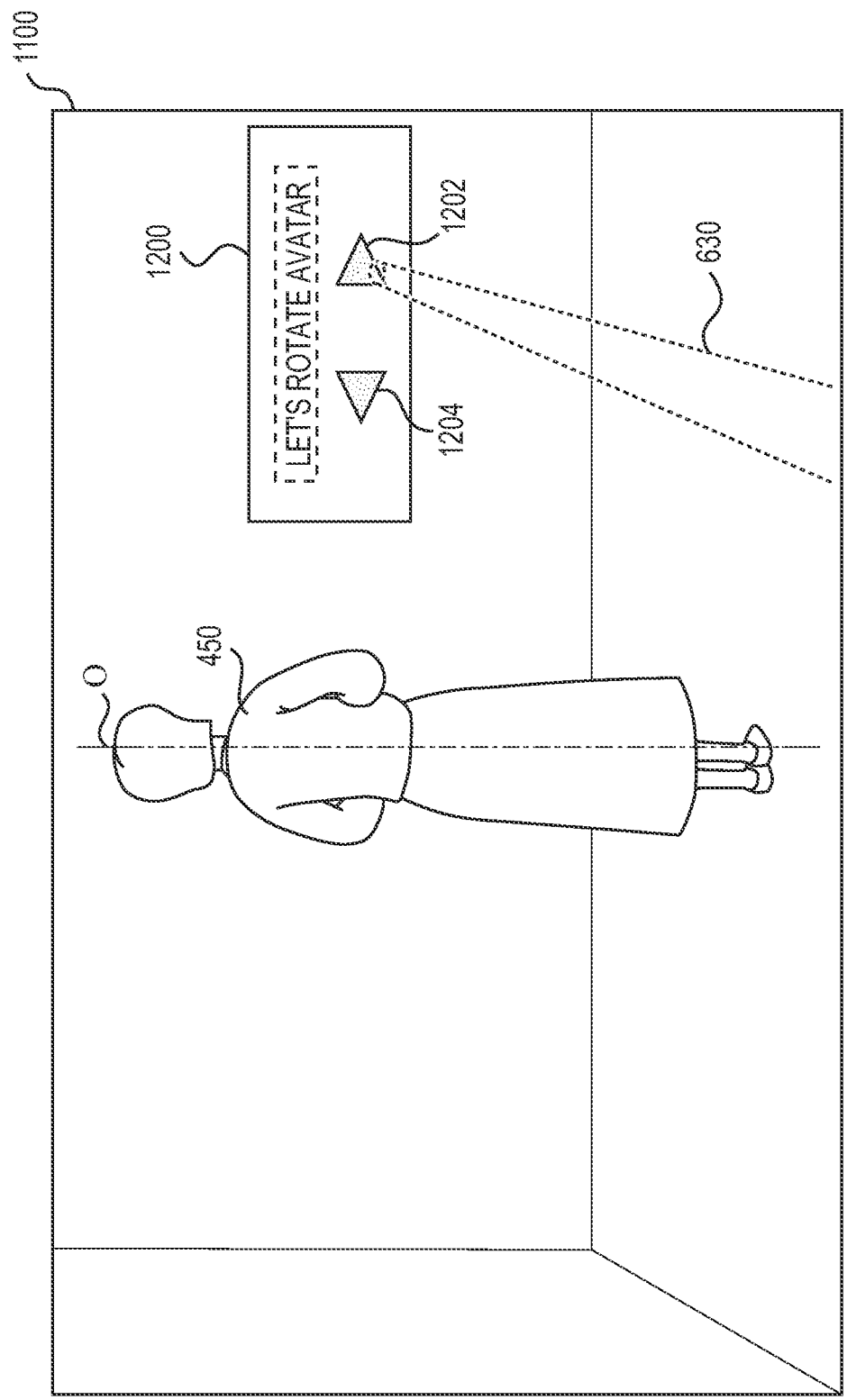
FIG. 25 is a diagram showing another example of a screen displayed when a terminal device executes a "closet mode" in the communication system shown in FIG. 1.

In place of or in addition to this, although not shown in FIGS. 22 and 25, the terminal device 20C can display, in the separated video 1100, a specific user interface including displays such as "if the right-hand controller is shaken to the right, the avatar can be rotated rightward" or "if the left-hand controller is shaken to the left, the avatar can be rotated leftward." In this case, by the user A operating the right-hand controller and/or the left-controller as instructed, the terminal device 20C can rotate the avatar 450 clockwise or counterclockwise about the rotation axis O (and/or move desired elements in the avatar 450).

In place of or in addition to this, although not shown in FIGS. 22 and 25, the terminal device 20C can also display, in the separated video 1100, a specific user interface including a display related to a temporary release mode that temporarily allows rotation of the avatar 450 (that is, causes rotation of the avatar 450 similar to in the first video in accordance with the motion data related to the motion of the user A). In this case, the user A presses one of the buttons provided on the right-hand controller or the left-hand controller, or operates the pointer 630 using the right-hand controller or the left-hand controller, whereby the terminal device 20C can execute the temporary release mode.

Returning to FIG. 21, next, in ST1010, the terminal device 20C can change the separated viewpoint applied to the separated video. Specifically, for example, although not shown in FIGS. 22 and 25, the terminal device 20C can also display, in the separated video 1100, a specific user interface for changing the separated viewpoint. This user interface may include at least one icon or the like. The user A can, for example, move the right-hand controller 102 or the like to align the pointer 630 (see FIG. 22 or the like) with such an icon, and press one of the buttons provided on this hand controller. Thereby, the terminal device 20C can change the distance between the head 470 of the avatar 450 and the head 460 of the user A (viewpoint of the user A) and/or the coordinates (x, y, z) of the head 460 of the user A (viewpoint of the user A) in the first virtual space, shown in FIGS. 24A to 24C. The terminal device 20C can generate and display a separated video depicting the first virtual space viewed from the separated viewpoint thus changed.

In place of or in addition to this, although not shown in FIGS. 22 and 25, the terminal device 20C can also display, in the separated video 1100, a specific user interface that includes a display such as "pressing a button on the right-hand controller causes the distance between the avatar and the viewpoint of the user to increase," "pressing a button on the left-hand controller causes the distance between the avatar and the viewpoint of the user to decrease," "tilting the joystick on the right-hand controller changes the viewpoint of the user horizontally," or "tilting the joystick on the left-hand controller changes the viewpoint of the user vertically." In this case, the user A operates the right-hand controller and/or the left-hand controller as instructed, whereby the terminal device 20C can change the distance between the head 470 of the avatar 450 and the head 460 of the user A (the viewpoint of the user A) and/or the coordinates (x, y, z) of the head 460 of the user A (the viewpoint of the user A) in the first virtual space, shown in FIGS. 24A to 24C.

In another example, the terminal device 20C can use, as the separated viewpoint, the viewpoint of the avatar of another distributor existing in the first virtual space. For example, when the terminal device 20C has displayed the first video 400A shown in FIG. 13 until the closet mode is activated in ST1002, at present as well, the user A distributes the video jointly with the first distributor corresponding to the avatar 210 and the second distributor corresponding to the avatar 220. As described above, the avatar 210 moves based on the motion of the first distributor using a plurality of tracking devices.

Figure 26:
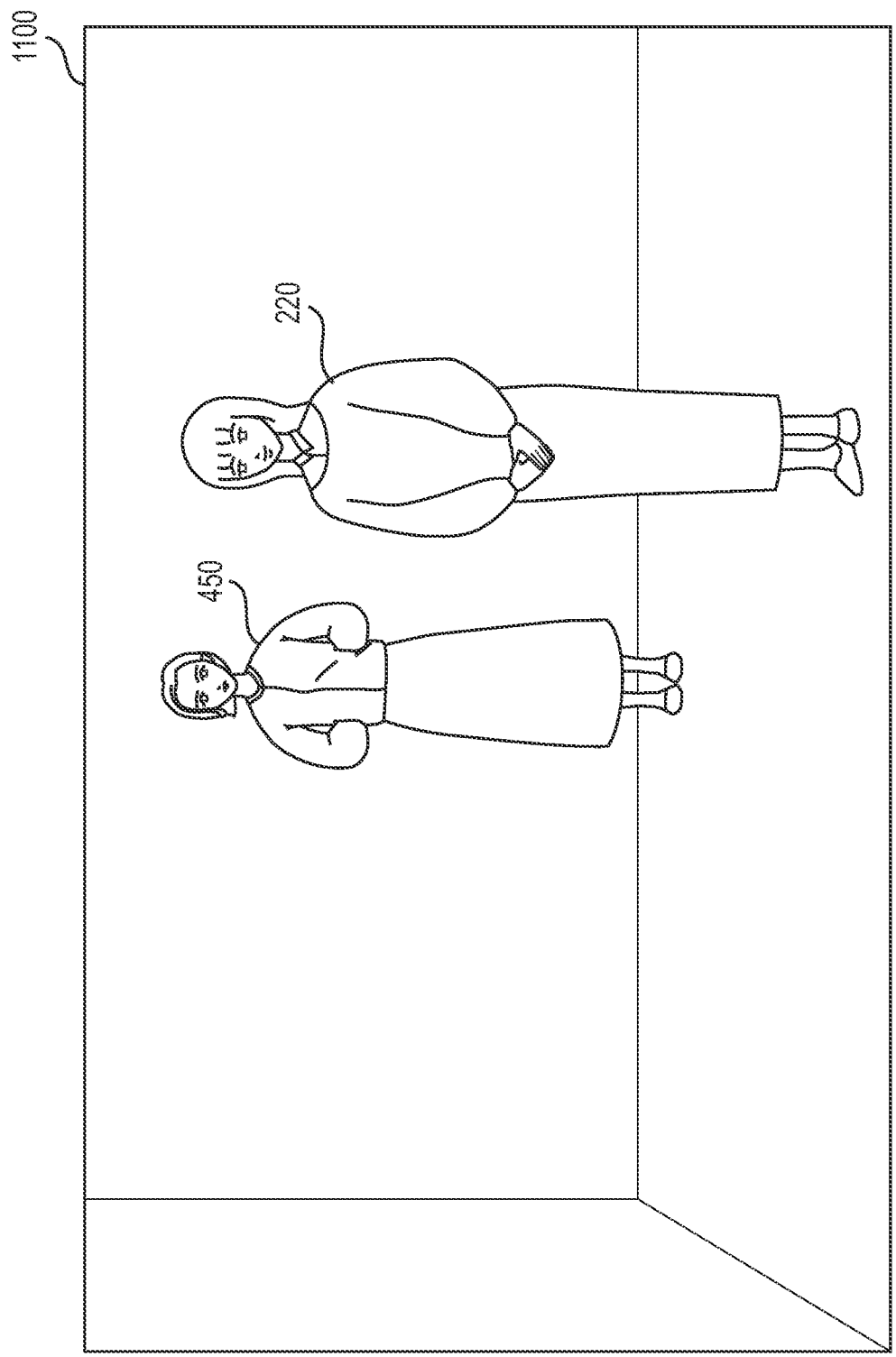
FIG. 26 is a diagram showing another example of a screen displayed when a terminal device executes a "closet mode" in the communication system shown in FIG. 1.

In this case, the terminal device 20C can display the first video 400A in which the avatar 210 is placed at the position illustrated in FIG. 13 because the coordinates of the avatar 210 in the first virtual space are continuously recognized based on the motion data received from the terminal device 20 of the first distributor via the server device 30. Therefore, the terminal device 20C can use the coordinates of the avatar 210 continuously recognized in this way as the coordinates at which the separated viewpoint should be placed. Accordingly, the terminal device 20C can display the separated video 1100 as shown in FIG. 26, for example, by using the viewpoint of the avatar 210 as the separated viewpoint. As an example, in this separated video 1100, the avatar 450 of the user A can be displayed as viewed from the front. In the example shown in FIG. 26, since the avatar 220 of another distributor is within the field of view from the separated viewpoint, the separated video 1100 can depict not only the avatar 450, but also the avatar 220.

Although depicted from the viewpoint of the avatar 210 of the first distributor, the separated video 1100 is displayed on the terminal device 20C of the user A, and may not be displayed on the terminal device 20 of the first distributor.

In another example, the terminal device 20C can use, as the separated viewpoint, the viewpoint of the avatar of any viewer existing in the first virtual space. According to the principle described in "5. Platform" above, the terminal device 20C of the user A who is the distributor sends motion data showing the motion of this user A to the server device 30. The terminal device (VR terminal device) 20 of another distributor or the terminal device (VR terminal device) 20 of a viewer can place the avatar 450 of the user A that moves based on the motion data received from the server 30 in the first virtual space, and can generate and display the first video depicted from the viewpoint of the other distributor or the viewer.

The terminal device 20C of the user A can also use, as the separated viewpoint, the viewpoint of the other distributor or the viewer in the first virtual space. In this case, since the terminal device 20C receives the motion data related to the motion of the distributor from the terminal device 20 of the other distributor via the server device 30, the terminal device 20C can recognize the coordinates of the avatar of the distributor in the first virtual space.

On the other hand, because the terminal device 20C does not receive the motion related to the viewer's motion from the terminal device 20 of the viewer via the server device 30, the terminal device 20C cannot recognize the coordinates of the avatar of the viewer in the first virtual space as is. Therefore, in order to recognize the coordinates of the avatar of the viewer in the first virtual space, the terminal device 20C can receive the coordinates of the avatar of the viewer, or motion data relating to motion of the viewer for calculating the coordinates, or the like, from the terminal device of the viewer via the server device 30.

In such a case as well, the separated video 1100 is displayed on the terminal device 20C of the user A, and it can be implemented so that the separated video 1100 is not displayed on the terminal device 20 of the distributor and the terminal device 20 of the viewer.

In addition, here, a case was explained in which the terminal device 20C uses the viewpoint of the avatar of the distributor and/or the viewer placed in the first virtual space as the separated viewpoint used when depicting the separated video 1100. However, this is merely an example, and the terminal device 20C can use the viewpoint of any other avatar placed (existing) in the first virtual space as the separated viewpoint used when depicting the separated video 1100.

Returning to FIG. 21, next, in ST1012, the terminal device 20C can display a user interface for changing clothes on the avatar 450.

Figure 27:
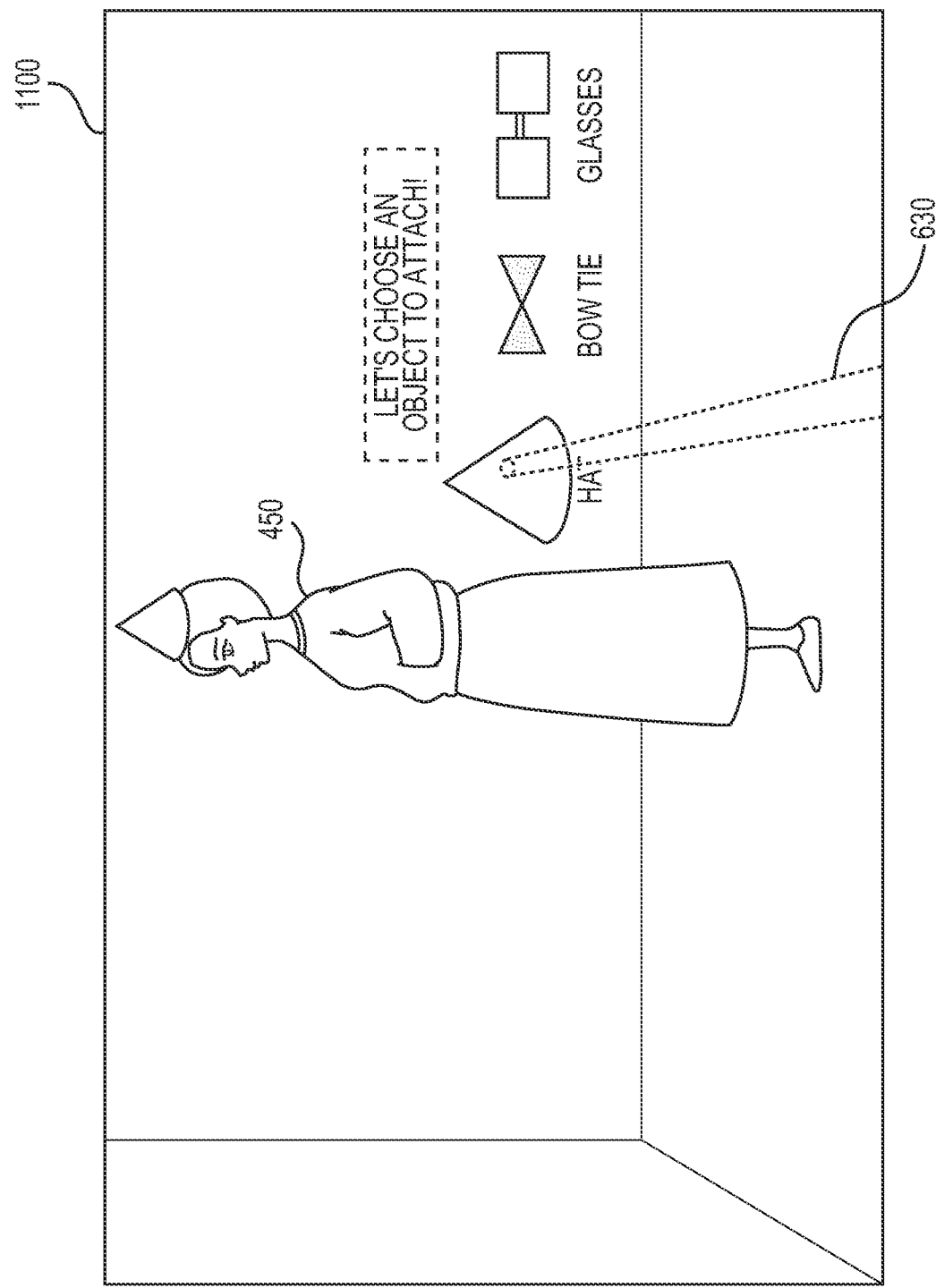
FIG. 27 is a diagram showing another example of a screen displayed when a terminal device executes a "closet mode" in the communication system shown in FIG. 1.

FIG. 27 is a diagram showing another example of a screen displayed by the terminal device when executing the "closet mode" in the communication system shown in FIG. 1. As exemplified in FIG. 27, the terminal device 20C can display a plurality of objects (in FIG. 27, three objects) as candidates for attachment to the avatar 450, to the side of, above or below the avatar 450 of the user A, in the separated video 1100. The plurality of objects may include an object sent to the user A from a viewer as a gift.

The plurality of objects can include, but is not limited to, at least one of the plurality of objects exemplified below.

An object purchased by the user A from a company that runs the video distribution service.

An object granted to the user A by the above company as a reward.

An object acquired from the above company by spending arbitrary points the user A owns.

An object that the user A has taken over or purchased from other users.

An object created by the user A.

Furthermore, the terminal device 20C can also sequentially switch and display a plurality of objects displayed in the separated video 1100 to different objects in response to the user A executing a predetermined gesture (for example, a gesture of waving the hand controller rightward or leftward) using the right-hand controller 102 (or the left-hand controller 104).

The user A, for example, aligns the pointer 630 (indicating object) with a desired object among the plurality of objects displayed in this way and presses one of the buttons on the right-hand controller 102 (or the left-hand controller 104), whereby the desired object (here, a "hat") can be attached to the pointer 630 in the separated video 1100 (this object can be determined as an addition object). In this state, by moving the right-hand controller 102 (or the left-hand controller 104), the user A can move (so-called drag) the "hat" object attached to the pointer 630 until the object contacts the avatar 450. After that, the user A releases the one of the above buttons on the right-hand controller 102 (or the left-hand controller 104), and through this can detach the "hat" object from the pointer 630 and attach such to the avatar 450, in the separated video 1100.

The user A can also remove an object from the avatar 450 by executing a similar drag operation using the pointer 630 on an object attached to the avatar 450.

The avatar 450 with an object thus attached or removed is displayed in the separated video 1100 (the first video and/or the input object after the closet mode ends).

Returning to FIG. 21, in ST1014, the terminal device 20C can determine whether to continue the closet mode. For example, the terminal device 20C can make such a determination based on whether the user A has executed a motion or operation to end the closet mode.

When it is determined that the closet mode is to continue, the terminal device 20C returns to ST1004 described above. On the other hand, when it is determined that the closet mode is to end, the terminal device 20C returns to ST1000 described above.

The operations executed in each of ST1004 to ST1014 have been described in this order for convenience. However, these steps are not necessarily executed in this order and may be executed in a different order. Also, a plurality of steps among these steps may be executed in parallel.

7-2. Modifications

In the various examples described above, a case was described in which the terminal device 20C switches between a mode (first mode) in which a first video is displayed in an area of the display portion and a mode (second mode: closet mode) in which a separated video is displayed in the area, that is, a case in which the terminal device 20C does not display the separated video (or the first video) in the area during the time when the first video (or the separated video) is displayed in the area. In this case, referring to the flowchart shown in FIG. 21, during the period in which ST1002 to ST1014 are executed, the terminal device 20C can execute the process of generating the first video in parallel so that the first video can be displayed instead of the second video at arbitrary timing.

On the other hand, in another example, the terminal device 20C can also display the separated video in another area of the display portion in parallel with displaying the first video in a part of the area of the display portion, that is, can display the first video and the separated video in separate areas in parallel (the above-mentioned part of the area and the above-mentioned other area of the display portion may partially overlap). In this case, referring to the flowchart shown in FIG. 21, during the period ST1002 to ST1014 are executed, the terminal device 20C can generate and display the first video in parallel with these steps. In this other example, the terminal device 20C can display only one of the first video and the separated video at a particular timing, and can display both the first video and the separated video at another timing.

In the other example, for example, in the first video, the terminal device 20C can cause the avatar 450 of the user A to move based on the first motion data related to the motion of the user A, that is, can cause the motion of the user A to be reflected in the avatar 450. In this case, the terminal device 20C can display a virtual mirror arranged in the first virtual space in the first video, and display the avatar 450 reflected in this mirror. This virtual mirror can display, reversed as in a mirror, the avatar 450 depicted from a viewpoint (mirror position) arranged in the first virtual space.

Furthermore, in this other example, in the first video, the terminal device 20C can change the viewpoint of the avatar 450 of the user A and/or can move the avatar 450 of the user A, based on the first motion data.

In addition, in this other example, the terminal device 20C can change the separated viewpoint based on the first motion data in the separated video, or can keep the separated viewpoint unchanged regardless of the first motion data. Further, in the separated video, the terminal device 20C can either (i) move the avatar 450 of the user A based on the first motion data, or (ii) move the avatar 450 of the user A regardless of the first motion data.

Regarding (ii) above, for example, the terminal device 20C can display the avatar 450 in a still state in the separated video, or can automatically move the avatar 450 regardless of the first motion data.

Regarding (i) above, the terminal device 20C can, for example, adopt a configuration in which the avatar 450 of the user A is moved (for example, the limbs of the avatar 450 are moved) based on part of the first motion data in the separated video, and the avatar 450 of the user A is not moved (for example, the position of the avatar 450 is not changed) based on the remaining motion data. That is, the terminal device 20C can adopt a configuration in which only part of the first motion data is used as tracking data, and the rest of the motion data is not used as tracking data.

Thus, an example in which the terminal device 20C moves the avatar 450 based on part of the first motion data and does not cause the avatar 450 to move based on the remaining motion data in the separated video may include, but is not limited to, at least the examples listed below.

The right hand and/or left hand of the avatar 450 is moved, and the right leg and/or left leg of the avatar 450 is not moved.

Only the head of the avatar 450 is moved, and other parts of the avatar 450 are not moved.

In addition, some parts (one or more parts) of the avatar 450 are moved, and the other parts of the avatar 450 are not moved.

Furthermore, the terminal device 20C can also execute motion that combines (i) and (ii) above. Specifically, the terminal device 20C can move some parts (one or more parts) of the avatar 450 based on part of the first motion data, and automatically move other parts (for example, the remaining parts). For example, the terminal device 20C can move the head of the avatar 450 (or the head and both hands of the avatar 450) based on the motion data, and automatically move other parts (for example, the remaining parts) of the avatar 450.

In addition, in this other example, in the separated video, the terminal device 20C can cause the avatar 450 of the user A to reflect, from among a plurality of poses prepared in advance, one of the poses selected by the user A or one of the poses automatically selected. The plurality of poses mentioned above can for example include, but is not limited to, a cute pose, a pose expressing a peace sign with the right hand, a pose of drawing a heart with both hands, and/or a pose of raising both hands upwards.

Thus, in the separated video, the terminal device 20C can objectively realize customization with respect to the avatar 450 of the user A while reducing a load required in drawing processing (and thus reducing power consumption by the terminal device 20C) by not using at least part of the first motion data in depicting the avatar 450 (stopping part of the tracking).

In the various examples described above, the terminal device 20C can also change the facial expressions of at least one avatar (for example, the avatar 450, the avatar 220, or the like) depicted in the separated video in accordance with a lip-sync method. In order to realize this, the terminal device 20C can acquire audio data that is based on speech of the user corresponding to the avatar. For example, the terminal device 20C can acquire audio data that is based on the speech of the user A in order to change the facial expression of the avatar 450, and can acquire audio data that is based on the speech of the second distributor in order to change the facial expression of the avatar 220. The method of acquiring such audio data is as described in "5. Platform" above. The terminal device 20C can identify an emotion of the speaker by analyzing the intonation and/or speech speed or the like of the speaker based on the audio data thus acquired. The terminal device 20C can reflect the emotion thus identified in the facial expression of the avatar displayed in the separated video. In addition, a method (e.g., a face tracking method) may be adopted that, based on information acquired by the camera 24a provided in the terminal device 20C (including the HMD 100), generates motion data indicating the depth of each of a plurality of regions of the user's face, as well as the coordinates and angles of the user's head.

Also, in the above-described various examples, the description has focused on a method (client rendering method) in which the terminal device 20C executes the operations in each step (ST1000 to ST1014). However, a method (server rendering method) can be adopted in which, in at least one target step from ST1000 to ST1014, one server device 30 alone or a plurality of server devices 30 jointly executes operations related to the generation of the video, which have been described as being executed by the terminal device 20C. In this case, the one or more server devices 30, instead of the terminal device 20C, can generate and send to the terminal device 20C the first video and the separated video (including various user interfaces) by executing various operations related to the at least one target step. In addition, as described in "5. Platform" above, the server device 30 receives the motion data and/or the operation data from the terminal device 20 of each distributor, and consequently can execute generation of the various types of videos (various processes including the process of attaching an object to the avatar 450 or removing an object from the avatar 450 in the first video and/or the separated video as described above in the modified examples) using the motion data and/or operation data received, in place of each of the terminal devices 20. On the other hand, the server device 30 does not necessarily receive the motion data from the terminal device 20 of each viewer. Therefore, when the server rendering method is adopted, the server device 30 may receive the motion data from the terminal device of each viewer every unit time or at arbitrary timing.

Also, in the various examples described above, the description has focused on a method (client rendering method) in which each terminal device 20C executes the operations related to the generation of the first video, the separated video, and the like. However, the terminal device 20C can also adopt a method (browser rendering method) in which a web page is received from the server device 30 or the web server device 30 via a web browser, and operations related to generation of the first video, the separated video, and the like are executed by executing a computer program included in this web page.

As described above, according to various embodiments, the terminal device 20C can display the separated video by depicting the first virtual space including the avatar of the user as viewed from a separated viewpoint in which the terminal device 20C is placed at a distance from this avatar, instead of a viewpoint in which the terminal device 20C is placed near (the head of) the avatar of the user in the first video. This separated video enables the user to objectively observe the appearance of his/her own avatar (how the avatar appears to other users, including each viewer and/or the other distributors).

Furthermore, in a preferred embodiment, in the separated video, the terminal device 20C can suppress the avatar from rotating about the rotation axis extending in the vertical direction, regardless of the content of the motion data related to the motion of the user. With this separated video, the user can objectively observe the appearance of his own avatar (how the avatar appears to other users, including each viewer and/or the other distributors) from a desired angle.

Furthermore, in a preferred embodiment, in the separated video, the terminal device 20C can display a user interface for attaching an object to the avatar or removing an object from the avatar. As a result, the user can easily execute the operation of attaching an object to the avatar or removing an object from the avatar while objectively observing the appearance of the avatar. Additionally, the user can objectively observe the appearance of the avatar with the object attached or removed.

The various technologies disclosed in this application can be used not only in the aspect of providing videos between each distributor and each viewer, but can also be used in the so-called "metaverse," a technology in which the avatars of the users gather and interact in a virtual space. That is, the various technologies disclosed in this application can be used in an aspect in which the terminal device of each user sends data or the like for causing the avatar thereof to move, to an information processor (a server device or the terminal device of each user) responsible for generating various videos, and the terminal device of each user generates (or receives) and displays the various videos in which the avatars of a plurality of users are arranged in the virtual space.

As will be readily appreciated by one of ordinary skill in the art having the benefit of this disclosure, the various examples described above can be used in suitable combinations in various patterns with each other as long as no inconsistency is created.

Given the many possible embodiments in which the principles of the disclosure herein may be applied, it should be understood that the various illustrated embodiments are merely various preferred examples and that the technical scope of the disclosure related to the scope of the claims should not be considered limited to these various preferred examples. In practice, the technical scope of the disclosure related to the scope of the claims is determined by the scope of the claims attached thereto. Therefore, the grant of a patent is requested for everything that falls within the technical scope of the disclosure described in the scope of the claims.

8. Supplementary Notes 8-1. Various Aspects of Platform

A computer program according to an embodiment can, "by being executed by at least one processor installed in a terminal device, cause the at least one processor to perform the following functions:
  when first motion data generated using a first tracking method is received by a first terminal device based on motion of a first distributor, generating a video is that includes an animation of a first avatar of the first distributor that is based on the first motion data;
  when second motion data generated using a second tracking method that differs from the first tracking method is received by a second terminal device based on motion of a second distributor, generating a video that includes an animation of a second avatar of the second distributor that is based on the second motion data;
  when both the first motion data and the second motion data are received, generating a video that includes an animation of the first avatar that is based on the first motion and an animation of the second avatar that is based on the second motion; and
  displaying the video on a display portion."

In a computer program according to a second aspect, a configuration can be adopted in which, in the first aspect, "when the first motion data and the second motion data are both received, the first motion data and the second motion data that the terminal device receives from the server device are data that the server device sends in common to the first terminal device, the second terminal device and the terminal device."

In a computer program according to a third aspect, a configuration can be adopted in which, in the first aspect, "when the first motion data and the second motion data are both received, the first motion data is sent by the server device to the terminal device and the second terminal device, and is not sent to the first terminal device; and the second motion data is sent by the server device to the terminal device and the first terminal device, and is not sent to the second terminal device."

In a computer program according to a fourth aspect, a configuration can be adopted in which, in one of the first through third aspects, "the first tracking method is a tracking method that generates motion data showing coordinates and an angle of each of (i) a device attached to a head and (ii) at least one controller attached to or held by a body other than the head; and the second tracking method is a face tracking method that generates motion data showing at least a depth of each of a plurality of parts on a face, and coordinates and an angle of the head."

In a computer program according to a fifth aspect, a configuration can be adopted in which, in the fourth aspect, "the terminal device is a terminal device that generates third motion data using the first tracking method based on motion of a user who is a user of the terminal device."

In a computer program according to a sixth aspect, a configuration can be adopted in which, in the fifth aspect, "the at least one processor is caused to function such that when the first motion data and the second motion data are both received, a first video is generated, as the video, in which the first avatar and the second avatar are arranged in the first virtual space and are expressed as viewed from a viewpoint of the user."

In a computer program according to a seventh aspect, a configuration can be adopted in which, in the sixth aspect, "the at least one processor is caused to function such that the viewpoint of the user in the first video is changed based on the third motion data."

In a computer program according to an eighth aspect, a configuration can be adopted in which, in the sixth aspect or seventh aspect, "the at least one processor is caused to function such that a second video is generated, as the video, in which the first avatar and the second avatar are arranged in the first virtual space and are expressed as viewed from a viewpoint in the first virtual space."

In a computer program according to a ninth aspect, a configuration can be adopted in which, in the eighth aspect, "the at least one processor is caused to function such that the second video is displayed on a screen of a pseudo terminal device expressed in a pseudo manner in the first video."

In a computer program according to a tenth aspect, a configuration can be adopted in which, in the eighth aspect or the ninth aspect, "the at least one processor is caused to function such that when it is determined that the at least one processor is executing a viewer mode in which the user is a viewer who views the video, a third avatar of the user is not depicted in the first video or the second video."

In a computer program according to an eleventh aspect, a configuration can be adopted in which, in the tenth aspect, "when it is determined that the at least one processor is executing the viewer mode, the third avatar of the user is not depicted in the video generated by a plurality of terminal devices including at least the first terminal device and the second terminal device."

In a computer program according to a twelfth aspect, a configuration can be adopted in which, in the tenth aspect or the eleventh aspect, "the at least one processor is caused to function such that when a distance between (i) the third avatar and (ii) one target avatar out of the first avatar and the second avatar in the first virtual space is less than or equal to a threshold value, if the third motion data indicates motion progressing toward the target avatar, the motion is invalidated."

In a computer program according to a thirteenth aspect, a configuration can be adopted in which, in any of the tenth through twelfth aspects, "when a distance between (i) the third avatar and (ii) a target avatar out of the first avatar and the second avatar in the first virtual space is less than or equal to a threshold value, an object indicating that the third avatar exists at a position where the third avatar is not depicted is displayed in the video generated by the terminal device corresponding to the target avatar out of the first terminal device and the second terminal device and expressed as viewed from a viewpoint of a target distributor corresponding to the target avatar out of the first distributor and the second distributor."

In a computer program according to a fourteenth aspect, a configuration can be adopted in which, in the eighth aspect or the ninth aspect, "the at least one processor is caused to function such that:
when the at least one processor determines that a joint distribution mode is being executed in which the user is a distributor that distributes the video jointly with the first distributor and the second distributor,
the third motion data is sent to a server device, and
the first video is generated including (i) an animation of the first avatar based on the first motion data, (ii) an animation of the second avatar based on the second motion data, and (iii) an animation of the third avatar based on the third motion data."

In a computer program according to a fifteenth aspect, a configuration can be adopted in which, in the fourteenth aspect, "the at least one processor is caused to function such that:
when the at least one processor determines that the joint distribution mode is being executed,
the second video is generated including (i) an animation of the first avatar based on the first motion data, (ii) an animation of the second avatar based on the second motion data, and (iii) an animation of the third avatar based on the third motion data."

In a computer program according to a sixteenth aspect, a configuration can be adopted in which, in the fifteenth aspect, "when the at least one processor determines that the joint distribution mode is being executed, the third avatar is depicted in the videos generated by the first terminal device and the second terminal device."

In a computer program according to a seventeenth aspect, a configuration can be adopted in which, in any of the fourteenth through sixteenth aspects, "the at least one processor is caused to function such that:
when a distance between the third avatar and a target avatar out of the first avatar and the second avatar is less than or equal to a threshold value in the first virtual space,
if the third motion data indicates motion progressing toward the target avatar, that motion is invalidated."

In a computer program according to an eighteenth aspect, a configuration can be adopted in which, in any of the fourteenth through seventeenth aspects, "the at least one processor is caused to function such that data is displayed, on the display portion, indicating which out of the first tracking method and the second tracking methods is being used for each of the first distributor and the second distributor distributing the video jointly with the user."

In a computer program according to a nineteenth aspect, a configuration can be adopted in which, in the fifteenth aspect, "in the second video, the at least one processor is caused to function such the second avatar, whose position is fixed in the first virtual space, is placed in a front row and the first avatar and the third avatar, whose positions change in the first virtual space, are placed in a back row behind the front row."

In a computer program according to a twentieth aspect, a configuration can be adopted in which, in the nineteenth aspect, "in the second video, the at least one processor is caused to function such that the first avatar and the third avatar that are arranged in the back row are arranged at a position higher than the second avatar arranged in the front row."

In a computer program according to a twenty-first aspect, a configuration can be adopted in which, in the fourth aspect, "the terminal device is a terminal device that generates fourth motion data using the second tracking method based on motion of a user that is the user of the terminal device."

In a computer program according to a twenty-second aspect, a configuration can be adopted in which, in the twenty-first aspect, "the at least one processor is caused to function such that:

when the first motion data and the second motion data are received,
a third video is generated, as the video, in which the first avatar and the second avatar are arranged in the first virtual space and expressed as viewed from a viewpoint in the first virtual space."

In a computer program according to a twenty-third aspect, a configuration can be adopted in which, in the twenty-second aspect, "the at least one processor is caused to function such that:

when the at least one processor determines that a joint distribution mode is being executed in which the user is a distributor that distributes the video jointly with the first distributor and the second distributor,
the fourth motion data is sent to the server device, and
the third video is generated including (i) an animation of the first avatar based on the first motion data, (ii) an animation of the second avatar based on the second motion data, and (iii) an animation of the third avatar of the user based on the fourth motion data."

In a computer program according to a twenty-fourth aspect, a configuration can be adopted in which, in any of the first through twenty-third aspects, "the at least one processor includes a central processing unit (CPU), a microprocessor and/or a graphics processing unit (GPU)."

A method according to a twenty-fifth aspect can be "a method that is executed by at least one processor installed in a terminal device that executes computer-readable commands, the method including that the at least one processor executes the commands such that: when first motion data is received that is generated using a first tracking method based on motion of a first distributor by a first terminal device, the at least one processor, by executing the commands, generates a video including an animation of a first avatar of the first distributor based on the first motion data;

when second motion data is received that is generated using a second tracking method that differs from the first tracking method based on motion of a second distributor by a second terminal device, a video is generated including an animation of a second avatar of the second distributor based on the second motion data;
when the first motion data and the second motion data are both received, a video is generated including (i) an animation of the first avatar based on the first motion data and (ii) an animation of the second avatar based on the second motion data; and
the video is displayed on a display portion."

In a method according to a twenty-sixth aspect, a configuration can be adopted in which, in the twenty-fifth aspect, "the at least one processor includes a central processing unit (CPU), a microprocessor and/or a graphics processing unit (GPU)."

A computer program according to a twenty-seventh aspect can be "executed by at least one processor installed in a terminal device, wherein the computer program causes the at least one processor to function such that:

first motion data generated by the terminal device using a first tracking method based on motion of a user of the terminal is sent to a server device;
second motion data generated by a second terminal device using a second tracking method that differs from the first tracking method based on motion of a second distributor is received via the server device;
a video is generated including (i) an animation of a first avatar of the user based on the first motion data and (ii) an animation of a second avatar of the second distributor based on the second motion data; and
the video is displayed on a display portion."

In a computer program according to a twenty-eighth aspect, a configuration can be adopted in which, in the twenty-seventh aspect, "the first tracking method is a tracking method that generates motion data indicating at least coordinates and angles of each of (i) a device attached to a head and (ii) at least one controller attached to or held by a body other than the head; and the second tracking method is a face tracking method that generates motion data indicating at least a depth of each of a plurality of parts of a face, and the coordinates and angle of the head."

In a computer program according to a twenty-ninth aspect, a configuration can be adopted in which, in the twenty-seventh aspect, "the first tracking method is a face tracking method that generates motion data indicating at least a depth of each of a plurality of parts of a face, and the coordinates and angle of a head; and the second tracking method is a tracking method that generates motion data indicating at least the coordinates and angles of each of (i) a device attached to the head and (ii) at least one controller attached to or held by a body other than the head."

In a computer program according to a thirtieth aspect, a configuration can be adopted in which, in the twenty-seventh aspect, "the at least one processor includes a central processing unit (CPU), a microprocessor and/or a graphics processing unit (GPU)."

A method according to a thirty-first aspect can be "a method that is executed by at least one processor installed in a terminal device that executes computer-readable commands, the method including that the at least one processor executes the commands such that:

first motion data generated by the terminal device using a first tracking method based on motion of a user is sent to a server device;
second motion data generated by a second terminal device using a second tracking method that differs from the first tracking method based on motion of a second distributor is received via the server device;
a video is generated including (i) an animation of a first avatar of the user based on the first motion data and (ii) an animation of a second avatar of the second distributor based on the second motion data; and
the video is displayed on a display portion."

In a method according to a thirty-second aspect, a configuration can be adopted in which, in the thirty-first aspect, "the at least one processor includes a central processing unit (CPU), a microprocessor and/or a graphics processing unit (GPU)."

A server device according to a thirty-third aspect can adopt a configuration in which "at least one processor is provided, the at least one processor being configured such that:
- when first motion data generated by a first terminal device using a first tracking method based on motion of a first distributor is received from the first terminal device, the first motion data is sent to a terminal device and causes a video including an animation of a first avatar of the first distributor to be generated in the terminal device based on the first motion data;
- when second motion data generated by a second terminal device using a second tracking method that differs from the first tracking method based on motion of a second distributor is received from the second terminal device, the second motion data is sent to the terminal device and causes a video including an animation of a second avatar of the second distributor to be generated in the terminal device based on the second motion data; and
- when the first motion data and the second motion data are both received, both the first motion data and the second motion data are sent to the terminal device and a video including an animation of the first avatar based on the first motion data and an animation of the second avatar based on the second motion data is caused to be generated in the terminal device."

In a server device according to a thirty-fourth aspect, a configuration can be adopted in which, in the thirty-third aspect, "the at least one processor includes a central processing unit (CPU), a microprocessor and/or a graphics processing unit (GPU)."

A method according to a thirty-fifth aspect can be "a method that is executed by at least one processor installed in a server device that executes computer-readable commands, the method including that the at least one processor executes the commands such that:
- when first motion data generated by a first terminal device using a first tracking method based on motion of a first distributor is received from the first terminal device, the first motion data is sent to a terminal device and causes a video including an animation of a first avatar of the first distributor to be generated in the terminal device based on the first motion data;
- when second motion data generated by a second terminal device using a second tracking method that differs from the first tracking method based on motion of a second distributor is received from the second terminal device, the second motion data is sent to the terminal device and causes a video including an animation of a second avatar of the second distributor to be generated in the terminal device based on the second motion data; and
- when the first motion data and the second motion data are both received, both the first motion data and the second motion data are sent to the terminal device and a video including (i) an animation of the first avatar based on the first motion data and (ii) an animation of the second avatar based on the second motion data is caused to be generated in the terminal device."

In a method according to a thirty-sixth aspect, a configuration can be adopted in which, in the thirty-fifth aspect, "the at least one processor includes a central processing unit (CPU), a microprocessor and/or a graphics processing unit (GPU)."

A server device according to a thirty-seventh aspect can be "a server device provided with at least one processor, wherein:
- the at least one processor is configured to send, to a terminal device, a web page including a computer program;
- the computer program, by being executed by the terminal device that has received the web page, causes the terminal device to perform the following functions:
- when first motion data generated by a first terminal device using a first tracking method based on motion of a first distributor is received, a video is generated including an animation of a first avatar of the first distributor based on the first motion data;
- when second motion data generated by a second terminal device using a second tracking method that differs from the first tracking method based on motion of a second distributor is received, a video is generated including an animation of a second avatar of the second distributor based on the second motion data; and
- when the first motion data and the second motion data are both received, a video is generated including (i) an animation of the first avatar based on the first motion data and (ii) an animation of the second avatar based on the second motion data."

In a server device according to a thirty-eighth aspect, a configuration can be adopted in which, in the thirty-seventh aspect, "the at least one processor includes a central processing unit (CPU), a microprocessor and/or a graphics processing unit (GPU)."

8-2. Various Aspects of Input Objects

A computer program according to a first aspect can, "by being executed by at least one processor installed in a terminal device, cause the at least one processor to perform the following functions:
- displaying a first video that is generated based on motion of a user and is expressed as viewed from a viewpoint of the user, the user being a user of the terminal device;
- displaying, in combination with the first video, an input object that functions as a user interface enabling input by the user; and
- causing the input object that is displayed to change according to the type of the first video that is displayed."

In the computer program according to a second aspect, a configuration can be adopted that, in the above-described first aspect, "further causes the at least one processor to perform the following function:
- displaying the input object inside an area in which the first video is displayed."

In a computer program according to a third aspect, a configuration can be adopted that, in the above-described first or second aspect, "further causes the at least one processor to perform the following function:
- displaying the input object so as to be movable in conjunction with part of an avatar of the user included in the first video."

In a computer program according a fourth aspect, a configuration can be adopted that, in the above-described third aspect, "further causes the at least one processor to perform the following function:
- displaying the input object as a pseudo terminal device expressed in a pseudo manner."

In a computer program according to a fifth aspect, a configuration can be adopted that, in any of the above-described first through fourth aspects, "further causes the at least one processor to function so as to display one of four types of videos as the first video, wherein:
the four types of videos include:
a first type of video that is displayed when the at least one processor determines that the user is executing a preparation mode in which the user is neither a distributor nor a viewer, and in which an avatar of the user that moves based on the motion of the user is arranged in a virtual space;
a second type of video that is displayed when the at least one processor determines that the user is executing a single distribution mode in which the user is a distributor, and in which the avatar of the user that moves based on the motion of the user is arranged in the virtual space;
a third type of video that is displayed when the at least one processor determines that the user is executing a joint distribution mode in which the user is a joint distributor, and in which (i) the avatar of the user that moves based on the motion of the user and (ii) an avatar of at least one other distributor that moves based on motion of the at least one other distributor are arranged in the virtual space; and
a fourth type of video that is displayed when the at least one processor determines that the user is executing a viewing mode in which the user is a viewer and in which an avatar of at least one distributor that moves based on the motion of the at least one distributor is arranged in the virtual space."

In a computer program according to a sixth aspect, a configuration can be adopted that, in the above-described fifth aspect, "further causes the at least one processor to perform the following function:
displaying, as the first video, one of the four types of videos selected according to input by the user to the input object."

In a computer program according to a seventh aspect, a configuration can be adopted that, in the above-described sixth aspect, "further causes the at least one processor to perform the following functions:
displaying the input object at a first size when the fourth type of video is displayed as the first video; and
displaying the input object at a second size larger than the first size when the first type of video, the second type of video, or the third type of video is displayed as the first video."

In a computer program according to an eighth aspect, a configuration can be adopted that, in the above-described seventh aspect, "further causes the at least one processor to perform the following function:
when the first or second type of video is displayed as the first video, including, in the input object, a second video in which the avatar of the user that moves based on the motion of the user is arranged in the virtual space and the avatar is displayed as viewed from a front."

In a computer program according to a ninth aspect, a configuration can be adopted that, in the above-described seventh aspect, "further causes the at least one processor to perform the following function:
when the third type of video is displayed as the first video, including, in the input object, a second video in which (i) the avatar of the user that moves based on the motion of the user and (ii) the avatar of the at least one other distributor that moves based on the motion of the at least one other distributor are arranged in the virtual space, each avatar being displayed as viewed from a front."

In a computer program according to a tenth aspect, a configuration can be adopted that, in the above-described seventh aspect, "further causes the at least one processor to perform the following function:
when the fourth type of video is displayed as the first video, including, in the input object, a second video in which the avatar of the at least one distributor that moves based on the motion of the at least one distributor is arranged in the virtual space and each avatar is displayed as viewed from a front."

In a computer program according to an eleventh aspect, a configuration can be adopted that, in any of the above-described eighth through tenth aspects, "further causes the at least one processor to perform the following function:
generating the second video that displays each avatar as viewed from a position of a virtual camera arranged in the virtual space used in the first video."

In a computer program according to a twelfth aspect, a configuration can be adopted that, in any of the above-described eighth through eleventh aspects, "further causes the at least one processor to perform the following function:
when the first type of video, the second type of video, or the third type of video is displayed as the first video, displaying the second video with the avatar of the user reversed."

In a computer program according to a thirteenth aspect, a configuration can be adopted in which, in any of the above-described eighth through twelfth aspects:
"when the second type of video or the third type of video is displayed as the first video, the second video included in the input object is the same as a video displayed in common on a terminal device of at least one other viewer."

In a computer program according to a fourteenth aspect, a configuration can be adopted that, in any of the above-described eighth through thirteenth aspects, "further causes the at least one processor to perform the following function:
displaying, on the input object, an icon to be selected by the user to determine which of the first type of video, the second type of video, the third type of video, and the fourth type of video is to be displayed as the first video."

In a computer program according to a fifteenth aspect, a configuration can be adopted that, in any of the above-described eighth through fourteenth aspects, "further causes the at least one processor to perform the following function:
when the second type of video, the third type of video, or the fourth type of video is displayed as the first video, displaying, in a background positioned behind the input object in the first video, a comment sent by the viewer to any of the distributors."

In a computer program according to a sixteenth aspect, a configuration can be adopted that, in any of the above-described eighth through fifteenth aspects, "further causes the at least one processor to perform the following functions:
when the fourth type of video is displayed as the first video;
displaying a plurality of gift objects at a side of, above, or below the avatar of the at least one distributor in the fourth type of video;
determining one of the plurality of gift objects selected by the user as a gift object to be sent to the at least one distributor;

displaying the determined gift object in the fourth type of video; and displaying the determined gift object in the second video."

In a computer program according to a seventeenth aspect, a configuration can be adopted in which, in any of the above-described first through sixteenth aspects:

the at least one processor includes a central processing unit (CPU), a microprocessor and/or a graphics processing unit (GPU).

A method according to an eighteenth aspect can be "a method that is executed by at least one processor installed in a terminal device that executes computer-readable commands, the method including that the at least one processor executes the commands such that:

a first video is displayed that moves based on motion of a user who is the user of the terminal device and is expressed as viewed from a viewpoint of the user;

an input object that functions as a user interface enabling input by the user is displayed in combination with the first video; and the input object that is displayed is caused to change according to a type of the first video that is displayed."

In a method according to a nineteenth aspect, a configuration can be adopted in which, in the above-described eighteenth aspect:

the at least one processor includes a central processing unit (CPU), a microprocessor and/or a graphics processing unit (GPU).

A system according to a twentieth aspect can be "a system including a terminal device and a server device connected to the terminal device via a communication circuit, wherein:

the terminal device is configured to:

send motion data generated based on motion of a user of the terminal device to the server device;

display a first video that is generated based on the motion data and is expressed as viewed from a viewpoint of the user;

display in combination with the first video an input object that functions as a user interface enabling input by the user; and cause the input object that is displayed to change according to a type of the first video that is displayed; and the server device is configured to send the motion data received from the terminal device to at least one other terminal device."

In a system according to a twenty-first aspect, a configuration can be adopted in which, in the above-described twentieth aspect:

the communication circuit includes the Internet.

A method according to a twenty-second aspect can be "a method that is executed by a system including a terminal device and a server device connected to the terminal device via a communication circuit, the method including that:

the terminal device sends motion data generated based on motion of a user of the terminal device to the server device;

the terminal device displays a first video that is generated based on the motion data and is expressed as viewed from a viewpoint of the user;

the terminal device displays in combination with the first video an input object that functions as a user interface enabling input by the user;

the terminal device causes the input object that is displayed to change according to a type of the first video that is displayed; and the server device sends the motion data received from the terminal device to at least one other terminal device."

In a system according to a twenty-third aspect, a configuration can be adopted in which, in the above-described twenty-second aspect, "the communication circuit includes the Internet."

A server device according to a twenty-fourth aspect can be "a server device provided with at least one processor and being configured such that the at least one processor sends a web page containing a computer program to a terminal device, wherein the computer program, by being executed by the terminal device that received the webpage, causes the terminal device to perform the following functions:

displaying a first video that is generated based on motion of the user of the terminal device and is expressed as viewed from a viewpoint of a user;

displaying, in combination with the first video, an input object that functions as a user interface enabling input by the user; and causing the input object that is displayed to change according to the type of the first video that is displayed."

In a server device according to a twenty-fifth aspect, a configuration can be adopted in which, in the above-described twenty-fourth aspect:

"the at least one processor includes a central processing unit (CPU), a microprocessor and/or a graphics processing unit (GPU)."

8-3. Various Aspects of Closet Mode

A computer program according to a first aspect can be "executed by at least one processor installed in a terminal device, wherein the computer program causes the at least one processor to function such that:

first motion data generated based on motion of a user of the terminal device is generated using a plurality of tracking devices attached to the user;

a first video is displayed that moves based on the first motion data and expresses a virtual space as viewed from a viewpoint of the user;

a second video is displayed that moves based on the first motion data and expresses the virtual space including an avatar of the user as viewed from a separated viewpoint at a distance from the avatar of the user; and an object is attached to the avatar of the user or an object is removed from the avatar of the user in accordance with operation data generated based on an operation by the user."

In a computer program according to a second aspect, a configuration can be adopted in which, in the above-described first aspect, "the at least one processor is caused to function such that switching is performed between a first mode that displays the first video in an area and a second mode that displays the second video in the area, or the first video and the second video are displayed in parallel in respectively separate areas."

In a computer program according to a third aspect, a configuration can be adopted in which, in the above-described first or second aspect, "the at least one processor is caused to function such that the viewpoint of the avatar of the user arranged in the virtual space is used as the viewpoint of the user."

In a computer program according to a fourth aspect, a configuration can be adopted in which, in any of the above-described first through third aspects, "the at least one processor is caused to function such that in the first video, the viewpoint of the user is caused to change and the avatar of the user is caused to move based on the first motion data, and in the second video, the avatar of the user is caused to move based on the first motion data and the separated viewpoint is not caused to change regardless of the first motion data."

In a computer program according to a fifth aspect, a configuration can be adopted in which, in any of the above-described first through fourth aspects, "the at least one processor is caused to function such that in the second video, the avatar of the user is caused to rotate about a rotation axis extending in a vertical direction in the virtual space, regardless of the first motion data."

In a computer program according to a sixth aspect, a configuration can be adopted in which, in any of the above-described first through fifth aspects, "the at least one processor is caused to function such that in the second video, a direction in which the head of the avatar of the user faces in the virtual space is not caused to change, regardless of the first motion data."

In a computer program according to a seventh aspect, a configuration can be adopted in which, in any of the above-described first through sixth aspects, "the at least one processor is caused to function such that in the second video, the position of the avatar of the user in the virtual space is not caused to change, regardless of the first motion data."

In a computer program according to an eighth aspect, a configuration can be adopted in which, in the above-described fifth aspect, "the at least one processor is caused to function such that the plurality of tracking devices includes a right-hand controller operated by a right hand of the user and a left-hand controller operated by a left hand of the user, a specific user interface is displayed in the second video, and the avatar of the user is caused to rotate about the rotation axis in the second video in accordance with an operation by the user on the user interface, the right-hand controller and/or the left-hand controller."

In a computer program according to a ninth aspect, a configuration can be adopted in which, in any of the above-described first through seventh aspects, "the at least one processor is caused to function such that the plurality of tracking devices includes a right-hand controller operated by a right hand of the user and a left-hand controller operated by a left hand of the user, a specific user interface is displayed in the second video, and the separated viewpoint in the second video is caused to change in accordance with an operation by the user on the user interface, the right-hand controller, and/or the left-hand controller."

In a computer program according to a tenth aspect, a configuration can be adopted in which, in any of the above-described first through ninth aspects, "the at least one processor is caused to function such that first audio data is acquired based on speech of the user, and in the second video, a facial expression of the avatar of the user is caused to change based on the first audio data."

In a computer program according to an eleventh aspect, a configuration can be adopted in which, in any of the above-described first through tenth aspects, "the first video includes an avatar of another user that moves in accordance with second motion data generated based on motion of the other user using a plurality of tracking devices attached to the other user."

In a computer program according to a twelfth aspect, a configuration can be adopted in which, in the above-described eleventh aspect, "the at least one processor is caused to function such that a viewpoint of the avatar of the other user arranged in the virtual space is used as the separated viewpoint."

In a computer program according to a thirteenth aspect, a configuration can be adopted in which, in the above-described eleventh or twelfth aspect, "the second video is not displayed on the terminal device of the other user."

In a computer program according to a fourteenth aspect, a configuration can be adopted in which, in any of the above-described first through thirteenth aspects, "the at least one processor is caused to function such that by sending the first motion data to a server device, a third video, which expresses the virtual space including the avatar of the user that moves in accordance with the first motion data as viewed from a viewpoint of a user of the other terminal device, can be displayed on the other terminal device that receives the first motion data from the server device."

In a computer program according to a fifteenth aspect, a configuration can be adopted in which, in the above-described fourteenth aspect, "the at least one processor is caused to function such that the viewpoint of the user of the other terminal device is used as the separated viewpoint."

In a computer program according to a sixteenth aspect, a configuration can be adopted in which, in the above-described fourteenth or fifteenth aspect, "the second video is not displayed on the other terminal device."

In a computer program according to a seventeenth aspect, a configuration can be adopted in which, in any of the above-described first through sixteenth aspects, "the at least one processor is caused to function such that a plurality of objects is displayed at the side of, above or below the avatar of the user in the second video, one of the plurality of objects selected by the user is determined as an addition object to be attached to the avatar of the user, and the avatar of the user to which the determined addition object is attached is displayed in the second video."

In a computer program according to an eighteenth aspect, a configuration can be adopted in which, in the above-described seventeenth aspect, "the at least one processor is caused to function such that among the plurality of objects, an object that is caused to move by an indicating object until in contact with the avatar of the user that moves in accordance with the first motion data in the second video is determined as the addition object."

In a computer program according to a nineteenth aspect, a configuration can be adopted in which, in any of the above-described first through third aspects, "the at least one processor is caused to function such that in the first video, the viewpoint of the user is caused to change, and the avatar of the user is caused to move, based on the first motion data, and in the second video, the avatar of the user is caused to move regardless of the first motion data."

In a computer program according to a twentieth aspect, a configuration can be adopted in which, in any of the above-described first through nineteenth aspects, "the tracking devices, constituting the plurality of tracking devices attached to the user, are attached to the right arm, the left arm, and the head of the user, respectively."

In a computer program according to a twenty-first aspect, a configuration can be adopted in which, in any of the above-described first through eighteenth aspects, "the at least one processor is caused to function such that the first video is generated and displayed based on the first motion data, and the second video is generated and displayed based on the first motion data."

In a computer program according to a twenty-second aspect, a configuration can be adopted in which, in any of the above-described first through twenty-first aspects, "the at least one processor is caused to function such that the first video generated by a server device is received from the server device and displayed, and the second video generated by the server device is received from the server device and displayed."

In a computer program according to a twenty-third aspect, a configuration can be adopted in which, in any of the above-described first through twenty-second aspects, "the at least one processor includes a central processing unit (CPU), a microprocessor and/or a graphics processing unit (GPU)."

A method according to a twenty-fourth aspect can be "a method that is executed by at least one processor installed in a terminal device that executes computer-readable commands, the method including that the at least one processor executes the commands such that:

first motion data is acquired that was generated based on motion of a user that is a user of the terminal device, using a plurality of tracking devices attached to the user;

a first video is displayed that moves based on the first motion data and expresses a virtual space as viewed from a viewpoint of the user;

a second video is displayed that moves based on the first motion data and expresses the virtual space including an avatar of the user as viewed from a separated viewpoint at a distance from the avatar of the user; and an object is attached to the avatar of the user or an object is removed from the avatar of the user in accordance with operation data generated based on an operation by the user."

In a method according to a twenty-fifth aspect, a configuration can be adopted in which, in the above-described twenty-fourth aspect, "the at least one processor includes a central processing unit (CPU), a microprocessor and/or a graphics processing unit (GPU)."

A server device according to a twenty-sixth aspect can be "a server device provided with at least one processor, the at least one processor being configured such that:

motion data is acquired that was generated based on motion of a user of a terminal device using a plurality of tracking devices attached to the user;

a first video that is generated based on the motion data and expresses a virtual space as viewed from a viewpoint of the user is generated and sent to the terminal device;

a second video that is generated based on the motion data and expresses the virtual space including an avatar of the user as viewed from a separated viewpoint at a distance from the avatar of the user is generated and sent to the terminal device;

operation data generated based on an operation by the user is received from the terminal device; and an object is attached to the avatar of the user or an object is removed from the avatar of the user based on the operation data."

In a server device according to a twenty-seventh aspect, a configuration can be adopted in which, in the above-described twenty-sixth aspect, "the at least one processor includes a central processing unit (CPU), a microprocessor and/or a graphics processing unit (GPU)."

A method according to a twenty-eighth aspect can be "a method that is executed by at least one processor installed in a server device that executes computer-readable commands, the method including that the at least one processor executes the commands such that:

motion data is acquired that was generated based on motion of a user of a terminal device using a plurality of tracking devices attached to the user;

a first video that is generated based on the motion data and expresses a virtual space as viewed from a viewpoint of the user is generated and sent to the terminal device;

a second video that is generated based on the motion data and expresses the virtual space including an avatar of the user as viewed from a separated viewpoint at a distance from the avatar of the user is generated and sent to the terminal device;

operation data generated based on an operation by the user is received from the terminal device; and an object is attached to the avatar of the user or an object is removed from the avatar of the user based on the operation data."

In a method according to a twenty-ninth aspect, a configuration can be adopted in which, in the above-described twenty-eighth aspect:

"the at least one processor includes a central processing unit (CPU), a microprocessor and/or a graphics processing unit (GPU)."

A system according to a thirtieth aspect can be "a system that includes a terminal device, and a server device connected to the terminal device via a communication circuit, wherein the terminal device is configured so as to:

acquire motion data that was generated based on motion of a user of the terminal device using a plurality of tracking devices attached to the user;

display a first video that is generated based on the motion data and expresses a virtual space as viewed from a viewpoint of the user;

display a second video that is generated based on the motion data and expresses the virtual space including an avatar of the user as viewed from a separated viewpoint at a distance from the avatar of the user; and attach an object to the avatar of the user or remove an object from the avatar of the user in accordance with operation data generated based on an operation by the user, and the server device is configured so as to send the motion data received from the terminal device to at least one other terminal device."

In the system according to a thirty-first aspect, a configuration can be adopted in which, in the above-described thirtieth aspect, "the communication circuit includes the Internet."

A method according to a thirty-second aspect can be "a method that is executed by a system that includes a terminal device and a server device connected to the terminal device by a communication circuit, the method including that:

the terminal device acquires motion data that was generated based on motion of a user of the terminal device using a plurality of tracking devices attached to the user;

the terminal device displays a first video that is generated based on the motion data and expresses a virtual space as viewed from the viewpoint of the user;

the terminal device displays a second video that is generated based on the motion data and expresses the virtual space including an avatar of the user as viewed from a separated viewpoint at a distance from the avatar of the user;

the terminal device attaches an object to the avatar of the user or removes an object from the avatar of the user in accordance with operation data generated based on an operation by the user; and the server device sends the motion data received from the terminal device to at least one other terminal device."

In the method according to a thirty-third aspect, a configuration can be adopted in which, in the above-described thirty-second aspect, "the communication circuit includes the Internet."

A server device according to a thirty-fourth aspect can be "a server device provided with at least one processor, and configured so that the at least one processor sends a web page including a computer program to a terminal device, and the computer program, by being executed by the terminal device that received the web page, causes the terminal device to function so as to:
 acquire motion data that was generated based on motion of a user of the terminal device using a plurality of tracking devices attached to the user;
 display a first video that is generated based on the motion data and expresses a virtual space as viewed from a viewpoint of the user;
 display a second video that is generated based on the motion data and expresses the virtual space including an avatar of the user as viewed from a separated viewpoint at a distance from the avatar of the user; and
 attach an object to the avatar of the user or remove an object from the avatar of the user in accordance with operation data generated based on an operation by the user."

In a server device according to a thirty-fifth aspect, a configuration can be adopted in which, in the above-described thirty-fourth aspect, "the at least one processor includes a central processing unit (CPU), a microprocessor and/or a graphics processing unit (GPU)."

EXPLANATION OF SYMBOLS 1 communication system
20, 20A, 20B, 20C terminal devices
30, 30A, 30B, 30C server devices

The invention claimed is:

1. A non-transitory computer-readable medium storing thereon a program that, by being executed by at least one processor installed in a terminal device, causes the at least one processor to perform the following functions:
 displaying a first video that is generated based on motion of a user and is represented as viewed from a viewpoint of the user, the user being a user of the terminal device;
 displaying, in combination with the first video, an input object that functions as a user interface enabling input by the user; and
 causing the input object that is displayed to be displayed differently according to the type of the first video that is displayed, wherein
 a size of the input object is changed according to the type of the first video that is displayed.

2. The non-transitory computer-readable medium according to claim 1, wherein the program further causes the at least one processor to perform the following function:
 displaying the input object inside an area in which the first video is displayed.

3. The non-transitory computer-readable medium according to claim 1, wherein the program further causes the at least one processor to perform the following function:
 displaying the input object so as to be movable in conjunction with part of an avatar of the user included in the first video.

4. The non-transitory computer-readable medium according to claim 3, wherein the program further causes the at least one processor to perform the following function:
 displaying the input object as a virtual terminal device represented in a virtual manner.

5. The non-transitory computer-readable medium according to claim 1, wherein the program further causes the at least one processor to function so as to display one of four types of videos as the first video, wherein:
 the four types of videos include:
 a first type of video that is displayed when the at least one processor determines that the user is executing a preparation mode in which the user is neither a distributor nor a viewer, and in which an avatar of the user that moves based on the motion of the user is arranged in a virtual space;
 a second type of video that is displayed when the at least one processor determines that the user is executing a single distribution mode in which the user is the distributor, and in which the avatar of the user that moves based on the motion of the user is arranged in the virtual space;
 a third type of video that is displayed when the at least one processor determines that the user is executing a joint distribution mode in which the user is a joint distributor, and in which (i) the avatar of the user that moves based on the motion of the user and (ii) an avatar of at least one other distributor that moves based on motion of the at least one other distributor are arranged in the virtual space; and
 a fourth type of video that is displayed when the at least one processor determines that the user is executing a viewing mode in which the user is the viewer and in which an avatar of at least one distributor that moves based on the motion of the at least one distributor is arranged in the virtual space.

6. The non-transitory computer-readable medium according to claim 5, wherein the program further causes the at least one processor to perform the following function:
 displaying, as the first video, one of the four types of videos selected according to the input by the user to the input object.

7. The non-transitory computer-readable medium according to claim 6, wherein the program further causes the at least one processor to perform the following functions:
 displaying the input object at a first size when the fourth type of video is displayed as the first video; and
 displaying the input object at a second size larger than the first size when the first type of video, the second type of video, or the third type of video is displayed as the first video.

8. The non-transitory computer-readable medium according to claim 7, wherein the program further causes the at least one processor to perform the following function:
 when the first or second type of video is displayed as the first video, including, in the input object, a second video in which the avatar of the user that moves based on the motion of the user is arranged in the virtual space and the avatar is displayed as viewed from a front of the avatar.

9. The non-transitory computer-readable medium according to claim 7, wherein the program further causes the at least one processor to perform the following function:
 when the third type of video is displayed as the first video, including, in the input object, a second video in which (i) the avatar of the user that moves based on the motion of the user and (ii) the avatar of the at least one other distributor that moves based on the motion of the at least one other distributor are arranged in the virtual space, each avatar being displayed as viewed from a front of each avatar.

10. The non-transitory computer-readable medium according to claim 7, wherein the program further causes the at least one processor to perform the following function:
when the fourth type of video is displayed as the first video, including, in the input object, a second video in which the avatar of the at least one distributor that moves based on the motion of the at least one distributor is arranged in the virtual space and each avatar is displayed as viewed from a front of each avatar.

11. The non-transitory computer-readable medium according to claim 8, wherein the program further causes the at least one processor to perform the following function:
generating the second video that displays each avatar as viewed from a position of a virtual camera arranged in the virtual space used in the first video.

12. The non-transitory computer-readable medium according to claim 8, wherein the program further causes the at least one processor to perform the following function:
when the first type of video, the second type of video, or the third type of video is displayed as the first video, displaying the second video with the avatar of the user reversed.

13. The non-transitory computer-readable medium according to claim 8, wherein:
when the second type of video or the third type of video is displayed as the first video, the second video included in the input object is the same as a video displayed in common on a terminal device of at least one other viewer.

14. The non-transitory computer-readable medium according to claim 8, wherein the program further causes the at least one processor to perform the following function:
displaying, on the input object, an icon to be selected by the user to determine which of the first type of video, the second type of video, the third type of video, and the fourth type of video is to be displayed as the first video.

15. The non-transitory computer-readable medium according to claim 8, wherein the program further causes the at least one processor to perform the following function:
when the second type of video, the third type of video, or the fourth type of video is displayed as the first video, displaying, in a background positioned behind the input object in the first video, a comment sent by the viewer to any of the distributors.

16. The non-transitory computer-readable medium according to claim 8, wherein the program further causes the at least one processor to perform the following functions:
when the fourth type of video is displayed as the first video,
displaying a plurality of gift objects at a side of, above, or below the avatar of the at least one distributor;
determining one of the plurality of gift objects selected by the user as a gift object to be sent to the at least one distributor;
displaying the determined gift object in the first video; and
displaying the determined gift object in the second video.

17. A method that is executed by at least one processor installed in a terminal device that executes computer-readable commands, the method including that the at least one processor executes the commands such that:
a first video is displayed that is generated based on motion of a user who is the user of the terminal device and is represented as viewed from a viewpoint of the user;
an input object that functions as a user interface enabling input by the user is displayed in combination with the first video; and
the input object that is displayed is caused to be displayed differently according to a type of the first video that is displayed, wherein
a size of the input object is changed according to the type of the first video that is displayed.

18. A system including a terminal device and a server device connected to the terminal device via a communication circuit, wherein:
the terminal device is configured to:
send motion data generated based on motion of a user of the terminal device to the server device;
display a first video that is generated based on the motion data and is represented as viewed from a viewpoint of the user;
display in combination with the first video an input object that functions as a user interface enabling input by the user; and
cause the input object that is displayed to be displayed differently according to a type of the first video that is displayed, wherein a size of the input object is changed according to the type of the first video that is displayed; and
the server device is configured to send the motion data received from the terminal device to at least one other terminal device.

* * * * *